US006424387B2

(12) United States Patent
Sato et al.

(10) Patent No.: US 6,424,387 B2
(45) Date of Patent: Jul. 23, 2002

(54) RECORDING MEDIUM INCLUDING LIQUID CRYSTAL LAYER

(75) Inventors: Eiji Sato, Yamatokoriyama; Shiro Narikawa, Kashihara; Tomoko Nishino, Tenri; Masao Yamamoto, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/799,752

(22) Filed: Mar. 7, 2001

Related U.S. Application Data

(62) Division of application No. 09/345,950, filed on Jul. 1, 1999, now Pat. No. 6,269,225.

(30) Foreign Application Priority Data

Jul. 6, 1998 (JP) .......................................... 10-190823

(51) Int. Cl.⁷ .............................. G02F 1/13; C09K 19/02
(52) U.S. Cl. ........................... 349/2; 349/171; 349/183; 349/185; 349/186
(58) Field of Search ........................... 349/2, 106, 171, 349/172, 177, 183–186; 428/64

(56) References Cited

U.S. PATENT DOCUMENTS

| | | | |
|---|---|---|---|
| 3,633,720 A | 1/1972 | Tyler | 400/105 |
| 3,965,476 A | 6/1976 | Wenander et al. | 347/256 |
| 4,126,456 A | 11/1978 | Pole et al. | 430/31 |

(List continued on next page.)

FOREIGN PATENT DOCUMENTS

| | | | |
|---|---|---|---|
| JP | 61-167922 A | * | 7/1986 |
| JP | 04-034520 A | * | 2/1992 |
| JP | 04-073615 A | * | 3/1992 |
| JP | 05-088150 A | * | 4/1993 |
| JP | 6-67141 A | | 3/1994 |
| JP | 06-222338 A | * | 8/1994 |
| JP | 07-104257 A | * | 4/1995 |
| JP | 10-010501 A | * | 1/1998 |
| JP | 10-48604 A | | 2/1998 |

OTHER PUBLICATIONS

Hotta, "Recent Trend of Rewritable Marking Technology", Bulletin of the Society of Electrophotography of Japan, vol. 35, No. 3, 1996, pp. 148–154.

Hotta et al, "Laser Recording on Thermorewritable Marking Media", Bulletin of the Society of Electrophotography of Japan, vol. 35, No. 3, pp. 168–174.

Ugajin, "Rewritable Magnetic Recording Medium", The Annual Conference of Japan Hardcopy of the Society of Electrophotography of Japan, (76th), Jul. 10–12, 1996, pp. 69–72.

Takayama, et al, Rewritable Marking Medium Using Leuco Compound, Bulletin of the Society of Electrophotography of Japan, vol. 35, No. 3, 1996, pp. 155–161.

Primary Examiner—William L. Sikes
Assistant Examiner—Tarifur R. Chowdhury
(74) Attorney, Agent, or Firm—Nixon & Vanderhye P.C.

(57) ABSTRACT

A device main body is formed portable, which includes (i) an information writing/erasing section which erases information recorded in a liquid crystal paper and returns the liquid crystal paper into an initialized state in which information recording is possible, and records information previously stored in the device main body into the initialized liquid crystal paper as required, and (ii) a sheet holding section which holds the liquid crystal paper in such a manner that the liquid crystal paper can be transported to an information erasure position and an information recording position in the information writing/erasing section and that the liquid crystal paper is curved at portions thereof other than those at which information recording and erasing is carried out. With this, it is possible to provide an information recording device with improved operability, such as improved portability and capability of easily reading out information at any place.

20 Claims, 33 Drawing Sheets

U.S. PATENT DOCUMENTS

| | | | |
|---|---|---|---|
| 4,194,833 A | | 3/1980 | Lester et al. ................. 345/168 |
| 4,702,945 A | * | 10/1987 | Etzbach et al. ................. 428/1 |
| 4,965,591 A | * | 10/1990 | Kurabayashi et al. ........ 346/108 |
| 5,130,728 A | | 7/1992 | Goto et al. ................. 354/105 |
| 5,234,737 A | * | 8/1993 | Ueno et al. ................... 428/64 |
| 5,254,382 A | * | 10/1993 | Ueno et al. ................... 428/64 |
| 5,353,247 A | | 10/1994 | Faris .......................... 365/108 |
| 5,666,578 A | | 9/1997 | Oikawa et al. ............. 396/319 |
| 5,688,574 A | * | 11/1997 | Tamura et al. ............. 428/64.1 |
| 5,742,856 A | | 4/1998 | Izukawa ...................... 396/319 |
| 5,825,985 A | | 10/1998 | Asai et al. ................... 395/108 |
| 5,866,284 A | | 2/1999 | Vincent ....................... 430/37 |
| 5,896,159 A | | 4/1999 | Masubuchi et al. ......... 347/194 |
| 5,905,922 A | | 5/1999 | Kido et al. .................. 396/319 |
| 5,983,028 A | | 11/1999 | Sato ............................ 396/30 |
| 5,983,039 A | | 11/1999 | Aoki ........................... 396/429 |
| 6,023,590 A | | 2/2000 | Abe et al. ................... 396/429 |
| 6,048,110 A | | 4/2000 | Szajewskim et al. ....... 396/575 |

\* cited by examiner

NOT SUSPENDED

DISTINCTION SIGNAL A

SUSPENDED AFTER A SET PERIOD

DISTINCTION SIGNAL B

NOT SUSPENDED

DISTINCTION SIGNAL C

IMMEDIATELY SUSPENDED

DISTINCTION SIGNAL D

RECORDING MEDIUM INCLUDING LIQUID CRYSTAL LAYER

This is a divisional of application Ser. No. 09/345,950, filed Jul. 1, 1999, now U.S. Pat. No. 6,269,225, the entire content of which is hereby incorporated by reference in this application.

FIELD OF THE INVENTION

The present invention relates to an information recording device which records and erases information with respect to a recording medium sheet on which information such as characters and images can be rewritten.

BACKGROUND OF THE INVENTION

Conventionally, paper is widely used as a medium on which information such as images and characters is recorded. The use of paper as information recording medium leads to advantages as follows; information recorded can be viewed all together at once; a plurality of sheets of paper carrying information thereon can be placed side by side so that the information thereon are glanced; and a great degree of freedom is allowed regarding, for example, a place to view the information. The sheets of paper on which information is recorded, however, are disposed upon update of information since rewriting of information thereon is bothersome. This causes exhaustion of resources such as timber resources which are raw materials of paper, as well as an increase in discharge of carbon dioxide, thereby leading to an increase in environmental loads.

Further, CRT display devices and liquid crystal display devices may be cited as examples of information display means for displaying information such as images and characters. Since information displayed on such display devices is easily rewritten or erased, the display devices have an advantage that rewriting of information can be performed repeatedly. The CRT display devices, however, have an drawback in that working on the CRT display devices tire eyes of the users, while the liquid crystal display devices have insufficient resolution, as compared with the resolution in the case where information is recorded on paper.

Therefore, recording media which possess advantages of paper and on which image information is rewritten repeatedly, as is on a display device, have been sought for. An example of an image recording device for use with such a recording medium on which image information is rewritable is disclosed by the Japanese Publication for Laid-Open Patent Application No. 67141/1994 (Tokukaihei 6-67141 (date of publication: Mar. 11, 1994)).

With the image recording device disclosed by the foregoing publication, a recording medium sheet arranged as follows is used: organic or inorganic protective films are provided on surfaces of both sides of such an optical modulation member as a compound film made of a high-molecular material and a low-molecular liquid crystal or a compound film made of a high-molecular liquid crystal and a low-molecular liquid crystal. In other words, the foregoing image recording device performs the writing and erasure of information with respect to the foregoing recording medium sheet by changing an alignment state of liquid crystal of the recording medium sheet by application of an electric field thereto.

Here, the following description will explain a process of the writing and erasure of information performed by the foregoing image recording device, while referring to FIG. 45.

First, initialization of a recording medium sheet 501 is carried out as follows. The recording medium sheet 501 is caused to go through between two rolls 512a and 512b which are connected to an initialization power source. Here, a high frequency voltage, or alternatively, a charge or voltage which has a polarity opposite to that of a charge or voltage with that image information is written in the recording medium sheet 501, is applied to the recording medium sheet 501, whereby the information is erased and initialization is achieved.

Thereafter, the recording medium sheet 501 is caused to go through between a drum 502 and a transfer roller 506 so that an electric charge or voltage pattern is applied to the recording medium sheet 501. With this, information is written therein. Prior to that, a surface of an organic photosensitive body 503 of the drum 502 has been kept in a state of being charged with negative electric charges by use of a corona charger 505, while light of a pattern corresponding to character or image information has been projected by a light projecting unit 504 to the same surface, so that an electric charge pattern corresponding to the character or image information is preparatorily formed thereon.

Then, for elimination of electric shocks, the recording medium sheet 501 in which the information is written is caused to go through between two discharge-use rolls 508a and 508b so that electric charges are removed, and thereafter, the recording medium sheet 501 is ejected.

The recording medium sheet 501 is formed in a film form with a thickness of about 0.1 mm, made of a plastic, and arranged so that information such as characters and images is rewritten and erased repeatedly as well as that an optical modulation member constituting the recording medium sheet 501 has a property as a memory thereby being capable of storing information written therein for a long time.

As described above, the information recording by using the conventional recording medium sheet 501 is characterized by maintaining advantages of paper while being capable of repeatedly rewriting image information as is the case with the display devices.

Regarding the foregoing recording medium sheet, however, its size is limited, depending on a size of an image recording device. In the case where much information is recorded, therefore, a plurality of recording medium sheets are needed. More specifically, to view volumes of information, it is necessary to compile the recording medium sheets all together, since information such as characters or images is individually recorded on each recording medium sheet. Therefore, what is obtained as a result of compilation is very bulky as reference, with no difference from a conventional book.

Moreover, since the foregoing recording medium sheet is made of a plastic sheet as a component thereof, such reference composed of a plurality of the recording medium sheets becomes heavier than paper one, and inconvenient for carrying.

Besides, whenever information recorded on the recording medium sheet is to be rewritten, access to an image recording device such as a copying machine or a printer is required, resulting in an inconvenience that information cannot be recorded at any desired place.

Furthermore, the Japanese Publication for Laid-Open Patent Application No. 48604/1998 (Tokukaihei 10-48604 (date of publication: Feb. 20, 1998)) discloses an advertisement-use medium in which information is repeatedly rewritten. The advertisement-use medium is made of a liquid crystal/polymer compound film with dispersed smectic liquid crystal in a polymer matrix, and erasure and rewriting of information recorded therein is carried out by application of heat or an electric field to the compound film. According to the foregoing publication, the advertisement-use medium may be used as an advertisement-use panel placed at a desired position in a train, a bus, or the like.

To change the advertisement, the foregoing advertisement-use medium is wound and taken into a winding device, while information recorded on the advertisement-use medium is erased by use of an erasing unit provided beside the winding device. Then, the winding device is displaced, and a writing unit provided beside the winding device is connected to an information source, so that character information is obtained from the information source. Thereafter, the advertisement-use medium is pulled out of the winding device, while the information is outputted from the writing unit to the advertisement-use medium. The winding device in a state in which the advertisement-use medium is pulled out therefrom is fitted at a predetermined display position in a train, a bus, or the like, so that the advertisement is displayed.

Thus, there have been drawbacks in that it is necessary to displace the entire winding device, to change the advertisement, i.e., to rewrite information, and besides, that new information to be recorded is obtained only at a place where an information source is located.

SUMMARY OF THE INVENTION

An object of the present invention is to provide an information recording device with portability and improved operability, for example, capability of easily recording information at a desired place.

To achieve the foregoing object, the information recording device of the present invention, which is an information recording device for use with a recording medium sheet to which information can be recorded and erased, comprises a device main body which is portable, and which includes (1) a memory section for storing information to be recorded in the recording medium sheet, (2) at least one information recording and erasing section for erasing information recorded in the recording medium sheet to return the recording medium sheet to an initialized state in which recording information is possible, and for recording, as required, information stored in the memory section with respect to the recording medium sheet in the initialized state, and (3) a sheet holding section for holding the recording medium sheet in a manner such that the recording medium sheet can be transported to an erasure position at which information is erased by the information recording and erasing section, and to a recording position at which information is recorded by the information recording and erasing section.

With the foregoing arrangement, the device main body of the information recording device is portable and includes a memory section for storing information, an information recording and erasing section for recording and erasing information, and a sheet holding section for holding the recording medium sheet.

The foregoing information recording and erasing section erases information recorded in the recording medium sheet so as to return the recording medium sheet to an initialized state in which information recording is possible, and records information stored in the memory section in the recording medium sheet. Therefore, the foregoing device is capable of repeatedly rewriting information in the recording medium sheet.

Conventionally, there was a case where information rewritable recording medium sheets were used as advertisement-use media placed at predetermined positions in trains, buses, or the like. Since the advertisement-use media were exclusively used for advertisement in vehicles, there was no need to rewrite information in the advertisement-use medium, that is, the recording medium sheets, at any place at any time.

Therefore, there was no need to provide each advertisement-use medium with a mechanism for storing information. To rewrite information, the advertisement medium was wound and taken in a winding device where information erasing was conducted, and the winding device was detached so that information was supplied to the advertisement-use medium at a different place, then the medium was returned to the predetermined place so as to be exhibited.

If the medium is used for other purposes, however, greater advantage can be enjoyed in the case where information can be rewritten at any place at any time. Or to state differently, the information recording device can be used for a variety of purposes if the device is capable of easily rewriting information without limitation on the place and the time.

Therefore, in the information recording device of the present invention, as described above, the device main body is arranged so as to be portable, and a memory section for storing information to be recorded in the recording medium sheet is provided. Therefore, it is possible to read out information from the memory section and display it on the recording medium sheet whenever necessary, and the user is allowed to record information in the recording medium sheet and view it at any place at any time.

Furthermore, since information recorded is rewritable with use of the information recording and erasing section, massive information can be read with use of one recording medium sheet, thereby resulting in reduction of used recording medium sheets in number.

Furthermore, in the information recording device, the sheet holding section may hold the recording medium sheet in a manner such that the recording medium sheet is curved at portions thereof other than those at which information recording and erasing is carried out.

With the foregoing arrangement, a space required for holding the recording medium sheet can be made smaller, since the sheet holding section holds the recording medium sheet in a curved state. As a result, the device main body can be made smaller in size.

Furthermore, in the foregoing information recording device, there may be provided (1) a transport path for guiding the recording medium sheet to the erasure position and the recording position, (2) a plurality of the information recording and erasing section disposed along the transport path, and (3) two openings through which the recording medium sheet is brought in and out, the openings being provided at ends of the transport path on an upper part and a lower part of a same surface of the device main body, and the device main body may be arranged so that the sheet holding section holds the recording medium sheet in a manner such that the recording medium sheet is curved at portions thereof other than those at which information recording and erasing is carried out.

With the foregoing arrangement, information erasing and recording can be carried out while the recording medium sheet is transported in one direction along the transport path, since there are provided a plurality of information recording and erasing sections.

Accordingly, since information rewriting can be carried out with respect to the recording medium sheet during a period since the recording medium sheet is brought into the device main body from outside through one opening until it is brought to outside the device main body through the other opening, the information rewriting can be more speedily performed as compared with the case where the recording medium sheet in an initialized state is once housed in the device main body and information recording is carried out when the recording medium sheet is discharged.

Moreover, since the openings are provided in an upper part and a lower part of one and same surface of the device main body, respectively, it is possible to conduct the bringing-in and -out of the recording medium sheet on the one and same surface. Therefore, a space required for the use of the device can be made smaller.

Furthermore, in the foregoing information recording device, the device main body may be arranged so that the recording medium sheet held by the sheet holding section is brought in and out in a spread state.

With the foregoing arrangement, the recording medium sheet can be used without curving it, since the device main body is arranged so that the bringing-in and -out of the recording medium sheet can be performed with the device main body kept in a spread state. As a result, there is substantially no possibility of the recording medium sheet becoming curved and damaged during the bringing-in and -out operation.

Besides, since it is possible to record information with respect to the recording medium sheet in a spread state and display the information in the same state as well as the device main body is portable, it is possible to used the information recording device as if using a book.

Moreover, since necessary information is stored in the memory section, information rewriting by the information recording and erasing section at any place is possible, thereby resulting in that the information recording device is more convenient than conventional books.

For a fuller understanding of the nature and advantages of the invention, reference should be made to the ensuing detailed description taken in conjunction with the accompanying drawings.

BRIEF DESCRIPTION OF THE DRAWINGS

FIGS. 7(a) and 7(b) are a side view and a plan view, respectively.

FIGS. 8(a) and 8(b) are a side view and a plan view, respectively.

FIGS. 9(a) and 9(b) are a front view and a schematic cross-sectional view, respectively.

FIGS. 10(a) and 10(b) are a front view and a schematic cross-sectional view, respectively.

FIGS. 13(a), 13(b), and 13(c) are a side view, a rear view, and a front view, respectively.

FIGS. 29(a) is a perspective view while 29(b) is a schematic cross-sectional view of FIG. 29(a).

FIG. 40(a) is a schematic cross-sectional view of a recording medium sheet corresponding to a thermal heater as writing means, while FIG. 40(b) is a schematic cross-sectional view of a recording medium sheet corresponding to a laser as writing means.

FIG. 44(a) is a schematic cross-sectional view illustrating a state just after the formation of the recording medium sheet, FIG. 44(b) is a schematic cross-sectional view illustrating an erased state, and FIG. 44(c) is a schematic cross-sectional view illustrating a written state.

DESCRIPTION OF THE PREFERRED EMBODIMENTS

First Embodiment

The following description will explain an embodiment of the present invention while referring to FIGS. 1 through 26.

First of all, prior to description of an information recording device in accordance with the present invention, a recording medium sheet for use with the information recording device will be described below. The description will explain liquid crystal paper 11 as a recording medium sheet which uses liquid crystal as a recording medium, as shown in FIG. 2.

Figure 2:
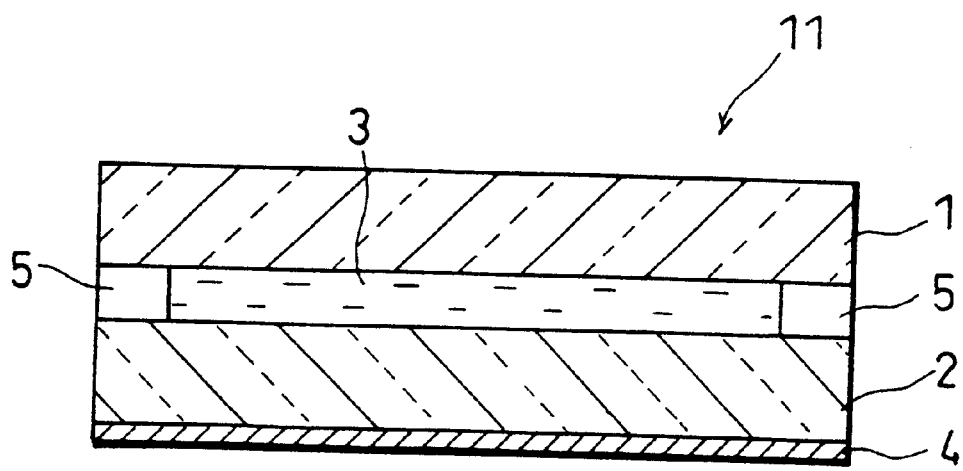
FIG. 2 is a schematic cross-sectional view of liquid crystal paper as a recording medium sheet for use in the information recording device shown in FIG. 1.

The liquid crystal paper 11 is arranged as follows: as shown in FIG. 2, a liquid crystal layer 3 is provided between a pair of protective layers 1 and 2, and a conductive layer 4 is formed on an external surface (a surface opposite to a surface facing the liquid crystal layer 3) of the protective layer 2. The protective layers 1 and 2 are caused to adhere to each other at a periphery of the liquid crystal layer 3 with an adhesive applied thereto so that liquid crystal is sealed between the protective layers 1 and 2. The adhesive thus applied constitutes an adhesive layer 5 between the protective layers 1 and 2.

Each of the protective layers 1 and 2 is composed of a thin film sheet made of PET (polyethylene terephthalate). Note that only at least one of the protective layers 1 and 2 may be made of a transparent resin such as PET, and the other is not necessarily made of a transparent resin.

To form the liquid crystal layer 3, for example, either (i) low-molecular cholesteric liquid crystal material, or (ii) a composite material of a high-molecular material and cholesteric liquid crystal, is used.

As examples of the above (i), a cholesteric liquid crystal composed of a cholesterol derivative, and a chiral nematic liquid crystal which is obtained by appropriately adding a chiral dopant to a nematic liquid crystal, may be cited.

As the nematic liquid crystal, E7, E48, E8, E44, M48, or the like produced by Merck, Ltd. may be used. As the chiral dopant, CE2, CB15, CN, S-811 or the like produced by Merck, Ltd. may be used.

As examples of the above (ii), an acrylic resin and a liquid crystal exhibiting a cholesteric phase are used for the high-molecular material and the liquid crystal, respectively.

The conductive layer 4 formed on the external surface of the protective layer 2, out of the protective layers 1 and 2 sandwiching the liquid crystal layer 3 made of the foregoing liquid crystal material, is aimed to ensure a potential difference between the protective layers 1 and 2, and is composed of, for example, a transparent conductive film made of such a material as ITO (indium tin oxide). Incidentally, the conductive layer 4 is not necessarily indispensable in the case where the protective layer 2 is caused to firmly adhere to an earth-side electrode. Further, the conductive layer 4 may be formed between the protective layer 2 and the liquid crystal layer 3.

Though not being shown, a coloration layer may be provided between the conductive layer 4 and the protective layer 2, for enhancement of contrast. The coloration layer may be appropriately set, depending on what color combination display is conducted, taking the liquid crystal used in the liquid crystal layer 3 into consideration.

The conductive layer 4 may be colored so that the conductive layer 4 serves as the coloration layer as well, while the conductive layer 4 may be connected to an electrode on the ground side.

To form the adhesive layer 5, for example, an epoxy resin or an acrylic resin may be used.

Figure 3:
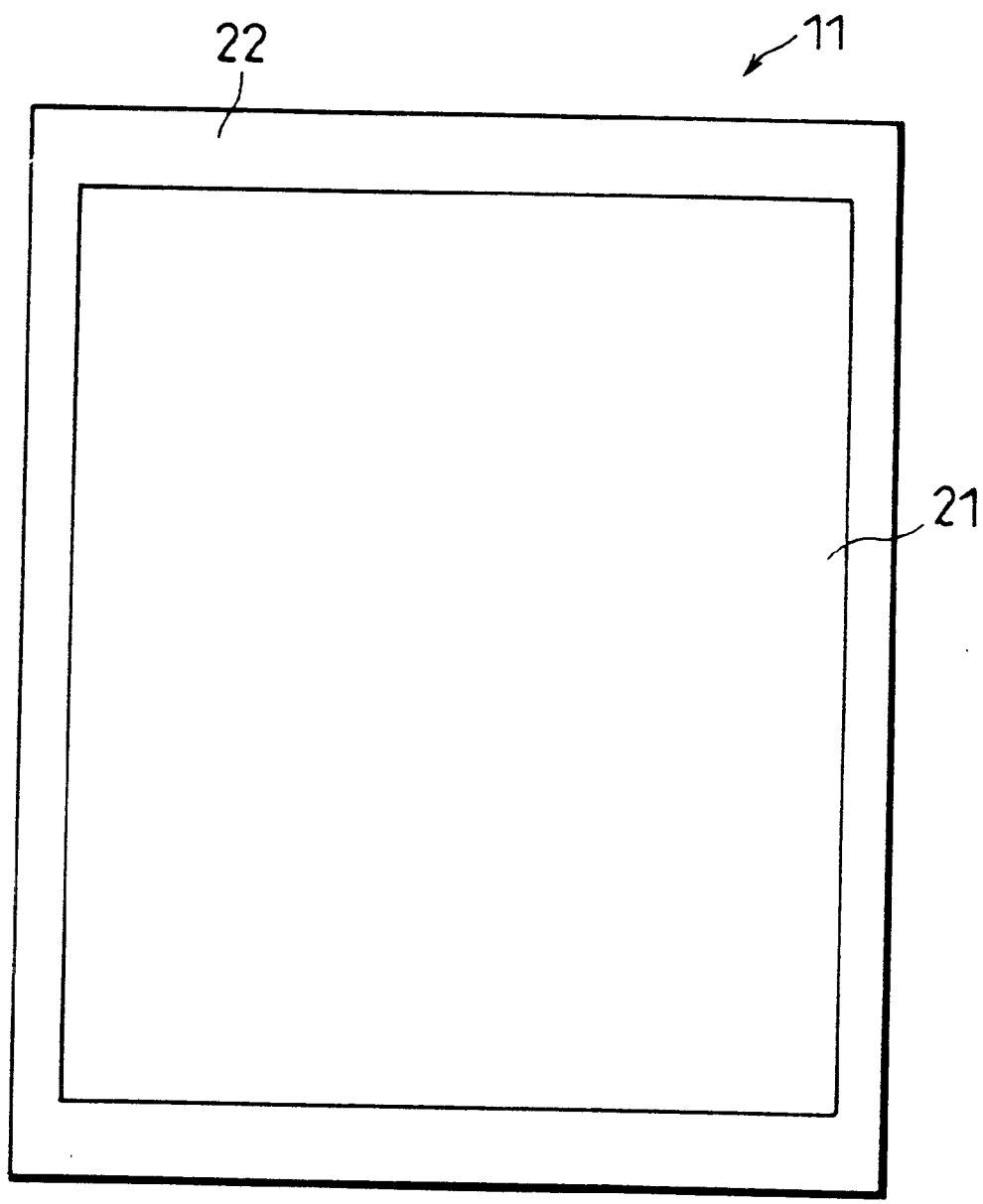
FIG. 3 is a plan view illustrating liquid crystal paper as a recording medium sheet for use in the information recording device shown in FIG. 1.

The liquid crystal paper 11 arranged as described above has an information-display region 21 in which information such as characters and images is written and a non-information-display region 22 in which information is not written, as shown in FIG. 3. In other words, the information-display region 21 corresponds to a region of the liquid crystal paper 11 in which the liquid crystal layer 3 is provided, while the non-information-display region 22 corresponds to a region (sealing section) of the liquid crystal paper 11 in which the adhesive layer 5 is provided.

Thus, in the liquid crystal paper 11, the information-display region 21 is made to account for a considerably greater proportion as compared with the non-information-display region 22, whereby much information can be recorded in one liquid crystal paper 11.

When a writing operation is conducted with respect to the foregoing liquid crystal paper 11 by information recording means (writing electrode) in an information recording device which will be described later, a voltage applied varies with a thickness of each of the protective layers 1 and 2, properties of the liquid crystal, and the like.

For example, by forming the liquid crystal layer 3 with a chiral nematic liquid crystal (mixture of E7 and S-811 at a ratio of 9:1) to a thickness of 10 $\mu$m, the following states can be obtained by varying the voltage applied. When a DC 30V is applied as an initialization voltage to the liquid crystal layer 3, the liquid crystal material of the liquid crystal layer 3 becomes in a homeotropic state (in which liquid crystal molecules are perpendicularly aligned), and when the voltage is abruptly changed to 0V, it becomes in a twist planar state with transparency (in which light with a certain wavelength is selectively reflected).

Likewise, when a DC 10V is applied as a writing voltage to the liquid crystal layer 3, the liquid crystal material of the liquid crystal layer 3 becomes opaque in a focal conic state. The liquid crystal material exhibits bistability, becoming stable in both the twist planar state and the focal conic state, and maintains the respective states even after the application of the respective voltages is suspended. Here, since the liquid crystal layer 3 is arranged so that the wavelength selected for reflection in the twist planar state falls in the infrared range, a black-and-white display can be obtained by providing a coloration layer in black underneath.

Next, the following description will explain an information recording device for conducting writing and erasure of information with respect to a recording medium sheet. Note that the following description will explain a case where the recording medium sheet is a sheet using liquid crystal as recording medium, i.e., a case where the foregoing liquid crystal paper 11 is used as the recording medium sheet.

Figure 1:
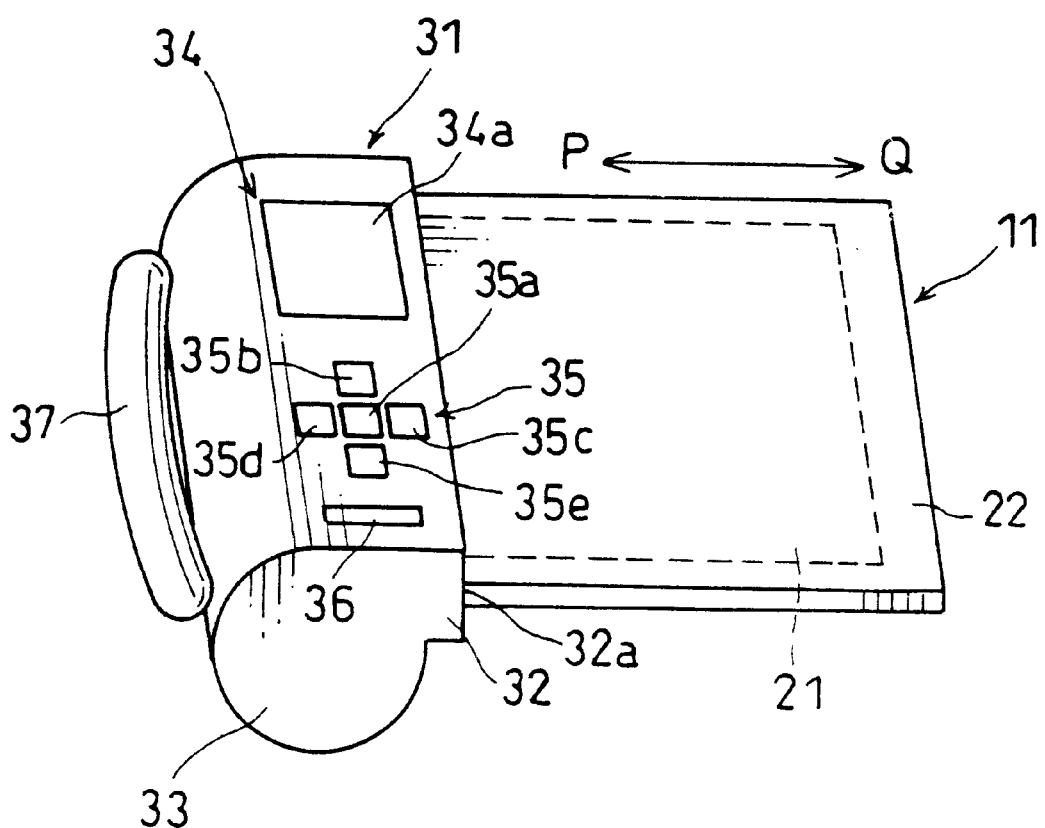
FIG. 1 is a perspective view illustrating a schematic arrangement of an information recording device of the present invention.

The information recording device includes a device main body 31 which supports the liquid crystal paper 11 in such a manner as allowing the liquid crystal paper 11 to slide in arrow P–Q directions, while which is arranged so as to be portable, as shown in FIG. 1. The device main body 31 is arranged so as to guide the liquid crystal paper 11 to inside of itself, to conduct erasure or recording (writing) of information with respect to the liquid crystal paper 11. The user sees information written in the liquid crystal paper 11, in a state in which the liquid crystal paper 11 is pulled out of the device main body 31 in the arrow Q direction.

In the device main body 31, an information write/erase section 32 for writing/erasing information with respect to the liquid crystal paper 11, and a sheet-housing section (sheet holding means) 33 for housing the liquid crystal paper 11 in a curved state, are integrally provided.

The information write/erase section 32 is arranged so as to erase information written in the liquid crystal paper 11 when the liquid crystal paper 11 is being housed in the sheet housing section 33, and to write information in the liquid crystal paper 11 when the liquid crystal paper 11 housed in the sheet housing section 33 is pulled therefrom.

The sheet housing section 33 holds the liquid crystal paper 11 in a manner such that the liquid crystal paper 11 remains transportable to an erasure position at which information is erased by the information write/erase section 32 as well as to a recording position at which information is written by the same.

Furthermore, a display section 34, an operation section 35, and a power supply section 36 are provided on a portion of a surface of the device main body 31 corresponding to the information write/erase section 32, while a handle 37 is provided on a portion of a surface of the device main body 31 corresponding to the sheet housing section 33.

Thus, since respective sections indispensable to recording and erasure of information with respect to the liquid crystal paper 11 are provided on the surface of the device main body 31, the, device main body 31 can be moved to a desired place, and recording and erasure of information can be carried out with respect to the liquid crystal paper 11 at the same place.

Besides, since the handle 37 is provided on the surface of the device main body 31, the user can grip the handle 37 in transport of the device main body 31. Thus, provision of the handle 37 facilitates the transport of the device main body 31, i.e., the information recording device. Furthermore, in a state in which the liquid crystal paper 11 is out of the device main body 31, the liquid crystal paper 11 is easily held, by gripping respective edges of the device main body 31 and the liquid crystal paper 11.

A liquid crystal panel 34a of a touch panel type which has been conventionally used is adapted so as to be used as the display section 34, and an operation menu showing a variety of operation information relating to the recording and erasure of information with respect to the liquid crystal paper 11 is displayed on the liquid crystal panel 34a. The user is allowed to conduct a desired operation only by touching desired one of items in the operation menu shown on the liquid crystal panel 34a. Note that the liquid crystal panel 34a may be of a conventional pen input type, other than of such a touch panel type as the user directly touches with the finger.

In the operation section 35, there are provided a power source key 35a for conducting ON/OFF of the power source of the information recording device, as well as a "reproduction" key 35b, a "next" key 35c, a "pull-back" key 35d, and a "stop" key 35e which are keys for instruction with respect to the liquid crystal paper 11.

By operating the "reproduction" key 35b, information recorded in the device main body 31 is reproduced, and is recorded in the liquid crystal paper 11.

Furthermore, by operating the "next" key 35c, the liquid crystal paper 11 in which information is recorded is pulled back in the arrow P direction (toward the device main body 31) so that information is erased, and after all the information is erased, the liquid crystal paper 11 is sent out in the arrow Q direction, so that new information is recorded. By operating the "pull-back" key 35d, the liquid crystal paper 11 sent out is pulled back into the device main body 31.

Then, by operating the "stop" key 35e, the operation of the device main body 31, that is, the sending-out, the pulling-back, or the recording/erasing operation with respect to the liquid crystal paper 11, is stopped.

Furthermore, by providing only the power source key 35a in the operation section 35, and allotting areas of the display section 34 to the other keys respectively so that respective operations are commanded by pen input or the like with the use of the areas, the operation section 35 can be further simplified. In this case as well, the liquid crystal panel 34 composed of a conventional touch panel may be adapted so as to be used as the display section 34.

The foregoing power supply section 36 is a power source for causing the information recording device to operate. In this case, the power supply section 36 is preferably composed of a battery which is detachably provided in the device main body 31 so as to be portable. Note that the power supply section 36 may be arranged so that an AC adapter can be connected thereto, in order to use an AC power source.

The handle 37 provided to the device main body 31 is aimed to prevent the user from dropping the device while operating the same. The handle 37 may have a function of adjusting the length of itself, and may be arranged so as to be detachable. Further, it may be made of a material that makes the handle 37 be fitted with the user's grip.

The sheet housing section 33 in a substantially cylindrical shape is provided in the vicinity of a part of the device main body 31 at which the handle 37 is provided. In the case where the liquid crystal paper 11 is housed in the sheet housing section 33, the liquid crystal paper 11 is housed therein, with a portion thereof other than the portion thereof to which information is to be written/erased by the information write/erase section 32 being kept in a curved state. Incidentally, a concrete system for housing the liquid crystal paper 11 in the sheet housing section 33 in a curved state will be described later.

Here, the following description will explain a structure of the foregoing information write/erase section 32 and the sheet housing section 33 in more detail.

First of all, the following description will explain the information write/erase section 32.

Figure 4:
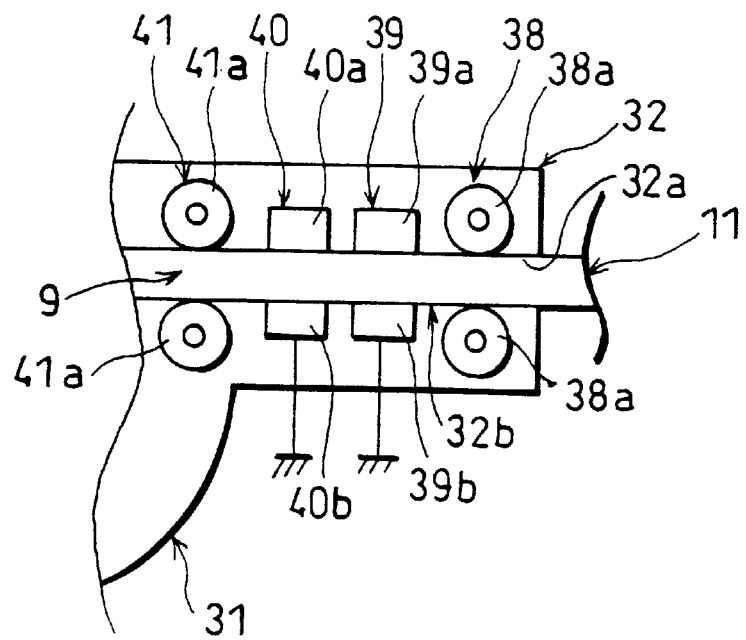
FIG. 4 is a schematic cross-sectional view of a device main body of the information recording device shown in FIG. 1.

As shown in FIG. 4, the information write/erase section 32 is provided with (i) an opening 32a through which the liquid crystal paper 11 is sent (discharged, transported) to outside, and (ii) a sheet transport path 32b for guiding the liquid crystal paper 11 brought in through the opening 32a to information recording/erasure positions (recording position and erasure position).

Inside the information write/erase section 32, there are provided cleaning means 38, initializing means 39, information recording means 40, and driving means 41, along the sheet transport path 32b in this order from the opening 32a side.

The cleaning means 38, the initializing means 39, the information recording means 40, and the driving means 41, as well as the device body, are arranged so that the surfaces thereof which face a surface of the liquid crystal paper 11 substantially constitute one and same plane. With this arrangement, a guiding space 9 which allows the liquid crystal paper 11 to be stably transported can be formed.

The cleaning means 38 is composed of a pair of conductive or semi-conductive rollers 38a which are vertically aligned and each of which extends in a width direction of the liquid crystal paper 11. The rollers 38a are arranged respectively in contact with upper and lower surfaces of the liquid crystal paper 11 transported through the opening 32a so as to remove dust and dirt on the surfaces of the liquid crystal paper 11.

The initializing means 39 is means for erasing information such as characters and images already recorded in the liquid crystal paper 11. More specifically, the initializing means 39 is composed of a voltage applying electrode 39a and a ground electrode 39b, and is arranged so that a voltage is applied to the liquid crystal paper 11 when the liquid crystal paper 11 is passing through between the two electrodes 39a and 39b so that information such as characters and images is erased The information recording means 40 is means for writing information with respect to the liquid crystal paper 11, the information being, for example, characters and images previously stored in memory means 79 (see FIG. 18) or the like. More specifically, the information recording means 40 is composed of a voltage applying electrode 40a and a ground electrode 40b, to apply a voltage to the liquid crystal paper 11 when the liquid crystal paper 11 is passing through between the electrodes 40a and 40b so that information such as characters and images is written in the liquid crystal paper 11. In other words, the aforementioned initializing means 39 and information recording means 40 constitute information recording and erasing means for recording and erasing information. Note that the memory means 79 will be described later.

As electrodes for use in the initializing means 39 and the information recording means 40, a multi-stylus-type electrode (needle electrode), a simple-matrix-type electrode, or an active-matrix-type electrode in which a TFT (thin film transistor) is used as a switching element may be used, for example.

Figure 5:
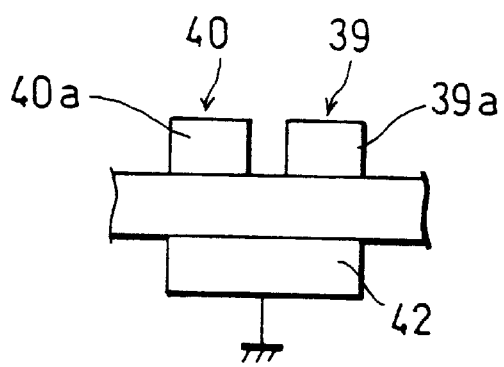
FIG. 5 is an explanatory view illustrating another examples of information recording means and initializing means incorporated in the device main body shown in FIG. 4.

Incidentally, as shown in FIG. 5, a ground electrode 42 which performs functions of both the ground electrodes 39b and 40b of the initializing means 39 and the information recording means 40 shown in FIG. 4 may be used. This case enjoys an advantage of reduction of the number of members used.

The foregoing driving means 41 is, as shown in FIG. 4, transport means for transporting the liquid crystal paper 11 to an initializing position (erasure position) of the initializing means 39 and the recording position of the information recording means 40, and is composed of a pair of rollers 41a. The rollers 41a are rotatably provided, so as to be actuated by a motor which is not shown.

Figure 6:
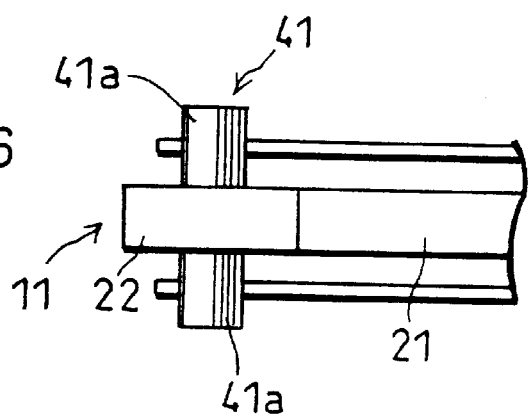
FIG. 6 is an explanatory view illustrating relationship between driving means of the device main body shown in FIG. 4 and liquid crystal paper.

The rollers 41a are arranged so as to be in contact with only the non-information-display region 22 of the liquid crystal paper 11 for transport of the liquid crystal paper 11, as shown in FIG. 6. This arrangement ensures that the liquid crystal paper 11 can be transported without pressure applied to the information-display region 21, i.e., the liquid crystal layer 3. Further, there is no possibility that the information display region 21 would be scarred by the rollers 41a.

The following description will explain the sheet housing section 33.

The sheet housing section 33 is in a substantially cylindrical shape as shown in FIG. 1, so that the liquid crystal paper 11 transported from the information write/erase section 32 is housed therein in a curved state.

The sheet housing section 33 incorporates a sheet-winding cylindrical member inside, so that the liquid crystal paper 11 is wound around the cylindrical member.

A concrete example of an arrangement wherein the liquid crystal paper 11 is housed in the sheet housing section 33 with use of the cylindrical member will be explained below.

Figure 7A:
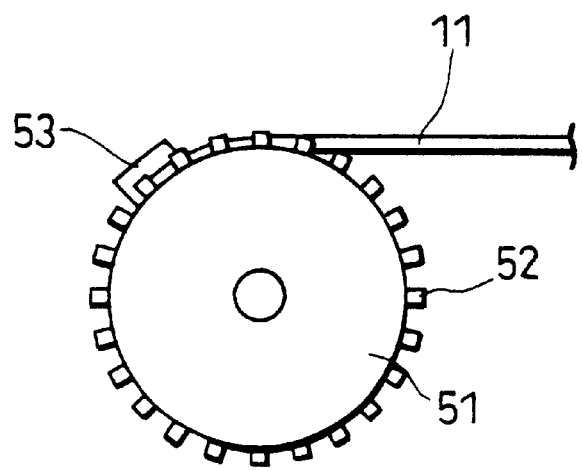
FIGS. 7(a) and 7(b) illustrate relationship between a sheet housing section provided in the information recording device shown in FIG. 1 and liquid crystal paper.
Figure 7B:
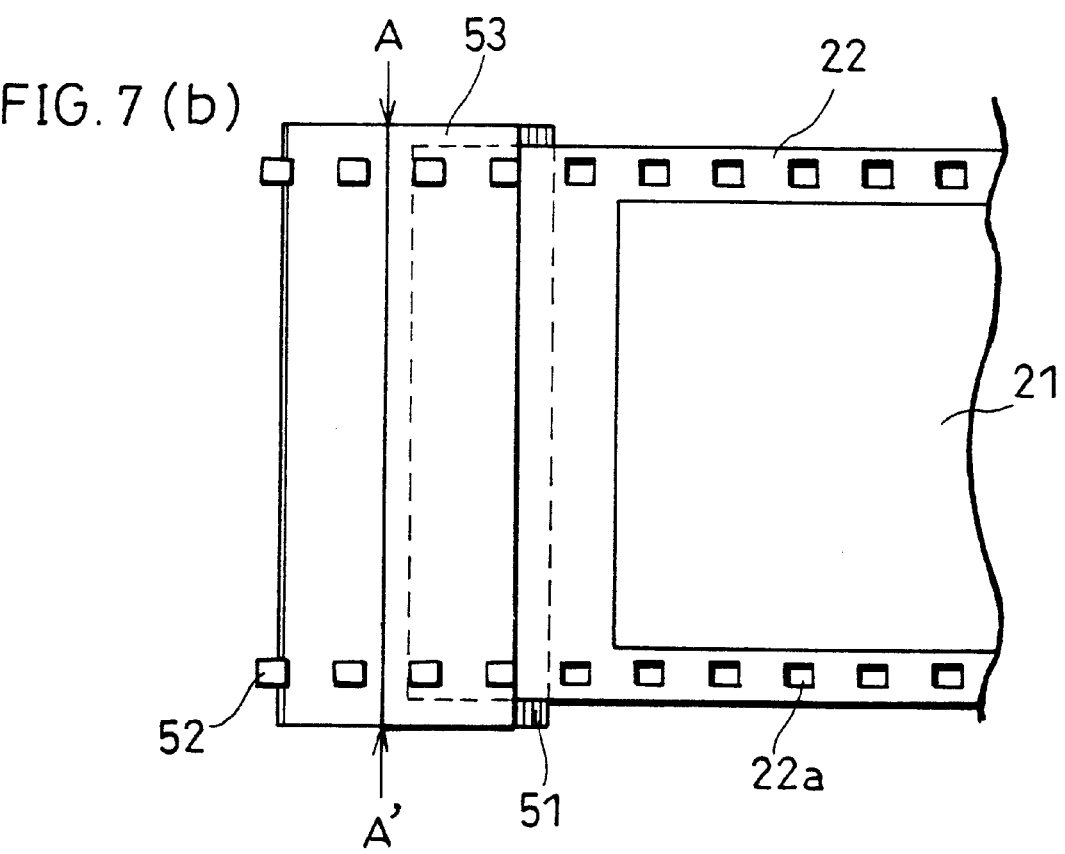
Figure 8:
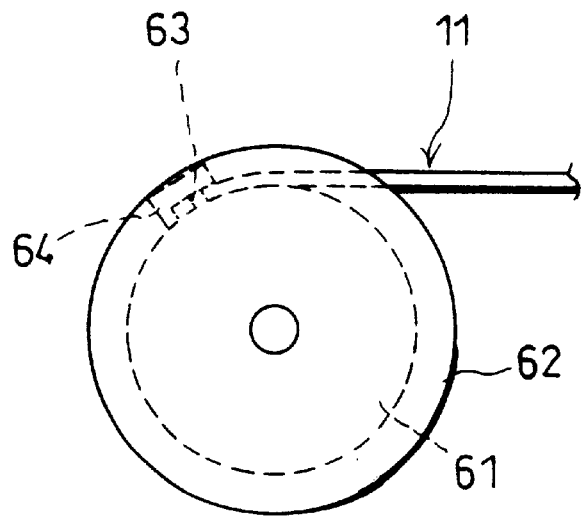
FIGS. 8(a) and 8(b) illustrate relationship between another sheet housing section provided in the information recording device shown in FIG. 1 and liquid crystal paper.
Figure 8:
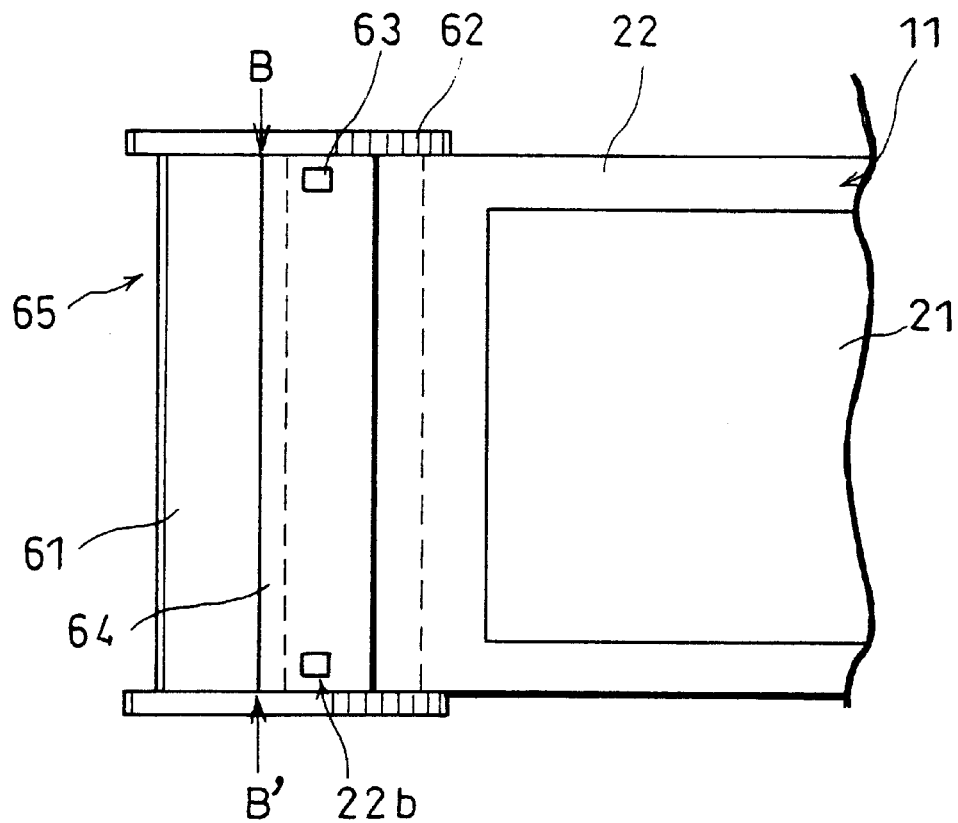

As the foregoing cylindrical member, a cylindrical member (winding means) 51 equipped with a plurality of projections 52 at its ends, as shown in FIGS. 7(a) and 7(b), is used, for example. In this case, the projections 52 are disposed on the surface of the cylindrical member 51, linearly in a rotational direction at regular spacings.

Further, in the liquid crystal paper 11, a plurality of apertures 22a in which the projections 52 of the cylindrical member 51 fit are formed in the non-information-display region 22, as shown in FIG. 7(b).

With the foregoing arrangement, the liquid crystal paper 11 is wound around the cylindrical member 51, with the apertures 22a fitted with the projections 52 of the cylindrical member 51. The projections 52 may be tapered so that the apertures 22a of the liquid crystal paper 11 easily fits therewith.

Furthermore, to fix a part of the liquid crystal paper 11 to the cylindrical member 51, a pressing member 53 is provided at a part of the cylindrical member 51. The pressing member 53 presses the liquid crystal paper 11 to the cylindrical member 51, so as to fix the liquid crystal paper 11 thereto.

The pressing member 53 is made of, for example, a plate-like member which extends in the width direction of the cylindrical member 51. The pressing member 53 is pressed to the cylindrical member 51 by energizing means such as a spring (not shown), and is pivotably provided with A–A' as fulcrum. More specifically, the pressing member 53 is pivoted in an open state when the liquid crystal paper 11 is removed. The pressing member 53 is pivoted in a closed state when the liquid crystal paper 11 is attached, so that the liquid crystal paper 11 is pressed against the cylindrical member 51.

Incidentally, the cylindrical member 51 may be arranged so that the cylindrical member 51 in a state in which the liquid crystal paper 11 is wound around the cylindrical member 51 can be detached with respect to the device main body 31. With this arrangement, it is easy to house the liquid crystal paper 11, while it is possible to prevent the liquid crystal paper 11 from becoming scarred or damaged when it is housed in or taken out of the device main body 31.

As the mechanism (winding means) of surely winding the liquid crystal paper 11 around the cylindrical member, like that described above, a cylindrical member 61 shown in FIGS. 8(a) and 8(b) may be used instead of the cylindrical member 51.

The cylindrical member 61 has a length in the lengthwise direction greater than the width of the liquid crystal paper 11, and is equipped with guide members 62 at its ends, each of the guide member 61 being in a round shape with a diameter greater than that of the cylindrical member 61. With the foregoing arrangement, a recessed portion 65 with a width at least equal to that of the liquid crystal paper 11 is provided in the vicinity of the center of the cylindrical member 61.

Further, at least one projection 63 is formed on a surface of the recessed portion 65. Here, apertures 22b are formed in the non-information-display region 22 in the liquid crystal paper 11 used herein, as shown in FIG. 8(b), so that the projections 63 of the cylindrical member 61 fit in the apertures 22b. Thus, the liquid crystal paper 11, when being attached, fits in the recessed portion 65, with the apertures 22b fitting on the projections 63.

Furthermore, a pressing member 64 is provided at a part of the cylindrical member 61 so that the liquid crystal paper 11 is fixed to the cylindrical member 61.

For example, the pressing member 64 is pressed against the cylindrical member 61 by an energizing member such as a spring, and is pivotably provided with B–B' as fulcrum. The pressing member 64 is pivoted in an open state when the liquid crystal paper 11 is removed. The pressing member 64 is pivoted in a closed state when the liquid crystal paper 11 is attached, so that the liquid crystal paper 11 is pressed against the cylindrical member 61.

As described above, an end of the liquid crystal paper 11 is fixed to the cylindrical member 61 which is rotatably supported by the device main body 31, and this means that the liquid crystal paper 11 is fixed to the device main body 31. The user is expected to, for reading information he/she needs, pull out from the device main body 31 the liquid crystal paper 11 in which information is written, and to house the liquid crystal paper 11 into the device main body 31, after finishing reading information written in the liquid crystal paper 11, or for carrying the device main body 31.

When housing or pulling out the liquid crystal paper 11 in or from the device main body 31, the handling of the liquid crystal paper 11 tends to be awkward in the case where the liquid crystal paper 11 hangs downward outside the opening 32a of the sheet transport path 32b due to its thickness or the like.

Figure 9A:
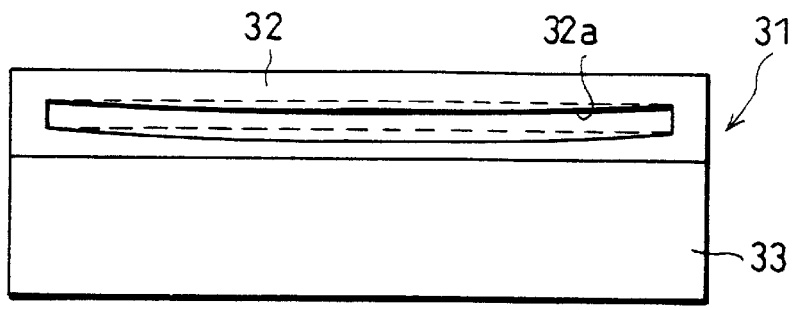
FIGS. 9(a) and 9(b) illustrate the vicinity of an opening of the device main body shown in FIG. 1.

Therefore, as shown in FIG. 9(a), the opening 32a of the information write/erase section 32 of the device main body 31 through which the liquid crystal paper 11 is sent out is so shaped as to be convex so that the center portion is recessed as compared with the edge portions. By so doing, the foregoing problem can be solved.

To be more specific, by shaping the opening 32a so as to be convex so that the center portion is recessed as compared with the edge portions, the liquid crystal paper 11 which passes the opening 32a to outside is sturdily held. This arrangement ensures that the liquid crystal paper 11 does not hang down when being pulled out of the device main body 31, and hence, the user can hold the device main body 31 with only one hand to see information written in the liquid crystal paper 11.

Figure 9B:
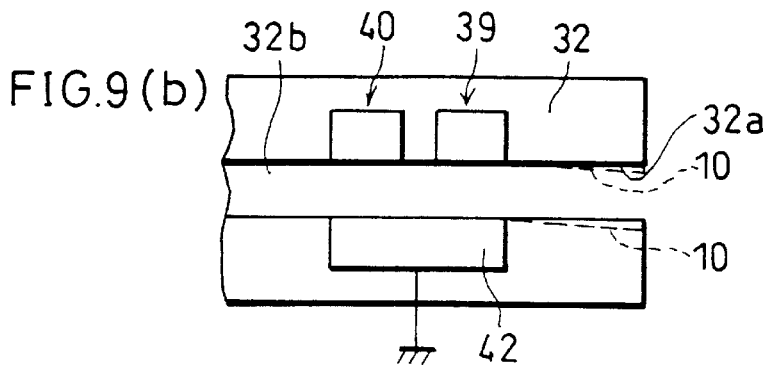

Furthermore, as shown in FIG. 9(b), in forming the opening 32a in such a convex shape as to be recessed downward at the center portion as compared with the edge portions, a portion of the sheet transport path 32b from just before the opening 32a to the opening 32a may be formed slant (hereinafter referred to as a slant part 10). In this case, the liquid crystal paper 11 can be smoothly transported.

Figure 10A:
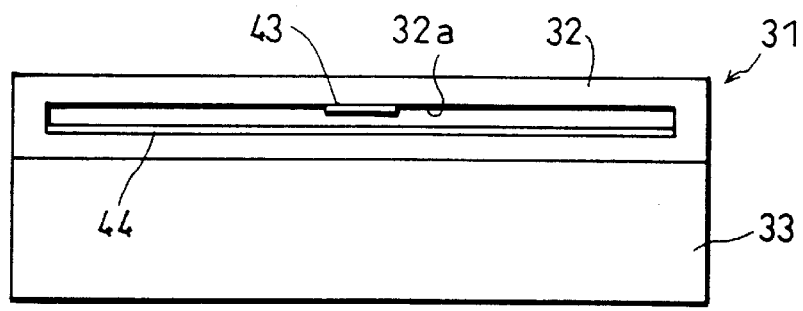
FIGS. 10(a) and 10(b) illustrate another example of the vicinity of an opening of the device main body shown in FIG. 1.

Alternatively, the opening 32a may be arranged as shown in FIG. 10(a) for the same purpose. In this arrangement, a raised portion 43 directed downward is provided at a center portion on the upper side (inner side) of the aperture 32a, and a counter member 44 with elasticity is provided at a position opposite to the raised portion 43.

The raised portion 43 is arranged so as to press the liquid crystal paper 11 in a downward direction from the upper side when the liquid crystal paper 11 is passing the opening 32a, and so as not to scar the liquid crystal paper 11. More specifically, the raised portion 43 is arranged so that a length thereof in a direction orthogonal to the transport direction of the liquid crystal paper 11 is shorter than a width of the opening 32a.

Figure 10B:
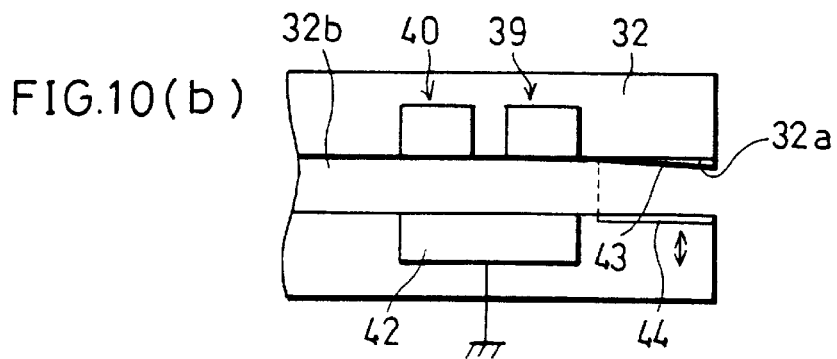

Furthermore, the raised portion 43 may be formed, as shown in FIG. 10(b), by downward slanting a portion of an upper wall of the sheet transport path 32b of the information write/erase section 32 from just before the opening 32a to the opening 32a. With this arrangement the liquid crystal paper 11 can be smoothly transported.

The counter member 44 is made of an elastic material and is extended in the width direction of the opening 32a, so as to absorb the pressing force generated by the raised portion 43 against the liquid crystal paper 11. Furthermore, a depth of the counter member 44 (a thickness of the counter member 44 in the liquid crystal paper transport direction) is set equal to that of the raised portion 43, as shown in FIG. 10(b).

Furthermore, by forming a surface portion or entire of each of the raised portion 43 and the counter member 44 with a conductive or semi-conductive material, it is possible to prevent the liquid crystal paper 11 from being charged due to friction. A substance obtained by adding a conductive material such as carbon black to a metal-ETFE (ethylene-tert-fluoroethylene copolymer)-silicone, in which the metal is aluminum or the like, may be adapted so as to be used as the conductive or semi-conductive material.

Furthermore, before housing it into the device main body 31, the following arrangement may be devised so as to support the liquid crystal paper 11 pulled out, instead of the aforementioned adjustment of the shape of the opening 32a.

Figure 11:
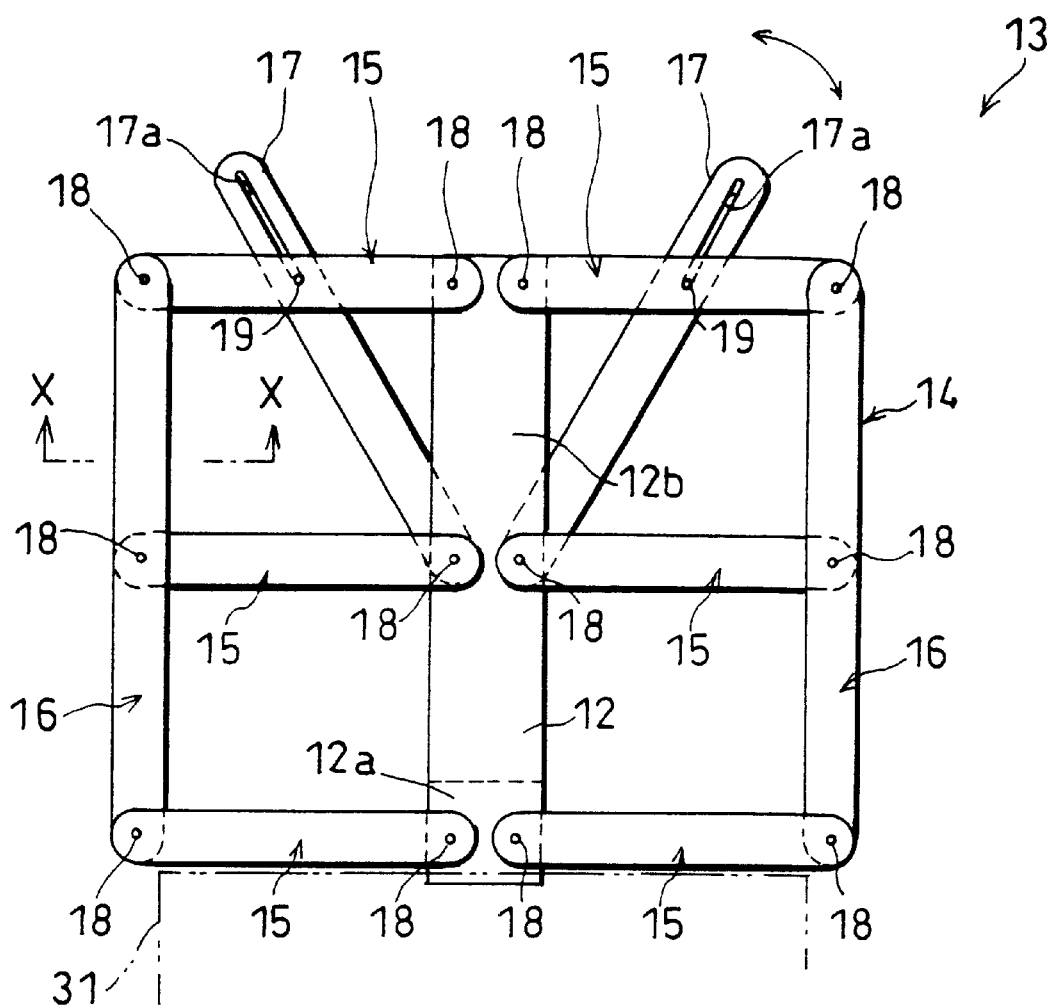
FIG. 11 is a view illustrating a schematic arrangement of a holding member for holding liquid crystal paper, the holding member being provided in the information recording device shown in FIG. 1.
Figure 12:
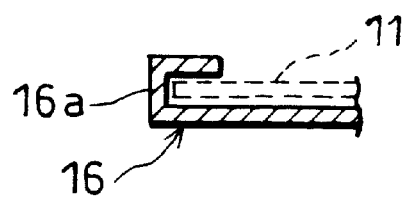
FIG. 12 is a cross-sectional view of the holding member taken along an X—X arrow line of FIG. 11.
Figure 13:
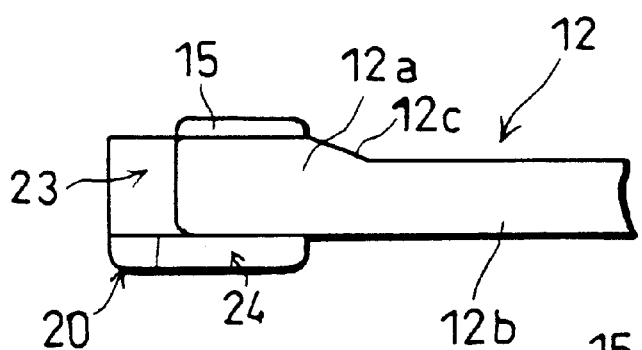
FIGS. 13(a) through 13(c) illustrate an attachment/detachment mechanism for attaching/detaching the holding member shown in FIG. 11 to/from the device main body.
Figure 13:
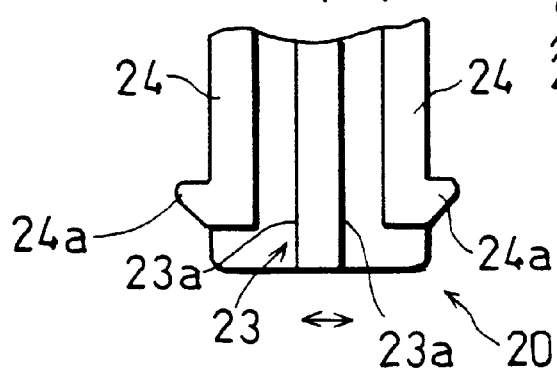
Figure 13:
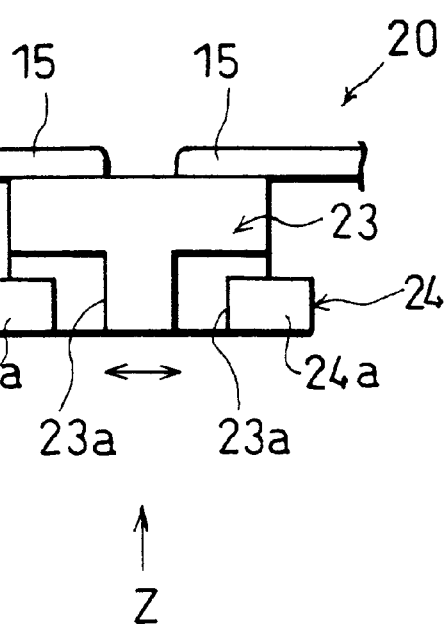
Figure 14:
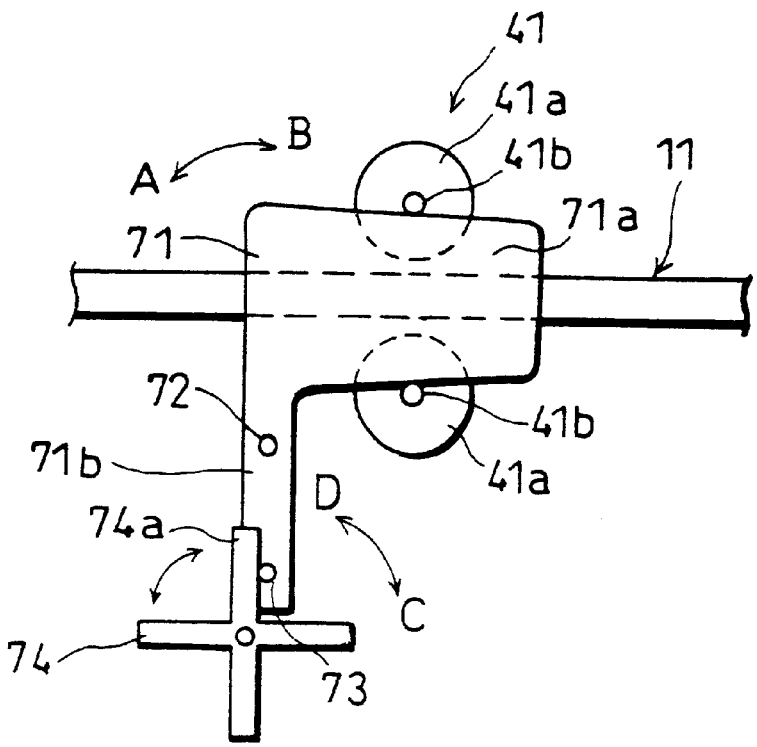
FIGS. 14(a) and 14(b) are explanatory views illustrating a mechanism for separating driving means provided in the device main body shown in FIG. 1 from liquid crystal paper.
Figure 14:
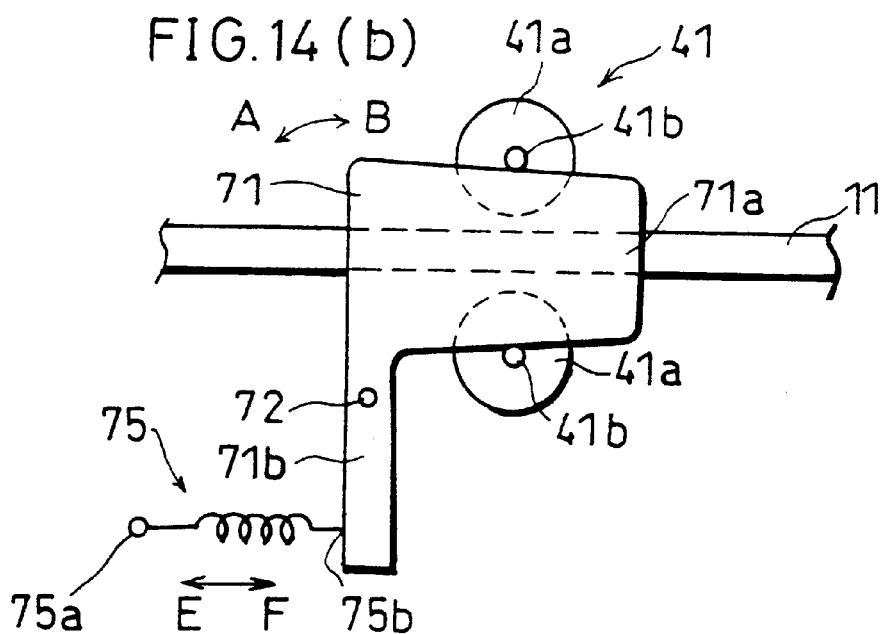

For example, as an arrangement for holding the liquid crystal paper 11 before housed or after sent out, a holding member (holding means) 13 as shown in FIG. 11 may be detachably provided on the device main body 31.

The holding member 13 is, as shown in FIG. 11, composed of a main support member 12 which is detachably provided on the device main body 31, and a frame 14 which, provided on the main support member 12, supports the liquid crystal paper 11. An attachment/detachment mechanism of the main support member 12 to/from the device main body 31 will be described later.

The frame 14, composed of six first support members 15, two second support members 16, and two third support members 17, has a foldable link-like structure.

More specifically, the six first support members 15 are arranged so that three pairs are formed with two in each pair with the main support member 16 provided therebetween, the pairs being arranged parallel with each other at regular spacings. Here, each first support member 15 is pivotably supported by the main support member 12, connected thereto with an engagement pin 18 provided at one end of the first support member 15, while it is also pivotably supported by the second support member 16, connected thereto with an engagement pin 18 provided at the other end of the first support member 15. Together with each first support member 15 constituting the second pair from the device main body 31 side, each third support member 17 is connected to the main support member 12 with one engagement pin 18 provided at one end of the third support member 17. Each third support member 17 has an opening 17a in the other end portion thereof, and is connected with an engagement pin 19 to around a center portion of each first support member 15 constituting the third pair from the device main body 31 side.

With the foregoing arrangement, the frame 14 is composed of two link structures provided on both the sides to the main support member 12, each link structure being independently moved. Therefore, by pivoting any one of the support members of each link structure in a direction indicated by an arrow in the Figure, the other support members in the same structure are also pivoted in the same direction in an interlocked manner.

The foregoing frame 14 is flexible while each engagement pin 19 provided on the first support member 15 is sliding along the opening 17a of the third support member 17. In other words, the frame 14 becomes fixed to such a shape (see FIG. 11) as to hold the liquid crystal paper 11 when each engagement pin 19 arrives at the end of each opening 17a of the third support member 17 on the device main body 31 side.

Furthermore, since the second support members 16 support the side edge portions of the liquid crystal paper 11, each second support member 16 may be formed to a shape whose cross section is substantially like "⊂" or "⊃" so as to constitute a guide member 16a for guiding the liquid crystal paper 11 with each edge portion thereof supported.

Here, the following description will explain the attachment/detachment mechanism of the holding member 13 with respect to the device main body 31. Note that in the holding member 13, the main support member 12 is detachably provided with respect to the device main body 31, the attachment/detachment mechanism of the main support body 12 will be explained below.

The main support member 12, as shown in FIG. 13(a), has fixing means 20 disposed at an end 12a of the main support member 12. The fixing means 20 is arranged so as to be fixed when being inserted and fitted into an aperture for fitting which is provided in the device main body 31.

Here, the main support member 12 is formed so that its end 12a is thicker than its main part 12b, and that a portion between the main part 12b and the end 12a is smoothly slant thereby constituting a slant part 12c. Here, a difference between the thicknesses of the end 12a and the main part 12b is set substantially equal to the thickness of the first support member 15. Specifically, the first support member 15 disposed on the end 12a is connected to the second support member 16 so that the second support member 16 comes beneath the first support member 15, and the first support member 15 disposed on the main part 12b is engaged in the second support member 16 so that the second support member 16 comes over the first support member 15.

As shown in FIG. 13(a), the provision of the slant part 12c in the main support member 12 allows the liquid crystal paper 11 sent out of the device main body 31 to be smoothly transported to a support plane of the frame 14.

The aforementioned fixing means 20 is composed of a first fixing member 23 fixed on the main support member 12 and second fixing members 24 fixed on the first fixing member 23. The first fixing member 23 is formed so as to have a substantially "T"-shaped cross section, as shown in FIG. 13(c), and spaces 23a are provided on both sides to its lower part. The second fixing members 24 are swingably provided respectively in the spaces 23a on both the sides to the lower part of the first fixing member 23, and each has a stopper 24a on its end portion, the stopper 24a projecting outward, as shown in FIG. 13(b). Incidentally, FIG. 13(b) is a view of the structure of FIG. 13(c) when seen in an arrow Z direction.

By using the holding member 13 described above, the liquid crystal paper 11 can be held without changing a shape of the opening 32a of the information write/erase section 32 of the device main body 31, or the like. Further, in the case where the device main body 31 is carried, the holding member 13 may be detached.

The rollers 41a of the driving means 41 are arranged so as to be separated away from the liquid crystal paper 11 when there is no need to carry the liquid crystal paper 11, so that influences such as pressure from the driving means 41 to the liquid crystal paper 11 are eliminated in the information write/erase section 32. The rollers 41a are pressed against the liquid crystal paper 11 side by energizing means such as a spring.

Specifically, the rollers 41a of the driving means 41 are in contact with the liquid crystal paper 11 when transporting the liquid crystal paper 11 as shown in FIG. 4, while the rollers 41a are separated away from the liquid crystal paper 11 when not transporting the liquid crystal paper 11, as shown in FIGS. 14(a) and 14(b).

More specifically, as shown in FIG. 14(a), the mechanism of separating the rollers 41a is such that a separating part 71a of a spacer 71 is inserted to between rotation shafts 41b of the rollers 41a of the driving means 41 so as to separate the rollers 41a from the liquid crystal paper 11, resisting against the force exerted by the energizing means to the rollers 41a.

The foregoing spacer 71 is composed of the separating part 71a in the upper part and a support part 71b in the lower part which are integrally provided, and the spacer 71 is arranged so as to rotate in directions indicated by arrows A and B around a fulcrum 72. The separating part 71a tapers off in the arrow B direction. As being thus arranged, the separating part 71a, when the spacer 71 rotates in the arrow B direction, presses the rotation shafts 41b upward and downward, respectively. Then, when the spacer 71 is rotated in the arrow A directions in this state, the rotation shafts 41b are made to move in directions such that the rollers 41a are brought into contact with the liquid crystal paper 11 again.

Beneath the support part 71b of the spacer 71, there is provided a rotation member 74 in a cross-like shape which is rotatable in directions indicated by arrows C and D. The rotation member 74 is driven to rotate by a motor or a driving power source (not shown).

As the rotation member 74 rotates in the arrow C direction, blades 74a of the rotation member 74 are brought into contact with an engagement pin 73 provided in a lower portion of the support part 71b, thereby rotating the spacer 71 in the arrow A direction. On the other hand, as the rotation member 74 rotates in the arrow D direction, the engagement pin 73 is pressed by the blades 74a, thereby causing the spacer 71 to rotate in the arrow B direction.

Actually, when a power source switch (not shown) of the information recording device is turned OFF, a motor (not shown) is driven in response to the signal thereby rotating the rotation member 74 at a predetermined angle. As a result, the separating part 71a of the spacer 71 is inserted between the rotation shafts 41b of the driving means 41, whereby the rollers 41a constituting the driving means 41 are separated from the liquid crystal paper 11.

When the power source of the information recording device is turned ON, an operation reverse to that when the power source is turned OFF is carried out.

As means for driving the spacer 71, apart from the foregoing rotation member 74, an extensible member 75 which is as shown in FIG. 14(b) extensible in directions indicated by arrows E and F may be considered as an adaptable example. The extensible member 75 is arranged so that an end 75a thereof on the arrow E direction side is fixed in the device main body 31, while an end 75b thereof on the arrow F direction side is fixed to the support part 71b of the spacer 71.

The foregoing extensible member 75 is made of a shape memory alloy, to utilize the following property of the same: in response to supply of electric currency the shape memory alloy expands due to a rise of temperature, while it contracts in response to suspension of electric currency. More specifically, when the power source is turned ON, the extensible member 75 expands in the arrow F direction pressing the support part 71b of the spacer 71, thereby causing the spacer 71 to rotate in the arrow A direction. With this, the separating part 71a of the spacer 71 is pulled out from between the rotation shafts 41b of the driving means 41, whereby the rollers 41a constituting the driving means 41 are separated from the liquid crystal paper 11.

When the power source is turned OFF, since the supply of electric currency to the extensible member 75 is stopped, the extensible member 75 contracts in the arrow E direction.

As a material for forming the extensible member 75, the following materials, for example, are applicable: Ti—Ni, Cu—Al—Ni, Cu—Zn, Cu—Sn, Cu—Zn—X (X=Al, Si, Sn, Ga, or the like), Cu—Au—Zn, Ni—Al, Fe—Pt, and Mn—Cu. Each metal alloy expands in response to supply of electric currency due to a rise of temperature, while contracts in response to suspension of supply of electric currency.

The information recording device thus arranged as described above is, as shown in FIG. 4, further equipped with cleaning means 38 and the like, the cleaning means 38 being disposed between the driving means 41 for transporting the liquid crystal paper 11 and the opening 32a of the information write/erase section 32. Therefore, the liquid crystal paper 11 could be excessively wound in or sent out, and in such a case, there arises a problem that the winding up or sending out of the liquid crystal paper 11 cannot be conducted by the driving means 41.

Figure 19:
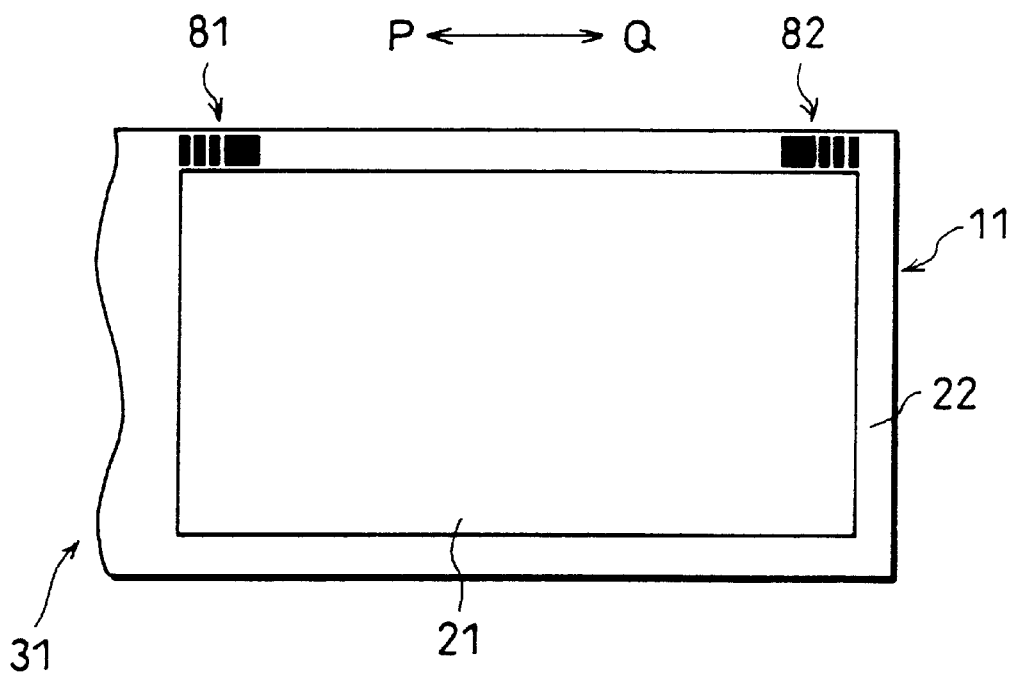
FIG. 19 is an explanatory view illustrating an example in which distinction marks are provided on liquid crystal paper applicable to the information recording device of the present invention.

To solve the foregoing problem, in the present application, as shown in FIG. 19, distinction marks 81 and 82 for distinction of the liquid crystal paper 11 from another liquid crystal paper 11 or distinction between the front and the back of the liquid crystal paper 11 are provided on both transport-direction end portions of the non-information-display region 22 of the liquid crystal paper 11, so that the driving operation by the driving means 41 may be controlled by recognizing the front end and the rear end of the liquid crystal paper 11 being transported. Incidentally, how the driving operation by the driving means 41 is controlled with use of the distinction marks 81 and 82 will be described later.

Thus, the distinction marks 81 and 82 recorded on the non-information-display region 22 for distinction of the liquid crystal paper 11 from another liquid crystal paper 11 or distinction between the front and the back of the liquid crystal paper 11 enable distinction the top, bottom, right, and left, as well as the front and back of the liquid crystal paper 11, even in the case where the liquid crystal paper 11 is transparent. This makes it possible to prevent the liquid crystal paper 11 from being engaged in a wrong manner, for example, with the wrong side up.

Figure 15:
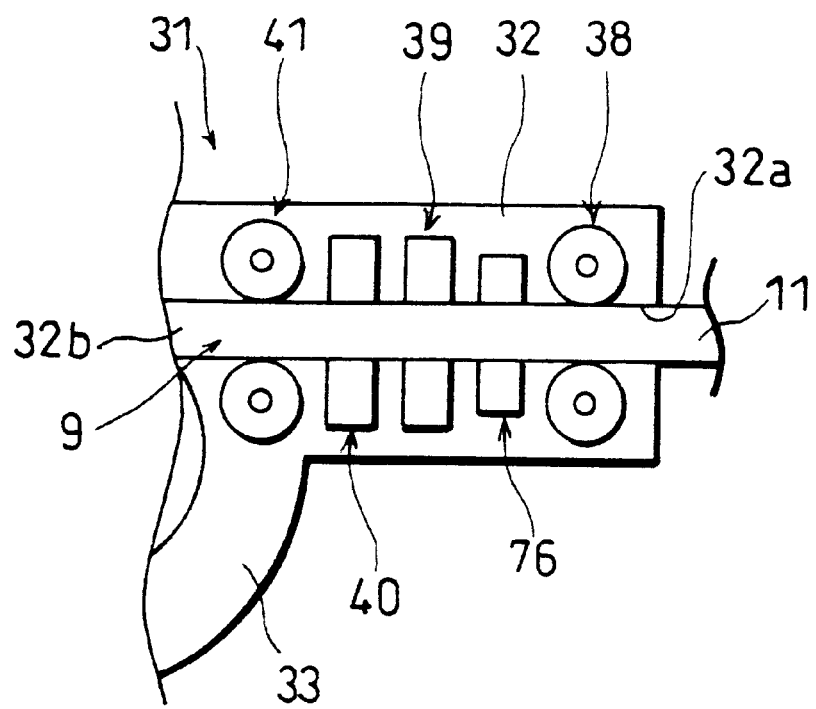
FIG. 15 is an explanatory view illustrating the device main body of the information recording device shown in FIG. 1 in the case where distinction signal detecting means is provided therein.

To detect the distinction marks 81 and 82 provided at the front end and the rear end of the liquid crystal paper 11 being transported, provision of distinction mark detecting means (distinction signal detecting section, detecting means) 76 inside the information write/erase section 32, as shown in FIG. 15, may be contrived, for example.

Generally, detecting means such as a photo-interrupter is adapted so as to be used as the distinction signal detecting means 76.

Figure 16:
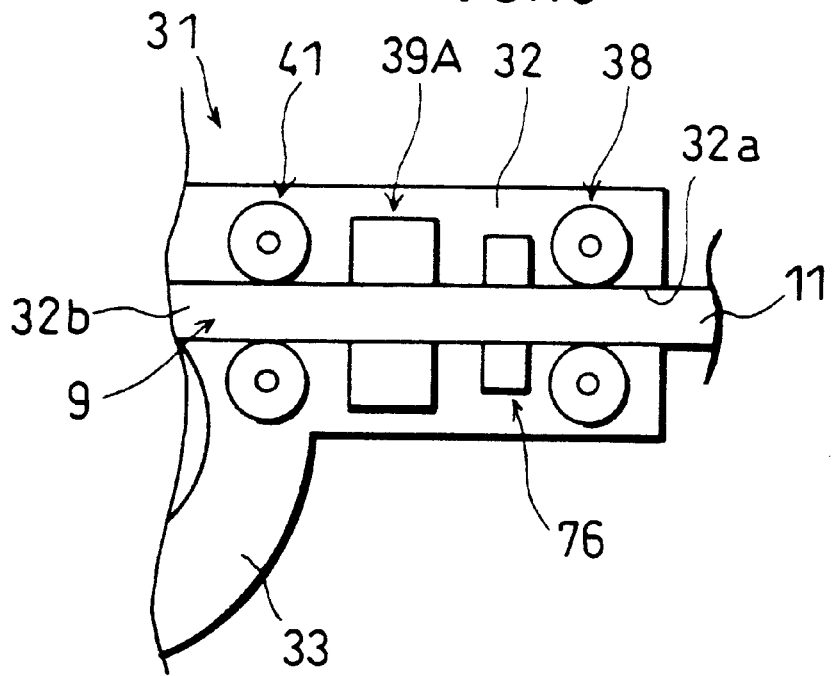
FIG. 16 is an explanatory view illustrating the device main body shown in FIG. 15 in the case where the information recording means and the initializing means are integrated into one member.

Furthermore, to make the device smaller and lighter may be attempted by using information erasing/recording means (information erasing and recording means) 39A in which the information recording means 40 and the initializing means 39 are constituted by one member, by arranging the member so as to have different outputs during a recording operation and during an initializing operation, respectively, as shown in FIG. 16. In this case also, the foregoing distinction signal detecting means 76 may be provided between the driving means 41 and the opening 32a of the information write/erase section 32 as described above.

In this case as well, like the aforementioned case, recognition of the distinction marks put on the liquid crystal paper 11 enables control on the driving operation of the driving means 41 and the like.

Furthermore, as described above, the following scheme may be used so as to solve the problem caused by the excessive transport of the liquid crystal paper 11.

Figure 17:
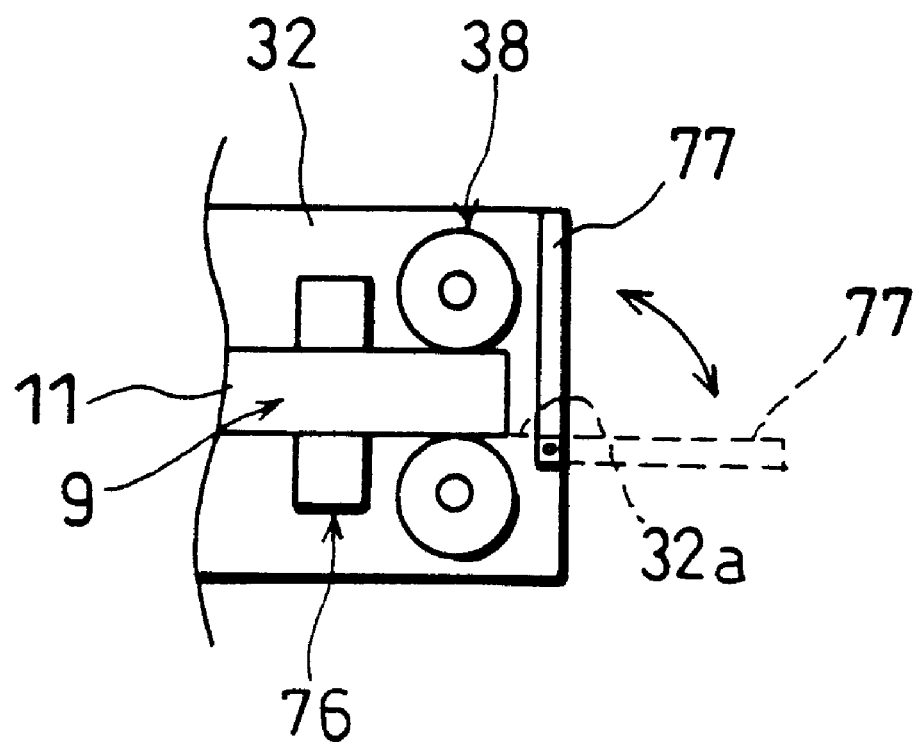
FIG. 17 is an explanatory view illustrating an opening/closing member provided at an opening of the device main body shown in FIG. 1.

One of examples of the scheme is a scheme which uses, as shown in FIG. 17, an opening/closing member 77 which can be opened outward, and opening/closing member detecting means (opening/closing member detecting section, detecting means) 78 (see FIG. 18) for detecting a state of the opening/closing member 77, the opening/closing member 77 and the opening/closing member detecting means 78 being provided at the opening 32a of the information write/erase section 32.

The opening/closing member 77 is arranged as follows: when the opening/closing member 77 is opened, the opening/closing member 77 comes at the same level as, or below, an imaginary extension of the guiding space 9 of the information write/erase section 32, as shown in the Figure by broken lines. The opening/closing member 77 may be arranged so as to be opened/closed manually, or alternatively, automatically by use of a driving section.

In the case where the opening/closing member 77 is arranged so as to be opened/closed manually or alternatively automatically by use of a driving section, detection of the state of the opening/closing member 77 is made possible, so that the driving operation by the driving means 41 of the information write/erase section 32 or the like is controlled based on the detection result. The opening/closing member detecting means 78 (see FIG. 18) composed of a microswitch or the like may be adapted so as to be used as this detecting means.

More specifically, in the case where the opening/closing member 77 is in a closed state after the housing of the liquid crystal paper 11 finishes, the driving means 41 or the like is prevented from conducting a driving operation by use of stopping means for stopping the driving of each member of the device main body 31, and the operation section 35 is made to display as such. By so doing, excessive transport of the liquid crystal paper 11 and damage to the liquid crystal paper 11 caused by excessive load applied thereto can be prevented.

Furthermore, when the device main body 31 is not used or is being carried, dusts or foreign matters may possibly get inside the device main body 31. In the case where thus dusts or the like get inside the device main body 31, they possibly adhere to the liquid crystal paper 11 thereby scarring its surface, or get in between the initializing means 39 and the information recording means 40, reversely affecting the erasing/recording operation. However, by providing the opening/closing member 77, as in the present application, such problems as described above can be solved.

Figure 18:
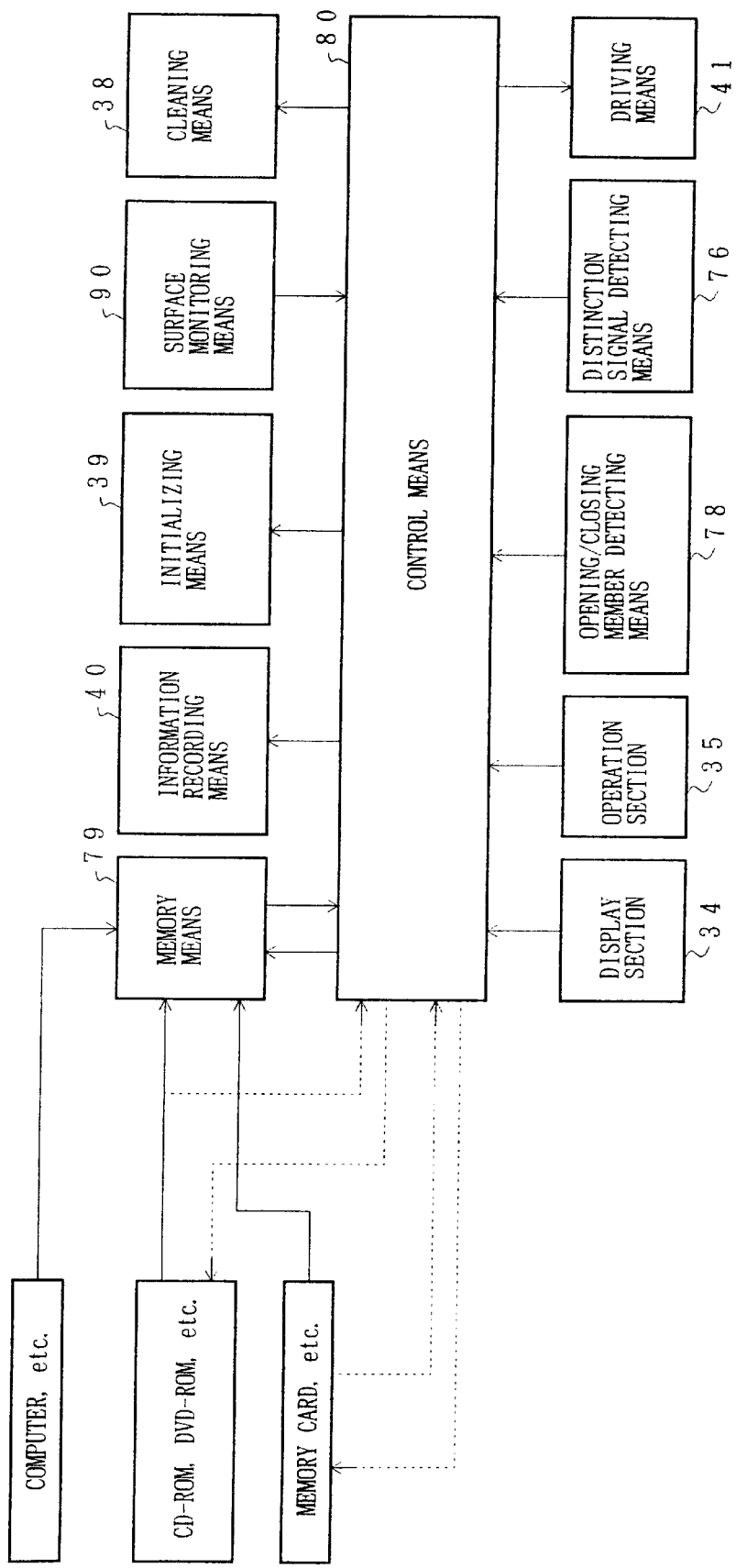
FIG. 18 is a block diagram illustrating control system of the information recording device shown in FIG. 1.

The driving of each means in the device main body 31 is controlled by controlling means 80 composed of a CPU, as shown in FIG. 18.

The foregoing control means 80 is connected with not only the aforementioned cleaning means 38, initializing means 39, information recording means 40, driving means 41, distinction signal detecting means 76, and opening/closing member detecting means 78, but also the memory means 79, and surface monitoring means 90.

The foregoing memory means 79 is means for temporarily storing information such as characters and images as data to be written in a recording medium sheet such as the liquid crystal paper 11 in the information recording device of the present application. Data from computers, CD-ROMs, DVD-ROMs, memory cards, and the like has preparatorily been inputted in the memory means 79. In the case where data are inputted thereto from the CD-ROMs or DVD-ROMs, a reproducing device for reproducing such recording media may be incorporated therein. In this case, it is unavoidable that the device becomes bulkier, whereas it is possible to easily read out massive information at a certain desired place.

Furthermore, direct access of the CD-ROM, DVD-ROM, memory card, or the like to the control means 80, not via the memory means 79, may be devised. In other words, in this case the CD-ROM, DVD-ROM, memory card, or the like serves as the memory means.

Thus, since the device main body 31 of the information recording device is portable and further the device main body 31 is equipped with the memory means 79 capable of storing massive information, the rewriting of information can be easily performed at any desired place. In other words, in the case of a conventional information recording device, there has been an inconvenience that the device has to get access to information sources at limited places when rewriting is required, even though the liquid crystal paper 11 in which information is repeatedly rewritten, since the information recording device itself is not arranged so as to be capable of storing information. The information recording device of the present invention, however, has no such inconvenience, and enjoys more effective usage of the liquid crystal paper 11 in which information can be repeatedly rewritten, as compared with the conventional information recording device. Furthermore, by arranging the memory means 79 so as to also store information once erased, it is possible to record the same information in the liquid crystal paper 11 if the information has been erased by mistake.

The foregoing surface monitoring means 90 is means for monitoring, for example, conditions of the surfaces of a recording means such as liquid crystal paper 11 whether the surfaces are soiled or not. The control means 80 is arranged so as to control the cleaning operation of the cleaning means 38 based on the result of the foregoing monitoring by the surface monitoring means 90. Alternatively, without provision of the surface monitoring means 90, the cleaning of the surfaces of the liquid crystal paper 11 may be carried out by the cleaning means 38 at all times.

The following description will explain signal flow referring to a control block diagram of FIG. 18. Note that the memory means 79 is supplied with data such as characters and images from an external or built-in recording medium such as the CD-ROM and the DVD-ROM. The memory means 79 is also supplied with information which constitutes a part of the whole information supplied thereto, as well as information for conversion (scaling-up/down, etc.), from the control means 80.

The information recording means 40, the initializing means 39, the cleaning means 38, and the driving means 41 are supplied with signals used for controlling the respective means, from the control means 80.

In other words, writing control signals based on data supplied to the memory means 79 by the control means 80 and stored therein are inputted to the information recording means 40.

The initializing means 39 is supplied, from the control means 80, with signals necessary for the initialization of the liquid crystal paper 11.

The cleaning means 38 is supplied, from the control means 80, with signals necessary for the cleaning of the liquid crystal paper 11.

The driving means 41 is supplied, from the control means 80, with signals necessary for the driving of the driving means 41.

On the other hand, the display section 34, the operation section 35, the opening/closing member detecting means 78, the distinction signal detecting means 76, and the surface monitoring means 90 supply a variety of control signals to the control means 80.

More specifically, the display section 34 supplies the control means 80 with signals corresponding to operations selected from among those shown by the operation menu displayed, for example, respective signals corresponding to the "reproduction" key 35b, the "next" key 35c, the "pull-back" key 35d, and the like.

The operation section 35 sends signals such as those indicating the turning ON/OFF of the power source to the control means 80. Incidentally, in the case where the user operates not the operation menu displayed on the display section 34 but a key such as "reproduction," "next," "pull-back," or the like provided on the operation section 35, a signal for commanding "reproduction," "next," "pull-back," or the like is sent to the control means 80 from the operation section 35.

The opening/closing member detecting means 78, when detecting a state in which the opening/closing member 77 is in a closed state as shown in FIG. 17 (indicated by the solid line), sends a detection signal to the control means 80.

The distinction signal detecting means 76, when detecting the distinction marks 81 and 82 on the liquid crystal paper 11, sends a detection signal as a distinction signal to the control means 80.

Here, operations of the information recording device arranged as described above will be explained below, with reference to the block diagram of FIG. 18 as well as FIG. 1.

First, the power source is turned ON by use of the power source key 35a of the operation section 35. Then, the operation menu, a table of contents, or the like is displayed on the display section 34 composed of the liquid crystal panel 34a.

Then, in the case where "write of data" is selected from the operation menu displayed on the liquid crystal panel 34a, a menu for selection of a file to be written is further displayed on the liquid crystal panel 34a. If a file desired to be written is selected, data thereof is transferred from the memory means 79 (FIG. 18) to the information recording means 40.

Subsequently, the data are recorded on the liquid crystal paper 11 by the information recording means 40. As the recording proceeds, the liquid crystal paper 11 is gradually transported in an arrow Q direction in FIG. 1 by the driving means 41.

Alternatively, in the case where "initialization of liquid crystal paper" is selected from the operation menu displayed on the liquid crystal panel 34a, the liquid crystal paper 11 is driven in an arrow P direction in FIG. 1 by the driving means 41, to a predetermined position inside the sheet housing section 33 in a substantially cylindrical shape.

Here, the driving means 41 capable of driving in two directions opposite to each other transports the liquid crystal paper 11 by causing the rollers 41a to be in contact with the non-information-display region 22 of the liquid crystal paper 11, so that an unnecessary force is not imparted to the information-display region 21.

Then, the initializing means 39 erases data recorded in the liquid crystal paper 11 being transported through the sheet transport path 32b.

The following description will explain control by the control means 80 with use of the aforementioned distinction signal.

As shown in FIG. 19, distinction marks 81 and 82 are provided on the non-information-display region 22 of the liquid crystal paper 11. The distinction marks 81 and 82 are provided at positions corresponding to the front end and the rear end of the information-display region 21 as region capable of display in the liquid crystal paper 11. The distinctions marks 81 and 82 are formed so as to be symmetric each other. In other words, the distinction marks 81 and 82 are arranged so that the set of the marks is detected as in the same shape in the case where the liquid crystal paper 11 is transported in the arrow P direction and in the case where it is transported in the arrow Q direction. Here, the distinction marks 81 and 82 are bar cords each being composed of three bars disposed at regular spacings and one bar slightly thicker than each of the foregoing three.

Figure 20:
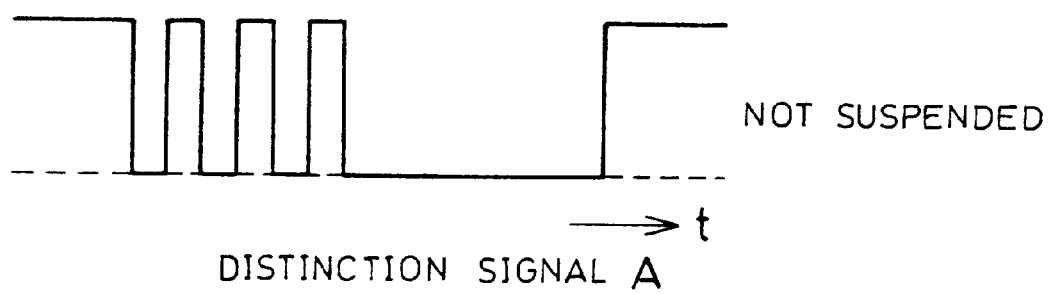
FIGS. 20(a) and 20(b) are waveform diagrams of distinction signals obtained at detection of the distinction marks provided on liquid crystal paper shown in FIG. 19.
Figure 20:
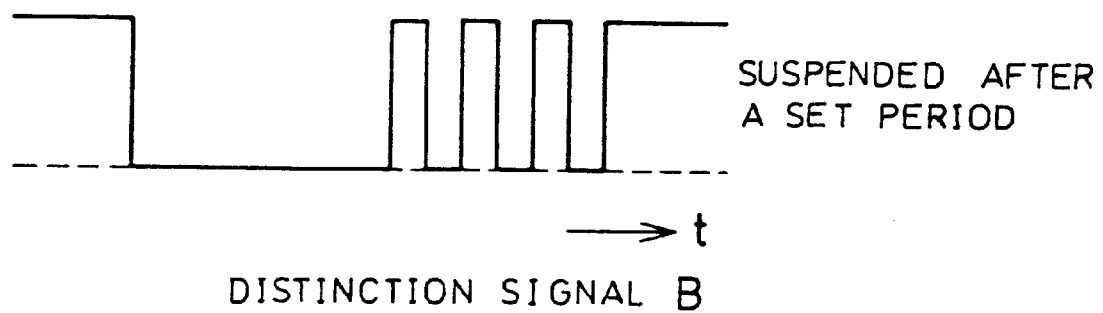

Detecting means such as a photo-interrupter, for example, is adapted so as to be used as the distinction signal detecting means 76 for detecting the foregoing distinction marks 81 and 82. In the case where the photo-interrupter is used, distinctions signals A and B as shown in FIGS. 20(*a*) and 20(*b*), respectively, are obtained from the distinction marks 81 and 82 in a pattern as shown in FIG. 19. To be more specific, when the liquid crystal paper 11 is transported in the arrow P direction, the distinction mark 81 is first detected, with which the distinction signal A as shown in FIG. 20(*a*) is obtained. Thereafter, the distinction mark 82 is detected, with which the distinction signal B as shown in FIG. 20(*b*) is obtained. With the distinction signals A and B inputted to the control means 80, the driving control of the driving means 41 is conducted.

When the liquid crystal paper 11 in a state shown in FIG. 19 is transported in the arrow P direction, that is, when information written in the liquid crystal paper 11 is erased, the distinction mark 81 is first detected, then, the distinction mark 82 is detected in the device main body 31. More specifically, when the distinction mark 81 is detected, the distinction signal A as shown in FIG. 20(*a*) is supplied to the control means 80. Since the distinction signal A is a signal indicating that the front end of the liquid crystal paper 11 is detected, the control means 80 does not cause the driving means 41 to suspend the driving operation. Thereafter, when the distinction mark 82 is detected, the distinction signal B as shown in FIG. 20(*b*) is supplied to the control means 80. Since the distinction signal B is a signal indicating that the rear end of the liquid crystal paper 11 is detected, the control means 80 causes the driving means 41 to suspend the driving operation after a predetermined period (t=n).

In other words, in the case where the distinction mark 81 is first detected by the distinction signal detecting means 76 and thereafter the center portion of the liquid crystal paper 11 approaches the distinction signal detecting means 76, the transport of the liquid crystal paper 11 is not suspended. On the other hand, in the case where an edge approaches, the transport of the liquid crystal paper 11 is suspended after a predetermined period from detection of the distinction mark 82. Here, it is prearranged that, when transport of the liquid crystal paper 11 is stopped at a certain position, the liquid crystal paper 11 never stops at such a position that the distinction mark 82 comes to the distinction signal detecting means 76.

Likewise, when the liquid crystal paper 11 in a state of being housed in the device main body 31 is pulled out in an arrow Q direction, that is, when information is written in the liquid crystal paper housed in the device main body 31, the same control as that described above may be carried out. In this case, the mark first detected by the distinction signal detecting means 76 is the distinction mark 82, with which the distinction signal A shown in FIG. 20(a) is obtained. Thereafter, the distinction mark 81 is detected by the distinction signal detecting means 76, with which the distinction signal B as shown in FIG. 20(b) is obtained. Then, the transport of the liquid crystal paper 11 is suspended when a predetermined period (t=m) has elapsed since the detection of the distinction signal B.

Figure 21:
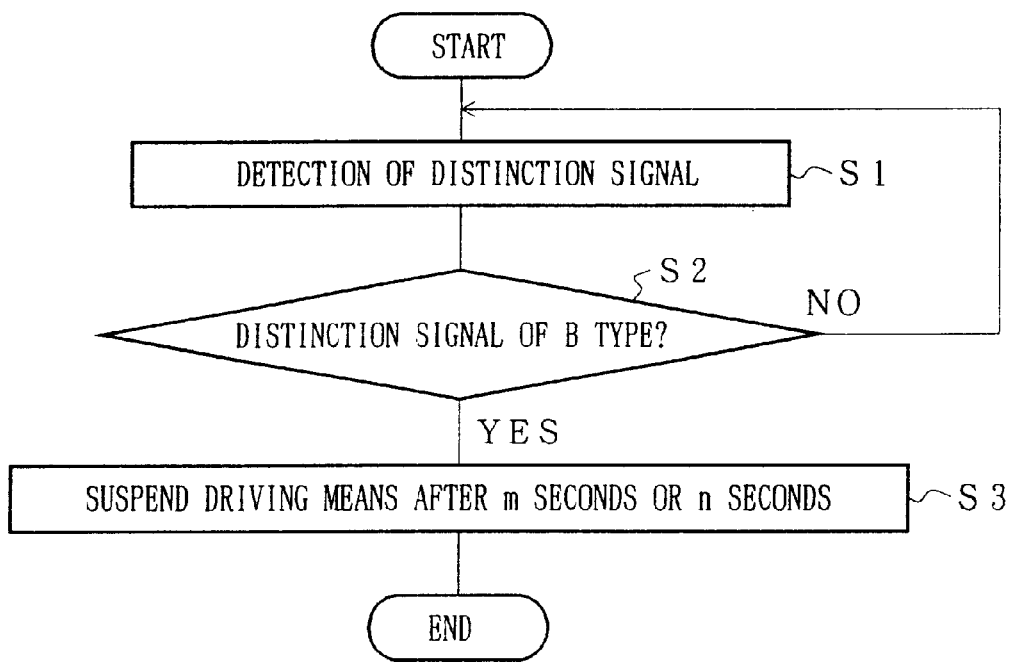
FIG. 21 is a flowchart illustrating transport control of liquid crystal paper based on the distinction marks provided on liquid crystal paper shown in FIG. 19.

Here, the flow of transport control with respect to the liquid crystal paper 11 by means of the distinction signals will be explained below, with reference to a flowchart shown in FIG. 21. Incidentally, in the information recording device, the time when the liquid crystal paper 11 is sent out of the device main body 31 is hereinafter referred to as information writing time, while the time when it is being housed in the device main body 31 is hereinafter referred to as information erasing time. Since the transport control with respect to the liquid crystal paper 11 at the information writing time and that at the information erasing time are basically identical, they are explained referring to the same flowchart.

First of all, the control means 80 carries out a distinction signal detecting operation with respect to the liquid crystal paper 11 being transported (S1), and judges whether or not the distinction signal is a B type (distinction signal B) (S2). In short, it judges whether or not the distinction signal B shown in FIG. 20(b) is detected.

If the distinction signal B is not detected at S2, the flow goes to S1, and the distinction signal detecting operation is carried out again.

On the other hand, if the distinction signal B is detected at S2, the driving means is suspended after m seconds, or after n seconds (S3).

Here, the time of m seconds is a time counted at the information writing time by a timer t1 incorporated in the device main body 31, the timer t1 having been previously set so as to do so. In other words, the stopping of the driving means 41 after m seconds since the detection of the distinction signal B is arranged. In this case, the liquid crystal paper 11 is sent out from the device main body 31, while desired information is written in the information display region 21 of the liquid crystal paper 11, and the liquid crystal paper 11 is stopped in a state in which the entire information display region 21 is visible.

The time of n seconds is a time counted at the information erasing time by a timer t1 incorporated in the device main body 31, the timer having been previously set so as to do so. In other words, the stopping of the driving means 41 after n seconds since the detection of the distinction signal B is arranged. In this case, the liquid crystal paper 11 is housed in the device main body 31, while all the information in the liquid crystal paper 11 is deleted, and the liquid crystal paper 11 is stopped in a state in which the information display region 21 comes just before the information recording means 40 (on the sheet housing section 33 side).

Figure 22:
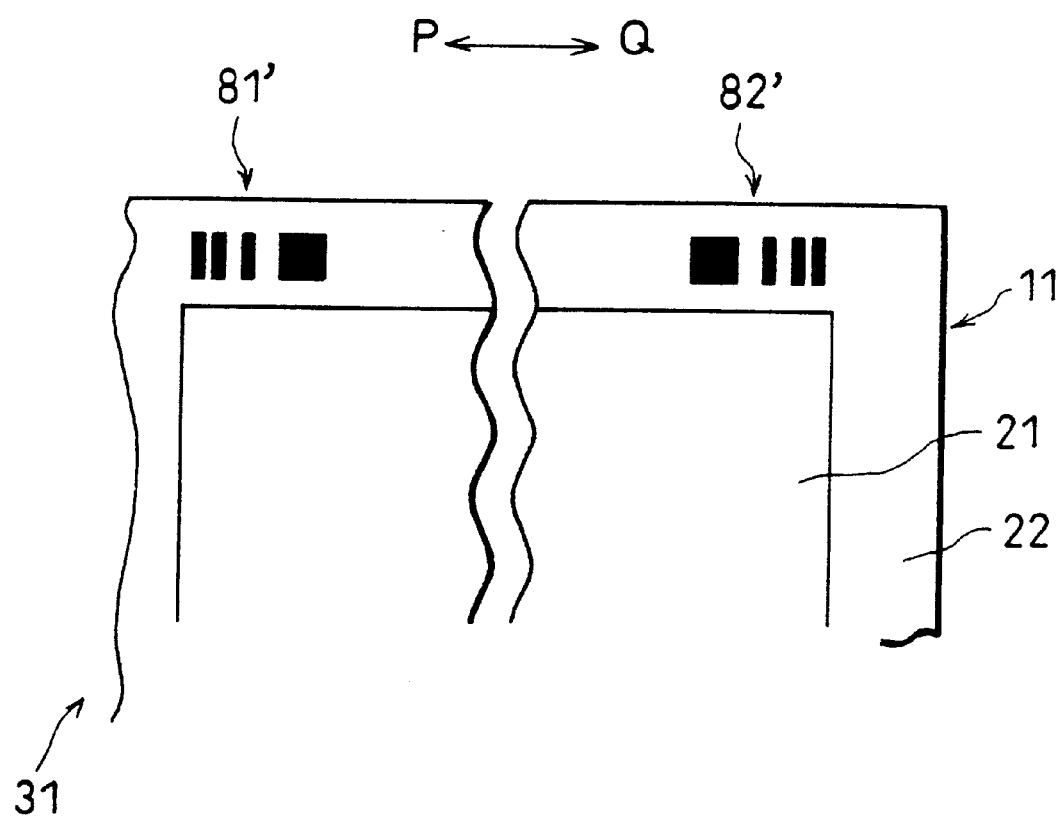
FIG. 22 is an explanatory view illustrating another example in which distinction marks are provided on liquid crystal paper applicable to the information recording device of the present invention.
Figure 23:
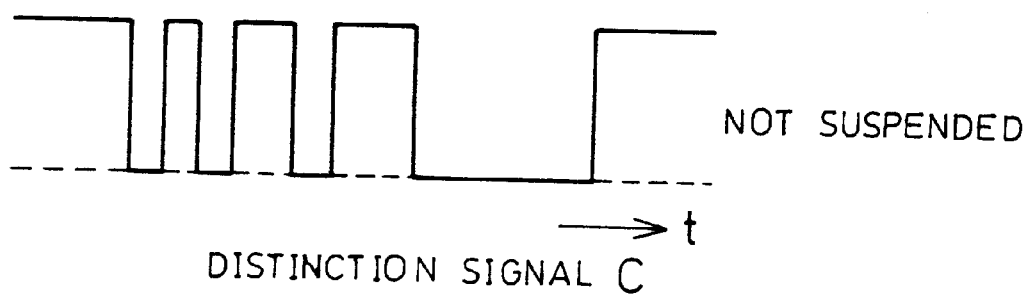
FIGS. 23(a) and 23(b) are waveform diagrams of distinction signals obtained at detection of the distinction marks provided on liquid crystal paper shown in FIG. 22.
Figure 23:
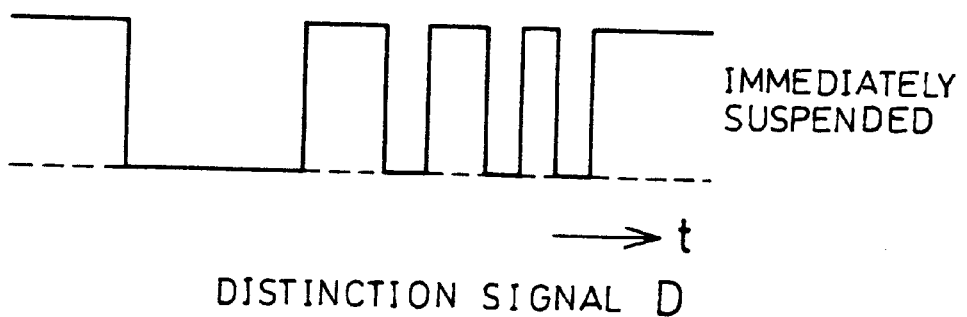

Furthermore, it is possible to use second distinction marks, which are formed outside the distinction marks 81 and 82 so that spacings between bars vary as becoming closer to the rear end and the front end of the liquid crystal paper 11, respectively. For example, as shown in FIG. 22, distinction marks 81' and 82' in which spacings between bars are narrowed as getting closer to the rear end and the front end, respectively, are formed outside the distinction marks 81 and 82 shown in FIG. 19, respectively. Incidentally, the distinction marks 81 and 82 are positioned not at the front end and the rear end of the liquid crystal paper 11 (as shown in FIG. 19) but at more inward positions, though not displayed in FIG. 22.

In the case where the foregoing distinction marks 81' and 82' are detected by the distinction signal detecting means 76, distinction signals C and D as shown in FIGS. 23(a) and 23(b) are obtained, respectively. In this case, the control means 80 does not suspend the transport of the liquid crystal paper 11 in response to the detection of the distinction signal C, while stops the driving means 41 in response to the detection of the distinction signal D so as to suspend the transport of the liquid crystal paper 11.

Furthermore, as described later, in the case where the liquid crystal paper 11 which has been stopped in response to the detection of the distinction mark B is further transported by an erroneous operation, it is possible to arrange the device so as to detect and read the distinction signal D for a certain period of time, then, stop the transport of the liquid crystal paper 11, and transport the liquid crystal paper 11 in the opposite direction during the same period of reading the distinction signal D so that the liquid crystal paper 11 returns to the original stop position.

Thus, by providing the distinction marks 81' and 82' outside to the distinction marks 81 and 82, it is possible to prevent excessive transport or housing of the liquid crystal paper 11 in a state of having been already sent out or housed.

Figure 24:
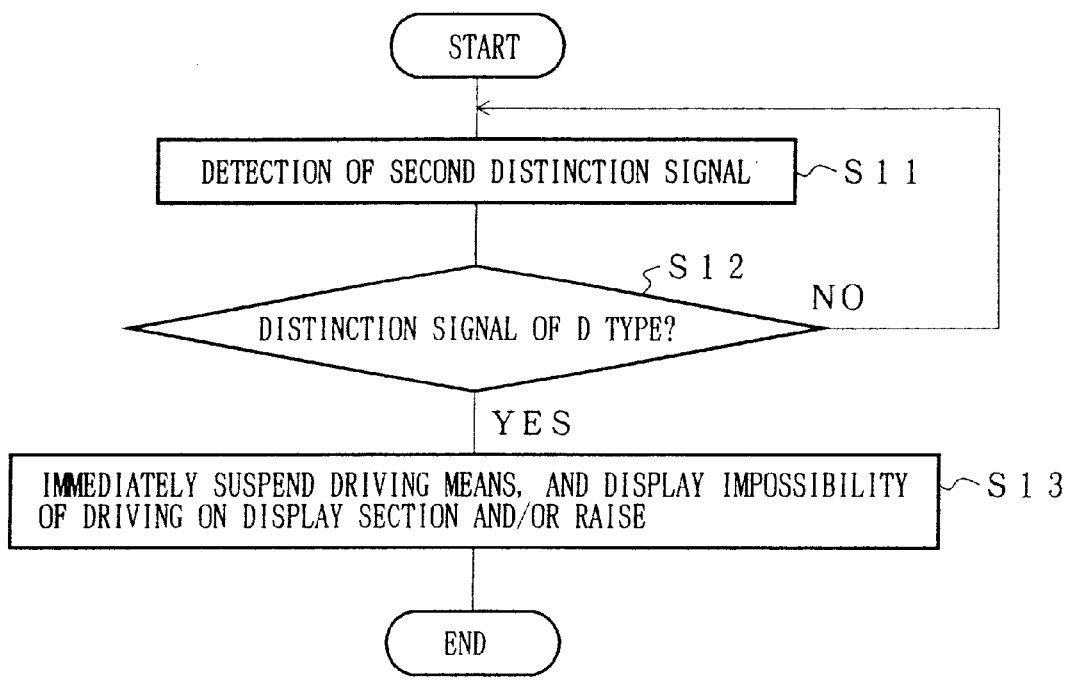
FIG. 24 is a flowchart illustrating control for preventing erroneous transport of liquid crystal paper based on the distinction marks provided on liquid crystal paper shown in FIG. 22.

The foregoing error preventing method will be described below with reference to the flowchart in FIG. 24. Note that, in the present description, it is premised that the liquid crystal paper 11 having been stopped by the distinction signal B is further transport in error, and "START" in the flowchart in FIG. 24 corresponds to a state in which the liquid crystal paper 11 is further transported in this manner.

First of all, one of the second distinction signals is detected (S11). Here, either the distinction signal C or D obtained from the distinction mark 81' or 82' is detected.

Then, whether or not the detected second distinction signal is a D type (distinction signal D) is judged (S12). Here, in the case where the signal detected is judged not to be the distinction signal D, the flow goes to S11, where the second distinction signal is detected.

On the other hand, in the case where the detected distinction signal is judged to be the distinction signal D at S12, the driving means 41 is immediately stopped, while impossibility of the driving is displayed on the display section 34, and an alarm is raised (S13).

Further, apart from the above-described method, there is a method in which, in the case where the distinction signal is a signal indicating the transport rear end, the rotation direction of the driving means 41 is switched so that the liquid crystal paper 11 returns to a position at which the liquid crystal paper 11 has been stopped before the reading of the signal. Such an error preventing method will be described below, with reference to a flowchart in FIG. 25.

Figure 25:
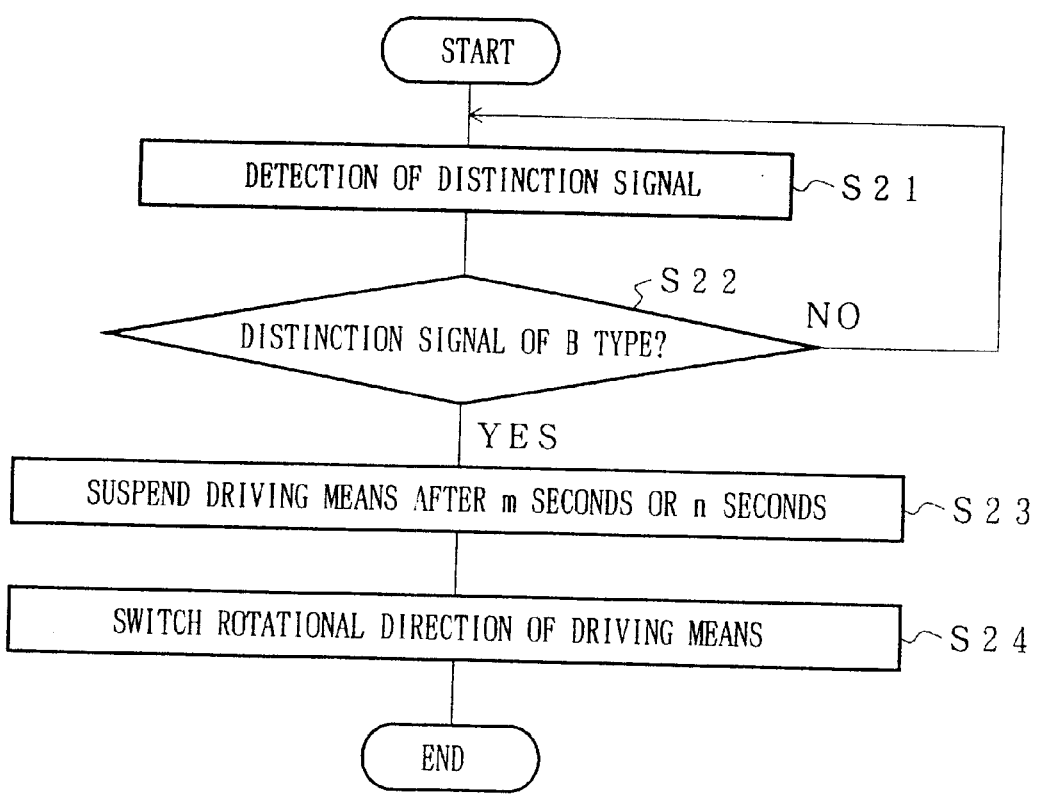
FIG. 25 is a flowchart illustrating control for preventing erroneous transport of liquid crystal paper based on the distinction marks provided on liquid crystal paper shown in FIG. 19.

Incidentally, the flowchart shown in FIG. 25 deals with a case where further transport in error is not conducted after detection of the distinction signal B.

First of all, a distinction signal obtained from a distinction mark is detected (S21).

Then, whether or not the distinction signal obtained from the distinction mark is a B type (distinction signal B) as shown in FIG. 20(b) is judged (S22).

Here, in the case where the signal detected at S22 is judged not to be the distinction signal B, the flow goes to S21, where a distinction signal is detected.

On the other hand, in the case where the signal detected at S22 is judged to be the distinction signal B, the driving means 41 is stopped m seconds or n seconds later (S23).

Here, the time of m seconds is a time counted at the information writing time by a timer t1 incorporated in the device main body 31, the timer t1 having been previously set so as to do so. In other words, the stopping of the driving means 41 after m seconds since the detection of the distinction signal B is arranged. In this case, the liquid crystal paper 11 is sent out from the device main body 31, while desired information is written in the information display region 21 of the liquid crystal paper 11, and the liquid crystal paper 11 is stopped in a state in which the entire information display region 21 is visible.

The time of n seconds is a time counted at the information erasing time by a timer t1 incorporated in the device main body 31, the timer having been previously set so as to do so. In other words, the stopping of the driving means 41 after n seconds since the detection of the distinction signal B is arranged. In this case, the liquid crystal paper 11 is housed in the device main body 31, while all the information in the liquid crystal paper 11 is erased, and the liquid crystal paper 11 is stopped in a state in which the information display region 21 comes just before the information recording means 40 (on the sheet housing section 33 side).

After the driving means 41 is stopped, the rotational direction of the driving means 41 is switched in an opposite direction (S24).

Thus, recognition of the distinction marks 81, 82, 81', and 82' put on the liquid crystal paper 11, detection of distinction signals (A, B, C, and D) obtained from the recognized distinction marks 81, 82, 81', and 82', and the switching of the rotation direction of the driving means 41 in the case where the distinction signal obtained is the signal indicating the transport rear end, is arranged so as to avoid excessive transport of the liquid crystal paper 11.

Furthermore, the size of each of the distinction marks 81 and 82 is set sufficiently larger than the size of each distinction mark detecting member of the distinction signal detecting means 76. In the case where a photo-interrupter is adapted so as to be used as the distinction signal detecting means 76, a light receiving part of the photo-interrupter is at most 1 mm in dimension (slit width), and the size of the distinction mark may be set not smaller than 1 mm.

Figure 26:
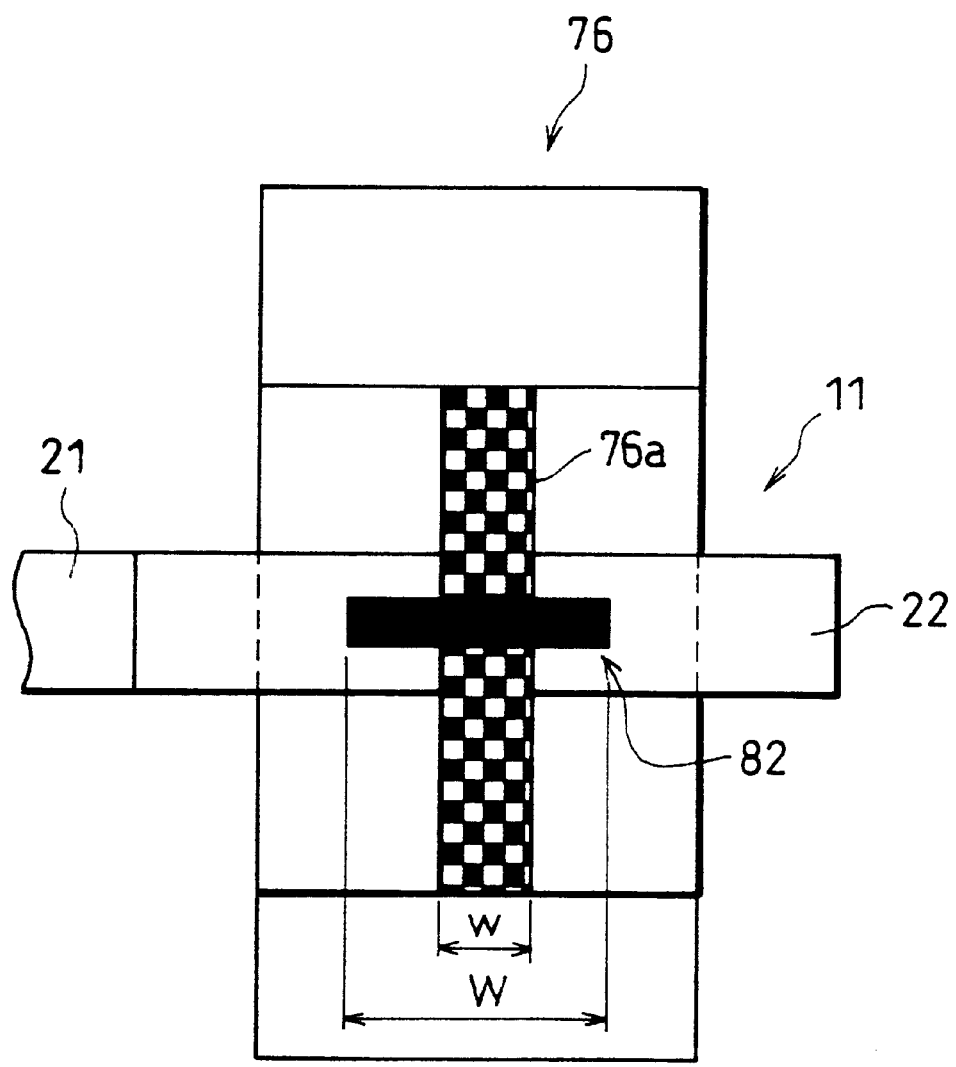
FIG. 26 is an explanatory view illustrating relationship between sizes of distinction marks and a photo-interrupter as distinction signal detecting means.

In other words, as shown in FIG. 26, the length W of the distinction mark 82 provided on the non-information-display region 22 of the liquid crystal paper 11 may be set sufficiently greater than the width w of a light receiving part 76a of the distinction signal detecting means 76.

With such an arrangement, the distinction marks can be surely recognized even with irregularity in transport of the liquid crystal paper 11 or in positions of the distinction marks.

Incidentally, in the foregoing example, only the distinction marks 81 and 82, one each, are put on one and same edge as shown in FIG. 19, but the arrangement is not limited to this, and a plurality of distinction marks may be provided on one and same edge according to a purpose of application, as described above.

In the foregoing first embodiment, one edge of the liquid crystal paper 11 as recording medium sheet is fixed to the device main body 31, so that the liquid crystal paper 11 is arranged so as to be repeatedly pulled out and housed from and to the device main body 31 for repeated use of the liquid crystal paper 11. In this case, the erasure of information is carried out when the liquid crystal paper 11 is being housed, and the writing of information is carried out when the liquid crystal paper 11 is pulled out.

The following description will explain a second embodiment of the present invention, which relates to an information recording device capable of performing the writing and erasure of information with respect to the liquid crystal paper 11 at the same time.

Second Embodiment

The following description will explain another embodiment of the present invention, while referring to FIGS. 27 through 30, 31(a), and 31(b). Incidentally, for conveniences' sake, the members having the same structure (function) as those in the first embodiment will be designated by the same reference numerals and their description will be omitted.

Figure 27:
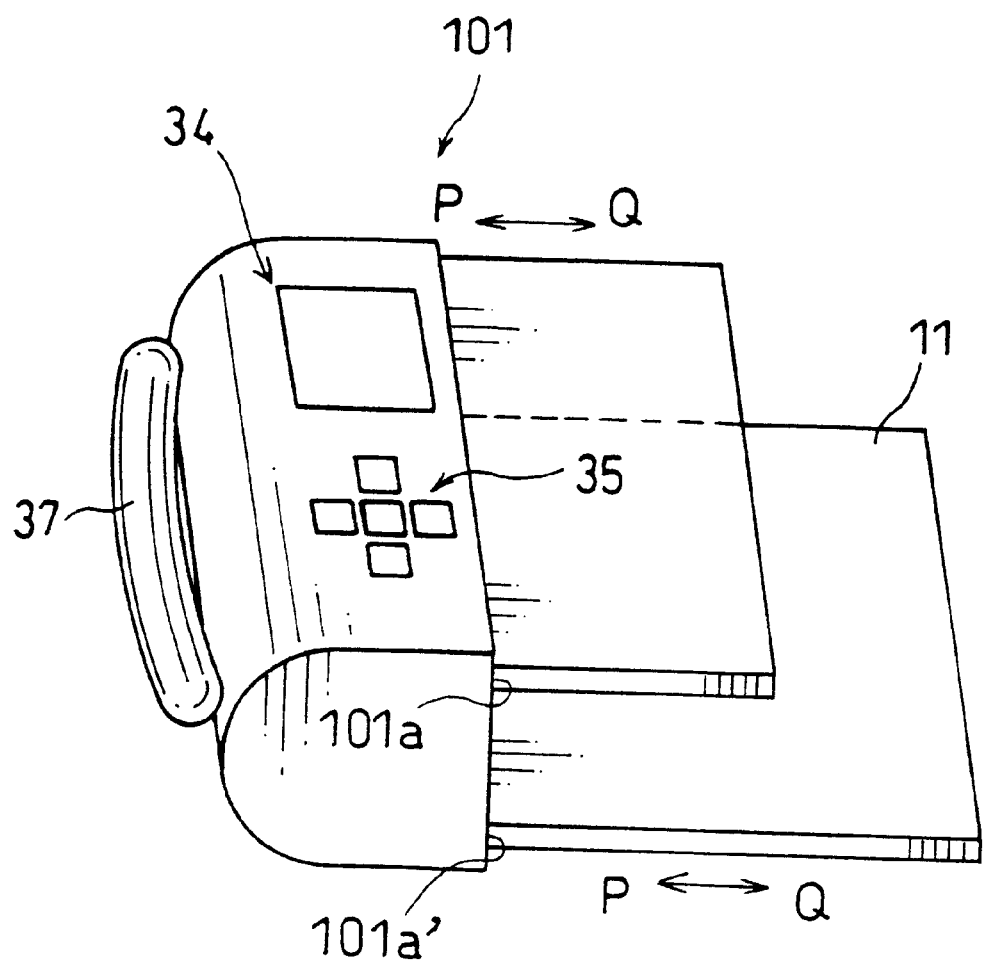
FIG. 27 is a schematic perspective view of an information recording device in accordance with another embodiment of the present invention.

An information recording device in accordance with the present embodiment is arranged, as shown in FIG. 27, so that information is rewritten on the liquid crystal paper 11 after the liquid crystal paper 11 is brought in through an opening 101a and by the time it is brought out through an opening 101a', the openings 101a and 101a' being provided on one surface of a device main body 101, in an upper part and in a lower part of the surface, respectively.

Incidentally, the foregoing information recording device may be arranged so that the information is rewritten on the liquid crystal paper 11 after the liquid crystal paper 11 is brought in through the opening 101a' in the lower part of the device main body 101 and by the time it is brought out through the opening 101a in the upper part thereof.

Whether the liquid crystal paper 11 is brought in through the opening 101a or through the opening 101a', the liquid crystal paper 11 is brought in the device main body 101 in the arrow P direction, and is brought out in the arrow Q direction. With this arrangement, the rewriting of information with respect to the liquid crystal paper 11 is quickened as compared with the first embodiment described above.

Figure 28:
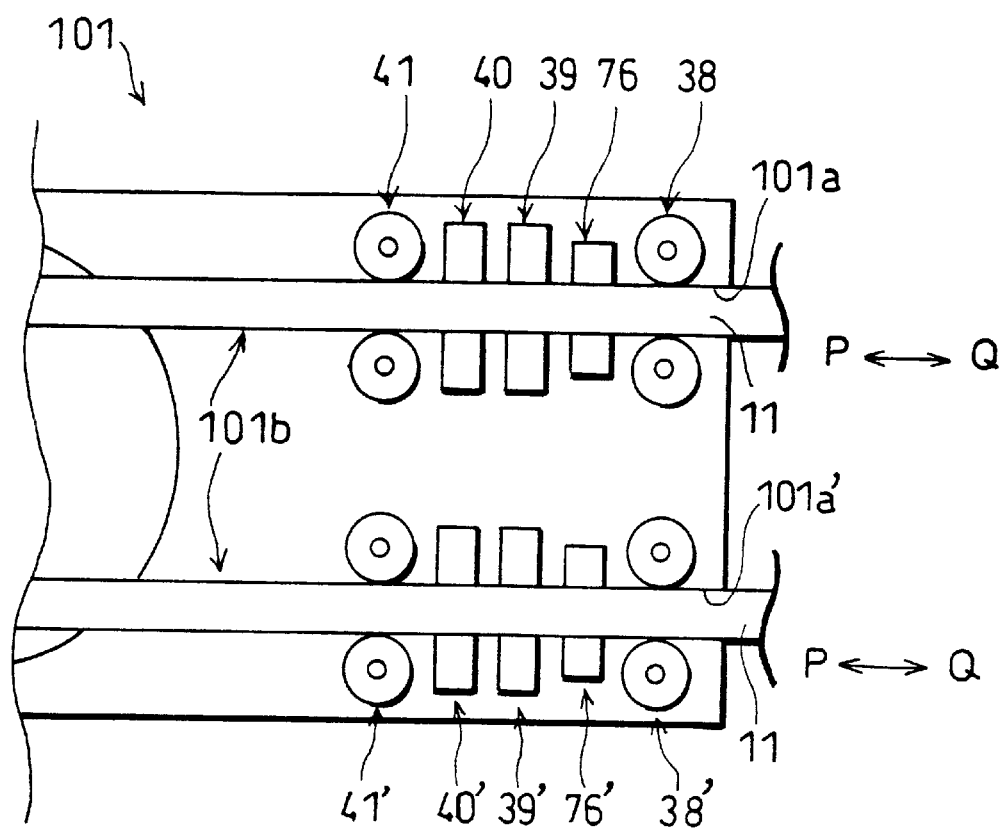
FIG. 28 is a schematic cross-sectional view of an information recording and erasing section of the information recording device shown in FIG. 27.
Figure 29:
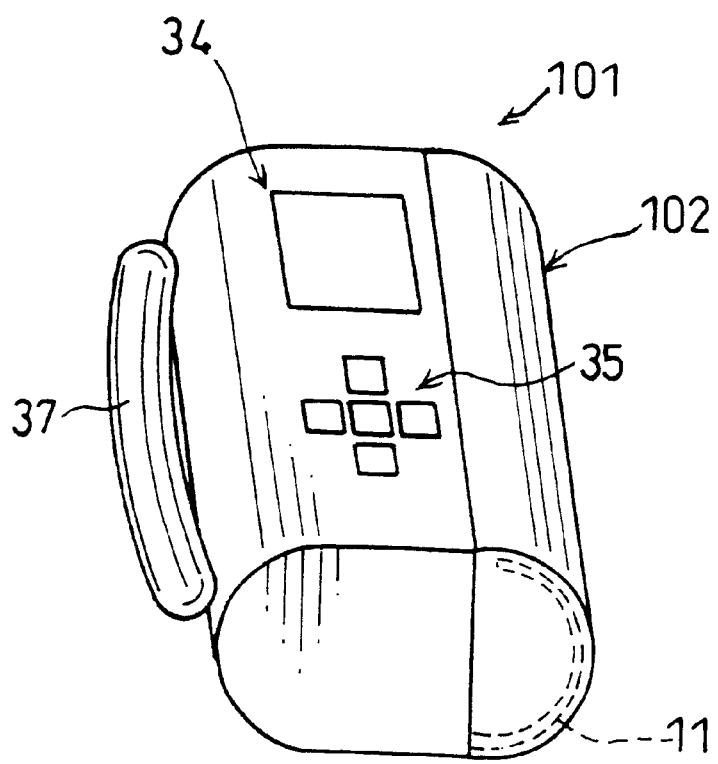
FIGS. 29(a) and 29(b) illustrate an example in which a housing member is provided in the information recording device shown in FIG. 27.
Figure 29:
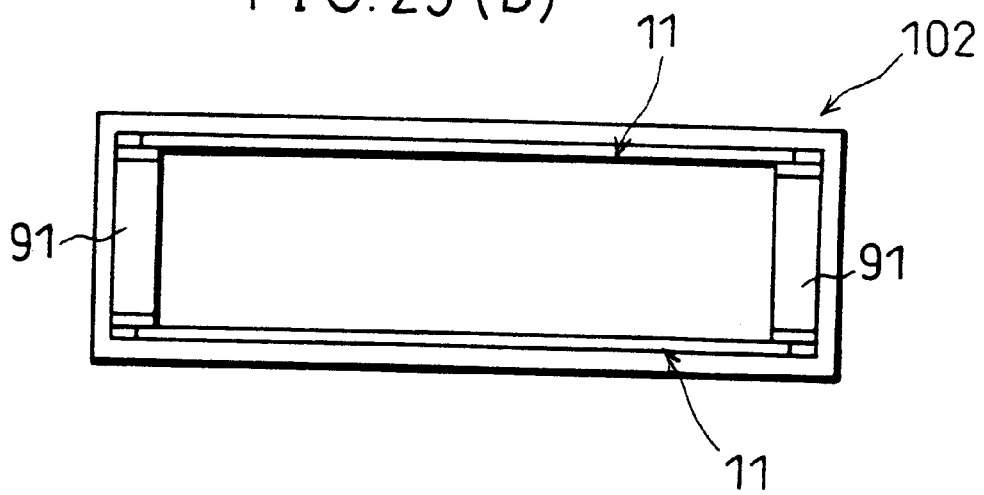

More specifically, as shown in FIG. 28, those identical to the respective means shown in FIG. 4 are provided in the vicinity of the two openings 101a and 101a'. Namely, the cleaning means 38, the distinction signal detecting means 76, the initializing means 39, the information recording means 40, and the driving means 41 are provided in the vicinity of the opening 101a in the upper part of the device main body 101, in this order from the opening 101a side, while the cleaning means 38', the distinction signal detecting means 76', the initializing means 39', the information recording means 40', and the driving means 41' are provided in the vicinity of the opening 101a' in the lower part of the device main body 101, in this order from the opening 101a' side.

Furthermore, inside the device main body 101, a transport path 101b for guiding the liquid crystal paper 11 from one opening to the other opening is provided. The liquid crystal paper 11 is held and housed so as to be transported along the transport path 101b. Here, a length of the transport path 101b from one end to the other end thereof may be set shorter than a length of the liquid crystal paper 11 to be transported along the transport path 101b. This results in that the liquid crystal paper 11 projects from the transport path 101b at all times. This arrangement facilitates extraction of the liquid crystal paper 11 from the device main body 101 with use of the projecting part of the liquid crystal paper 11 in the case where the liquid crystal paper 11 is stopped and caught somewhere along the transport path 101b due to a defect in a transport means (driving means 41' or the like) inside the device main body 101 or for another reason.

In the foregoing information recording device thus arranged, initialization by the initializing means 39 in the upper part and the recording by the information recording means 40' in the lower part are simultaneously performed while the liquid crystal paper 11 is being transported from the upper opening 101a to the lower opening 101a', resulting in that the liquid crystal paper 11 is brought out through the opening 101a' in a state in which information such as characters and images is displayed thereon.

Incidentally, the liquid crystal paper 11 is sent from the lower opening 101a' to the upper opening 101a, the rewriting of information is carried out in a similar manner. Specifically, initialization by the initializing means 39' in the lower part and the recording by the information recording means 40 in the upper part are simultaneously performed while the liquid crystal paper 11 is being transported from the lower opening 101a' to the upper opening 101a, resulting in that the liquid crystal paper 11 is brought out through the upper opening 101a in a state in which information such as characters and images is displayed thereon.

Furthermore, a member in which the initializing means 39, the information recording means 40, the initializing means 39', and the information recording means 40' are integrated may be used. The information erasing/recording means 39A as shown in FIG. 16, for example, may be adapted so as to be used as such member. Further, the information erasing/recording means may be provided in both the upper part and the lower part of the device main body 101, or alternatively, it may be provided only in either of them.

In an information recording device shown in FIG. 28, information is rewritten by application of desired recording and erasing voltages in accordance with information to the initializing means 39 and the information recording means 40' when the liquid crystal paper 11 is sent from the upper opening 101a to the lower opening 101a'. Here, the liquid crystal paper 11 is brought out from the lower opening 101a' in a state in which character/image information rewritten in the liquid crystal paper 11 is displayed thereon.

Incidentally, this applies to the case where the liquid crystal paper 11 is sent from the lower opening 101a' to the upper opening 101a. Specifically, information is rewritten by application of desired recording and erasing voltages in accordance with information to the initializing means 39' and the information recording means 40 when the liquid crystal paper 11 is sent from the lower opening 101a' to the upper opening 101a. Here, the liquid crystal paper 11 is brought out from the upper opening 101a in a state in which character/image information rewritten in the liquid crystal paper 11 is displayed thereon.

Furthermore, the above description applies to the case where the initializing means and the information recording means are integrated into one information erasing/recording means, and the information erasing/recording means is provided only on either the upper opening 101a side or the lower opening 101a' side. More specifically, initialization and recording are simultaneously carried out by the information erasing and recording means with respect to the liquid crystal paper 11 when the liquid crystal paper 11 is sent from the upper opening 101a to the lower opening 101a', and the liquid crystal paper 11 is brought out from the lower opening 101a' in a state in which character/image information rewritten in the liquid crystal paper 11 is displayed thereon.

In contrast, the same applies to the case where the liquid crystal paper 11 is sent from the lower opening 101a' to the upper opening 101a.

Figure 31A:
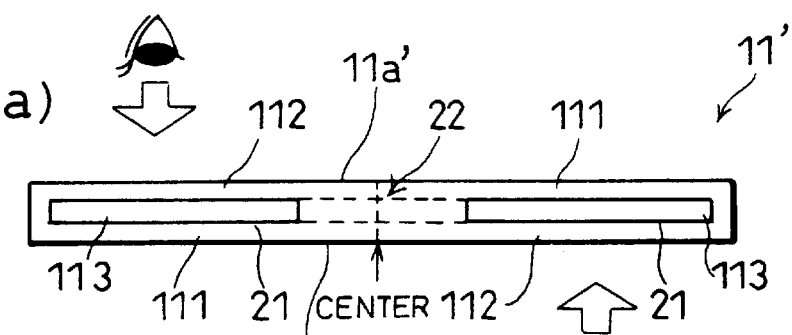
FIGS. 31(a) and 31(b) are explanatory views illustrating examples of liquid crystal paper applicable to the information recording device shown in FIG. 27.
Figure 31B:
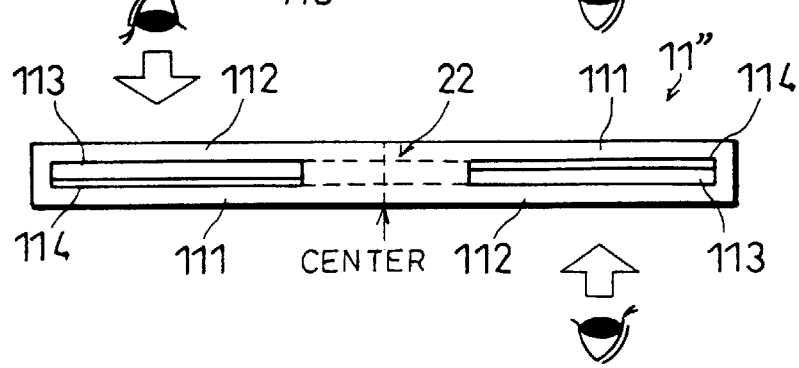

As the liquid crystal paper applicable to the foregoing information recording device arranged as described above, two types of liquid crystal papers, i.e., liquid crystal paper 11' and liquid crystal paper 11" as shown in FIGS. 31(a) and 31(b) respectively, can be thought up.

The liquid crystal paper 11' has a non-information-display region 22 in the vicinity of center of the liquid crystal paper 11', and the information-display region 21 on each side of the non-information-display region 22.

The information-display regions 21 are formed symmetric with respect to the non-information-display region 22. More specifically, one information-display region 21 is composed of a base 111, a liquid crystal layer 113, and a protective layer 112 which are formed in this order from below, while the other information-display region 21 is composed of a protective layer 112, a liquid crystal layer 113, and a base 111 which are formed in this order from below. This arrangement makes one information-display region 21 visible from an upper surface 11'a of the liquid crystal paper 11 side, while makes the other information-display region 21 visible from a lower surface 11'b of the liquid crystal paper 11.

Incidentally, the base 111 and the protective layer 112 have the same thickness and are made of the same material. With this arrangement, if the base 111 is made of a transparent material, the liquid crystal layer 113 can be seen from the base 111 side as well as from the protective layer 112 side.

Furthermore, the liquid crystal paper 11" as another example has, as shown in FIG. 31(b), like in the case of FIG. 31(a), two information-display regions 21 in each of which the base 111 and the protective layer 112 have the same thickness and are made of the same material. In the present case, a reflection layer 114 is further provided on each base 111 side. In the place of the reflection layer 111, a coloration layer may be used.

Since the foregoing liquid crystal paper 11' or 11" has two symmetrically formed screens on which information is displayed so as to be seen, in the case where the liquid crystal paper 11' or 11" is applied to the information recording device shown in FIG. 27, it is possible to view information in one direction, irrespective of whether the liquid crystal paper 11' or 11" is brought out from the opening 101a or from the opening 101a'.

Furthermore, the foregoing arrangement may be modified so that, as long as the screens on which information is displayed are symmetrically formed, the non-information-display region 22 provided in the vicinity of center may be omitted.

The foregoing information recording device may be arranged so that the liquid crystal paper 11 used is completely detachable from the device main body 101, or alternatively so that the liquid crystal paper 11 is fixed to the device main body 101. In any case, considering the portability of the information recording device, it is desirable that the liquid crystal paper 11 is loaded in the device main body 101 when the device main body 101 is carried.

Therefore, as shown in FIG. 29(a), a housing member 102 is provided on the liquid crystal paper 11 bringing-in/out side of the device main body 101, so as to house the liquid crystal paper 11, as if covering the same.

The housing member 102 is formed in a semicylindrical shape or a partly semicylindrical shape, and so as to be fittable in the device main body 101.

The housing member 102 is, as shown in FIG. 29(b), equipped with a guide member 91 for inserting the liquid crystal paper 11 to inside the housing member 102 during the housing operation. The liquid crystal paper 11 guided by the guiding member 91 is housed in the housing member 102, as indicated by broken lines in FIG. 29(a), so as to fit along an internal surface of the housing member 102, in a substantially arc form.

Thus, by arranging for attachment/detachment of the housing member 102 to/from the device main body 101 in the state in which the liquid crystal paper 11 is housed in the housing member 102, the housing of the liquid crystal paper 11 is facilitated, while the liquid crystal layer 11 is prevented from becoming scarred or damaged when being brought in or brought out to or from the device main body 101.

Figure 30:
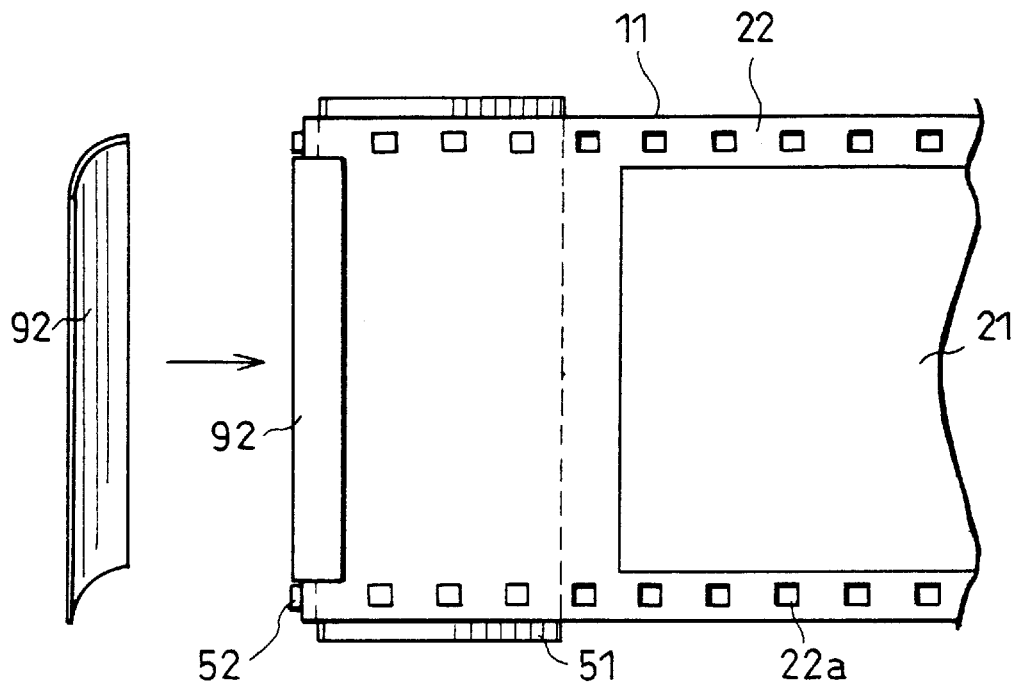
FIG. 30 is an explanatory view illustrating a liquid crystal paper housing state of the housing member provided in the information recording device shown in FIG. 27.

The following description will explain a method for attaching the liquid crystal paper 11 to the device main body 101 thus arranged as above, while referring to FIG. 30.

A plurality of projections 52 are provided on both ends of a cylindrical member 51 which is provided inside the device main body 101. On the other hand, a plurality of apertures 22a in which the projections 52 of the cylindrical member 51 fit are provided on the non-information-display region 22 of the liquid crystal paper 11.

With the foregoing arrangement wherein the liquid crystal paper 11 has the aperture 22a which fit with the projections 52 on the cylindrical member 51, the liquid crystal paper 11 is wound around the cylindrical member 51, with the apertures 22a fitted with the projections 52 of the cylindrical member 51. The projections 52 may be tapered so that the apertures 22a of the liquid crystal paper 11 easily fits thereon.

For stable winding of the liquid crystal paper 11, a pressing member 92 for pressing the liquid crystal paper 11 against the cylindrical member 51 may be provided. More specifically, the cylindrical member 51 is housed in a state in which the projections 52 of the cylindrical member 51 and the apertures 22 of the liquid crystal paper 11 are fit to each other, and the liquid crystal paper 11 is fit to the cylindrical member 51 using the pressing member 92 which is, for example, in a half-pipe form.

The pressing member 92 is formed so as to have a function of pressing the liquid crystal paper 11 against the cylindrical member 51 with use of an energizing member such as a spring, and the pressing member 92 may have, on a pressing surface thereof, a member made of felt or the like having small friction with the liquid crystal paper 11.

Furthermore, in the case where the distinction marks 81 and 82 are put on the liquid crystal paper 11, like in the first embodiment, the information recording device thus arranged detects the distinction marks 81 and 82 so as to recognize which means is now operating, the information recording means or the initializing means, and supplies the driving means 41 or 41' with signals from either the distinction signal detecting means 76 or 76' that is performing information recording, whereby transport control of the liquid crystal paper 11 is performed. For example, signals from the distinction signal detecting means 76 or 76' are switched in synchronization with the output of the information recording signals, and are supplied to the driving means 41 or 41'.

Furthermore, in the case where the initializing means 39 and the information recording means 40 are integrated into one, that is, only one information erasing and recording means is used, the distinction signal detecting means 76 may be provided in the middle of the transport path 101b between the openings 101a and 101a' in the device main body 101, so that identical control to that in the first embodiment may be performed.

In the foregoing first and second embodiments, the liquid crystal paper 11 is housed in a curved state in the case where information is rewritten in the liquid crystal paper 11, but the following description will explain a third embodiment in which the liquid crystal paper 11 is flatly held, and moved in a horizontal direction, for information rewriting.

Third Embodiment

The following description will explain still another embodiment of the present invention, while referring to FIGS. 32 through 39. The members having the same structure (function) as those in the above-mentioned embodiments will be designated by the same reference numerals and their description will be omitted.

Figure 32:
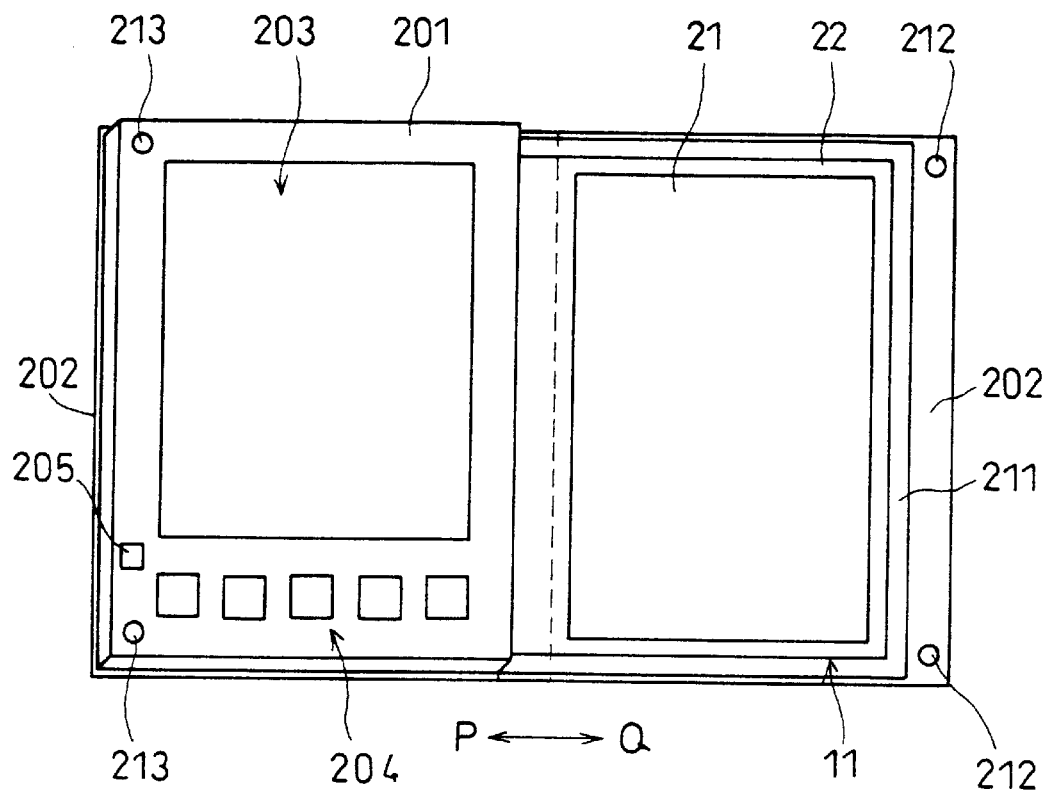
FIG. 32 is a plan view illustrating an information recording device in accordance with still another embodiment of the present invention.

An information recording device in accordance with the present embodiment is composed of a device main body 201 in a substantial rectangular parallelepiped shape, and a frame member 202 which supports the liquid crystal paper 11 in a horizontal direction with respect to the device main body 201 and transports the liquid crystal paper 11, as shown in FIG. 32.

On an upper surface of the device main body 201, there are provided a display section 203, an operation section 204, and a power supply section 205. These members are identical to the display section 34, the operation section 35, and the power supply section 36 of the information recording device shown in FIG. 1, and their description is therefore omitted.

The frame member 202 is about twice the device main body 201 in size, and is openably formed.

The information recording device thus arranged becomes in a closed state, when engagement members 212 provided on an outer side on an upper surface of the frame member 202 are fit in fitting members 213 provided on an outer side on an upper surface of the device main body 201. The information recording device is arranged so as to be carried in this closed state. The engagement members 212 and the fitting member 213 are detachably provided.

The foregoing frame member 202 is equipped with a flat member (frame-shaped member) 211 for holding the liquid crystal paper 11 in a spread state. The liquid crystal paper 11 is attached to the flat member 211 in such a manner as to be easily detached therefrom. The flat member 211 is driven so as to move on the frame member 202 in directions indicated by arrows P and Q.

Figure 33:
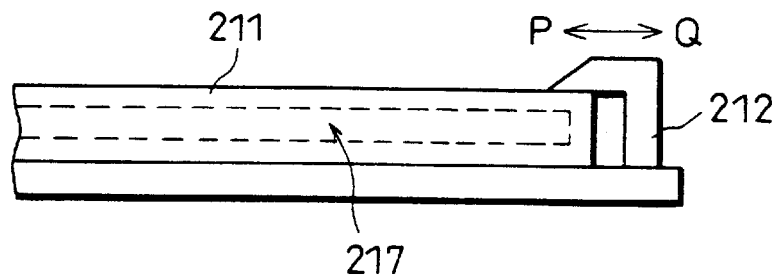
FIG. 33 is an explanatory view illustrating a state in which a flat member is engaged in a frame member provided in the information recording device shown in FIG. 32.

The foregoing flat member 211 is, as shown in FIG. 33, provided with a first guide space 217 which is slightly larger than the liquid crystal paper 11 in size, so that the liquid crystal paper 11 is easily inserted thereto from an edge of the flat member 211.

In the foregoing frame member 202, the liquid crystal paper 11 attached to the flat member 211 is transported in an interlocked manner with the flat member 211. When the flat member 211 is sent out, it becomes fit into the engagement members 212 each of which is formed in a hook shape, as shown in FIG. 33, thereby being held in a right place. Incidentally, the engagement members 212 are also members which fit in the aforementioned fitting member 213 of the device main body 201.

Thus, the liquid crystal paper 11 is brought in/out to/from the device main body 201 by means of the flat member 211. Therefore, as compared with the case where the liquid crystal paper 11 is directly brought in/out to/from the device main body 201, there is much less possibility of the liquid crystal paper 11 becoming caught by the device main body 201 and damaged, and the liquid crystal paper 11 is surely transported to a predetermined position on the device main body 201. Furthermore, since the flat member 211 is detachably provided in the device main body 201, the liquid crystal paper 11 can be replaced only by replacing the flat member 211. Therefore, by preparing a plurality of the flat members 211, a plurality of sheets of the liquid crystal paper 11 can be used simultaneously.

Figure 34:
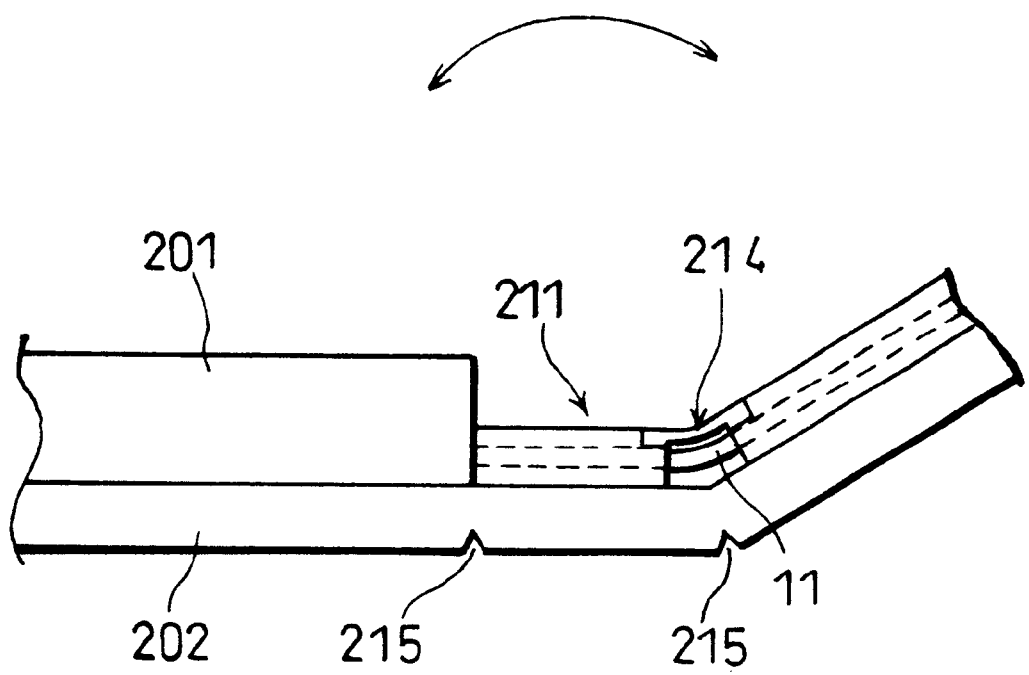
FIG. 34 is an explanatory view illustrating a bend structure in the information recording device shown in FIG. 32.

As shown in FIG. 34, the flat member 211 is arranged so that a part thereof in the vicinity of center is composed of a flexible work part 214 which is formed bendable, while a notch 215 is formed on an external side of a bent part of the frame member 202. By thus arranging the notch 215 of the frame member 202 and the flexible work part 214 of the flat member 211 so as to correspond to each other, it is made possible to bend the frame member 202 to the device main body 201 side.

Here, the following description will explain a method of attaching the liquid crystal paper 11 to the flat member 211, while referring to FIGS. 35(a) through 35(c), 36, and 37.

Figure 35A:
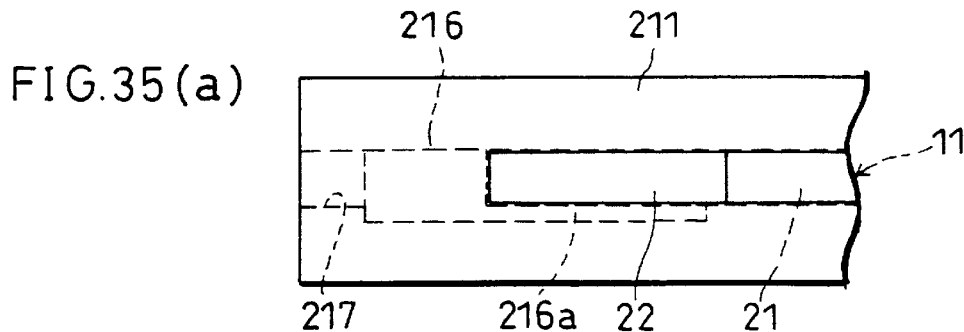
FIGS. 35(a) through 35(c) are explanatory views illustrating an attaching mechanism for attaching liquid crystal paper to the flat member provided in the information recording device shown in FIG. 32.
Figure 35B:
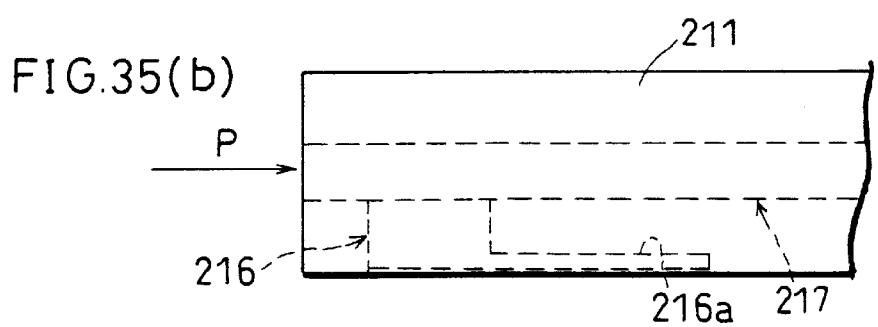
Figure 35C:
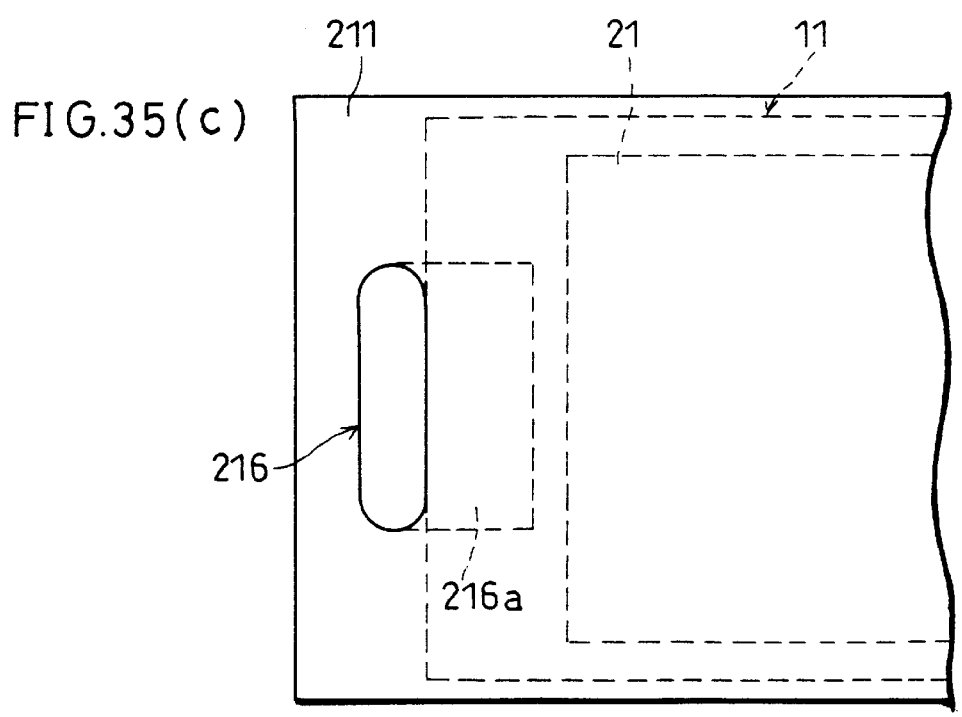

First of all, as shown in FIG. 35(c), a pressing member 216 is provided at a rear end of the flat member 211, that is, a position corresponding to a rear end of the liquid crystal paper 11 when the liquid crystal paper 11 is mounted on the flat member 211.

When the liquid crystal paper 11 is mounted on the flat member 211 by use of energizing means such as a spring, the pressing member 216 is pushed up to an upper end of the first guide space 217, as shown in FIG. 35(a), so that the liquid crystal paper 11 is held in a state in which the pressing member 216 presses the non-information-display region 22. of the liquid crystal paper 11 upward in the first guide space 217 with a paper support surface 216a of the pressing member 216 brought into contact with the liquid crystal paper 11. On the other hand, when the liquid crystal paper 11 is not mounted on the flat member 211, the pressing member 216 is pushed down to a lower position than that of the first guide space 217, and is locked, as shown in FIG. 35(b). Here, the pressing member 216 is arranged so as to be positioned at the level of or lower than a lower surface of the first guide space 217 when being in the pushed-down and locked state.

In this case, the pressing member 216 is arranged so that, when the liquid crystal paper 11 is inserted in the arrow P direction in the state in which the pressing member 216 is locked as shown in FIG. 35(b), thereby pushing the pressing member 216 downward, the pressing member 216 becomes unlocked.

Incidentally, the mechanism of the pressing member 216 is not limited to that shown in FIGS. 35(a) through 35(c) in which the pressing member 216 is pushed down to below the first guide space 217 thereby becoming locked, and the liquid crystal paper 11 is held in the first guide space 217 by unlocking the pressing member 216. The mechanism may be such that the pressing member 217 is locked over the first guide space 217 and the liquid crystal paper 11 is pressed downward in the first guide space 217.

The following description will explain a method of attaching the liquid crystal paper 11 to the flat member 211.

Figure 36:
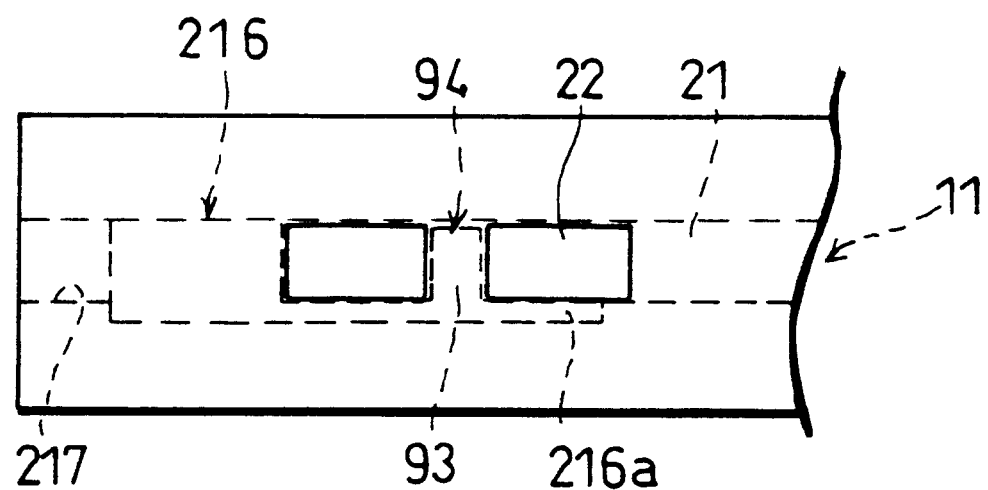
FIG. 36 is an explanatory view illustrating another example of an attaching mechanism for attaching liquid crystal paper to the flat member provided in the information recording device shown in FIG. 32.

A method is available in which a plurality of projections 93 are provided on a part of the paper support surface 216a of the pressing member 216, while a plurality of apertures 94 in which the projections 93 fit are provided on the non-information-display region 22 of the liquid crystal paper 11, as shown in FIG. 36. In this case, the pressing member 216 is actuated by energizing means such as a spring as described above, and in a state in which the liquid crystal paper 11 is attached to the flat member 211, the liquid crystal paper 11 is fixed to the flat member 211 with the apertures 94 of the non-information-display region 22 of the liquid crystal paper 11 fitting with the projections 93 of the pressing member 216.

Furthermore, the following description will explain another method of attaching the liquid crystal paper 11 to the flat member 211.

Figure 37:
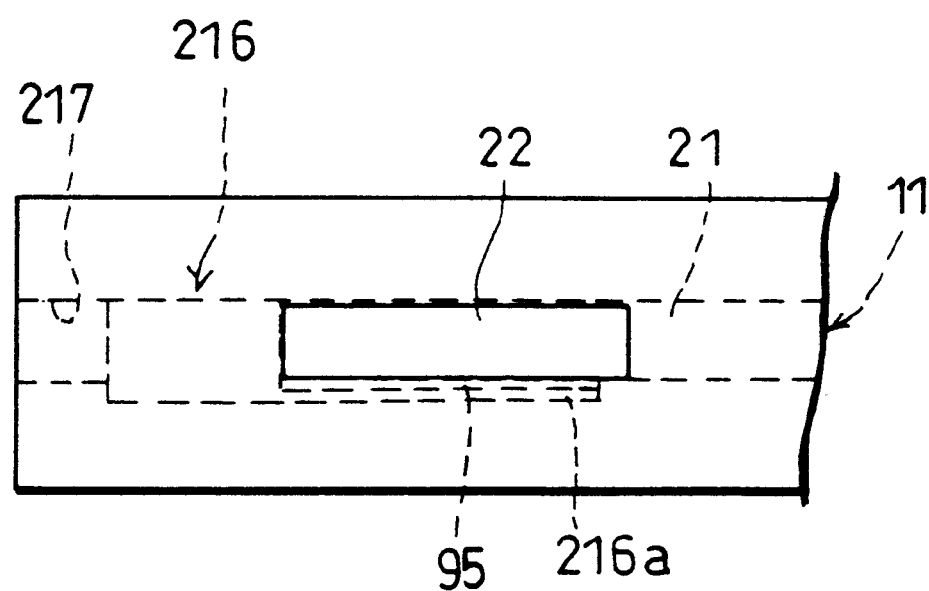
FIG. 37 is an explanatory view illustrating still another example of an attaching mechanism for attaching liquid crystal paper to the flat member provided in the information recording device shown in FIG. 32.

Another method is available in which, as shown in FIG. 37, the pressing member 216 is provided with a flexible member 95 on the paper support surface 216a so as to pressing the liquid crystal paper 11, through the flexible member 95, upward in the first guide space 217, thereby fixing the liquid crystal paper 11.

Silicon rubber having a great friction with the liquid crystal paper 11 and less reaction with the liquid crystal paper 11, with a surface of the silicon rubber roughly processed, for example, is adapted so as to form the flexible member 95. Here, the flexible member 95 may be provided on a part of the paper support surface 216a of the pressing member 216, but it is preferably provided over the entire paper support surface 216a.

Next, the following description will explain a method of transporting the flat member 211.

Figure 38:
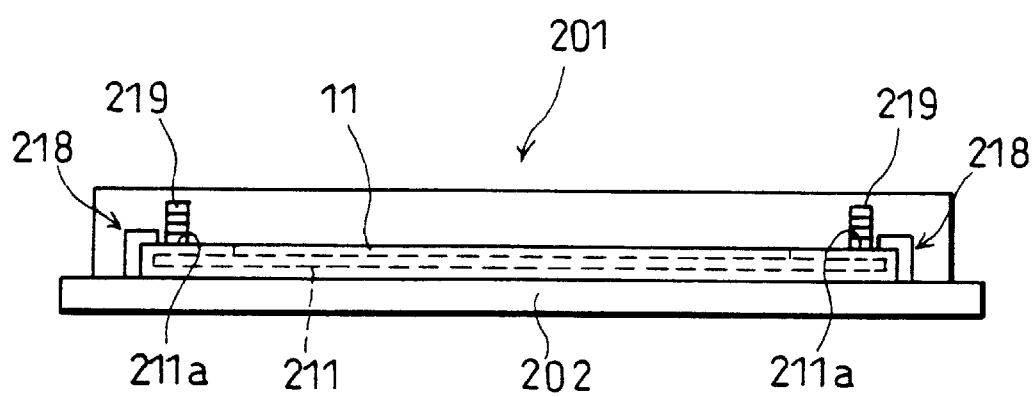
FIG. 38 is an explanatory view illustrating a transport mechanism for transporting the flat member to the device main body in the information recording device shown in FIG. 32.
Figure 39:
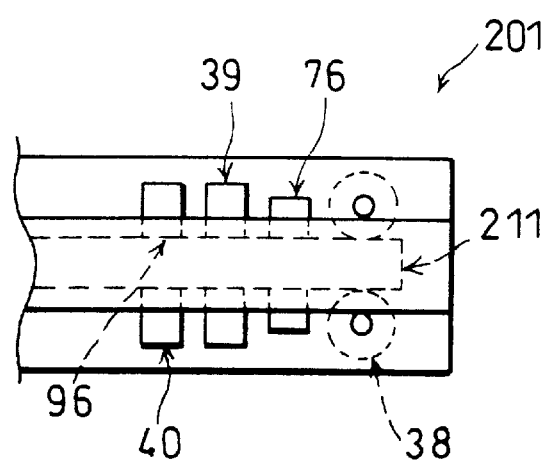
FIG. 39 is an explanatory view illustrating a second guide space for guiding the flat member in an information recording and erasing section in the information recording device shown in FIG. 32.

As shown in FIG. 38, the device main body 201 is equipped with guides 218 which are formed along both edges of the flat member 211. The guides 218 are arranged so that the flat member 211 can be slid therealong.

On an upper surface of the flat member 211, racks 211a are formed in the transport direction. On the other hand, gears 219 which gear in the racks 211a are provided in the device main body 210. The gears 219, when rotating, gear in the racks 211a, thereby moving the flat member 211 in a desired direction. In other words, the gears 219 and the racks 211a constitute driving means for transporting the flat member 211, that is, the liquid crystal paper 11.

Furthermore, in the device main body 201 of the information recording device thus arranged, the cleaning means 38, the distinction signal detecting means 76, the initializing means 39, and the information recording means 40, as well as box-like portions have such surfaces facing the flat member 211 as to substantially fall in one and same plane, whereby a second guide space 96 is formed.

With the second guide space 96 thus formed, the flat member 211 can be stably transported without being caught by the cleaning means 38 or the other members.

Furthermore, the flat member 211 may be detachably provided in the device main body 201. This results in that the liquid crystal paper 11 can be replaced only by replacing the flat member 211. With this arrangement, by preparing a plurality of the flat members 211, a plurality of sheets of the liquid crystal paper 11 can be used simultaneously.

In the foregoing descriptions of the embodiments, a recording method in which the liquid crystal paper is used as recording medium sheet and the recording is carried out with use of an electric field is taken as an example, but the embodiments of the present invention are not limited to these. The present invention is applicable to, for example, the following recording methods: a recording method in which reversible recording is possible with use of a resin with flexibility; a thermal recording method in which laser is applied with respect to a material such as polymer/long chain molecule-based leuco dye to which a developer is added; and a method in which recording and erasing are carried out with heat and magnetism with respect to a medium formed by microcapsulating flaked magnetic particles.

The following description of a fourth embodiment of the present invention will explain an information recording method with respect to recording medium sheets other than the liquid crystal paper.

Fourth Embodiment

The following description will explain still another embodiment of the present invention. Incidentally, since the arrangement of the information recording device in accordance with the present embodiment is substantially identical to that of the foregoing first through third embodiments, only except the information recording means and the initializing means which are replaced depending on the type of the recording medium sheet used. Therefore, description of the arrangement of the information recording device will be omitted.

Other than the method in which information is recorded in the liquid crystal paper like in the first through third embodiments above described, methods applicable to the information recording device of the present invention, that is, types of recording medium sheets and information recording mechanisms with respect to the same, are roughly classified into (i) a thermal recording method, and (i) a thermal and magnetic recording method.

First of all, the following description will explain (i) the thermal recording method.

In the thermal recording method, a thermal head, a laser, or the like is used as writing means (equivalent to the information recording means 40), and a hot stamp, a roller, a bar, a thermal head, or the like is used as erasing means (equivalent to the initializing means 39).

The recording method by means of the foregoing writing means can be classified into a method using physical transition and a method using chemical transition.

The recording method using physical transition will be first explained below, with reference to FIGS. 40(a), 40(b), and 41.

Figure 40A:
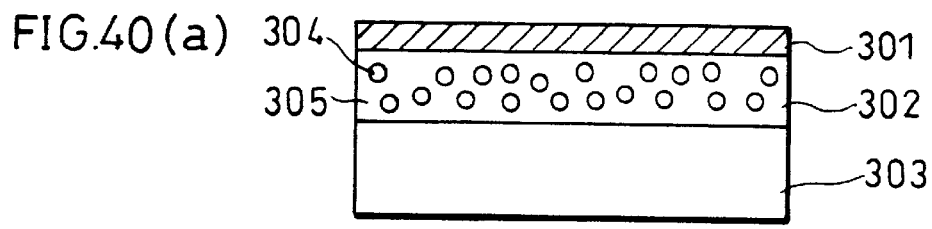
FIGS. 40(a) and 40(b) illustrate another example of a recording medium sheet of the present invention.

As the recording medium sheet used in this method, a recording medium sheet in which, as shown in FIG. 40(a), a recording layer 302 and a surface protective layer 301 are laminated in this order on a transparent support body 303 is used, in the case where a thermal head is adapted so as to be used as writing means.

The recording layer 302, made of a polymer resin 305 with an organic low molecular material 304 dispersed therein, has a characteristic in that its state is caused, by heat, to reversibly shift between a transparent state and an opacified state. More specifically, a thermoplastic high molecular compound such as a vinyl chloride-vinyl acetate copolymer, for example, are used as the polymer resin 305, while particles of a long chain low molecular compound such as a higher fatty acid are used as the organic low molecular material 304. In other words, as the recording layer 302, the thermoplastic high molecular compound in which particles of the long chain low molecular compound are dispersed is used.

Figure 40B:
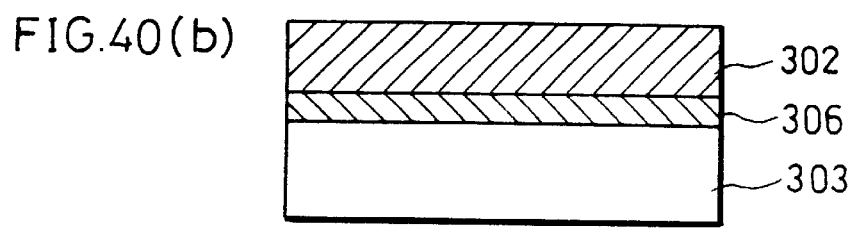

Furthermore, in the case where a laser is adapted so as to be used as the writing means, a recording medium sheet formed by providing a thermal conversion layer 306 between a transparent support body 303 and a recording layer 302 as shown in FIG. 40(b) is used.

Figure 41:
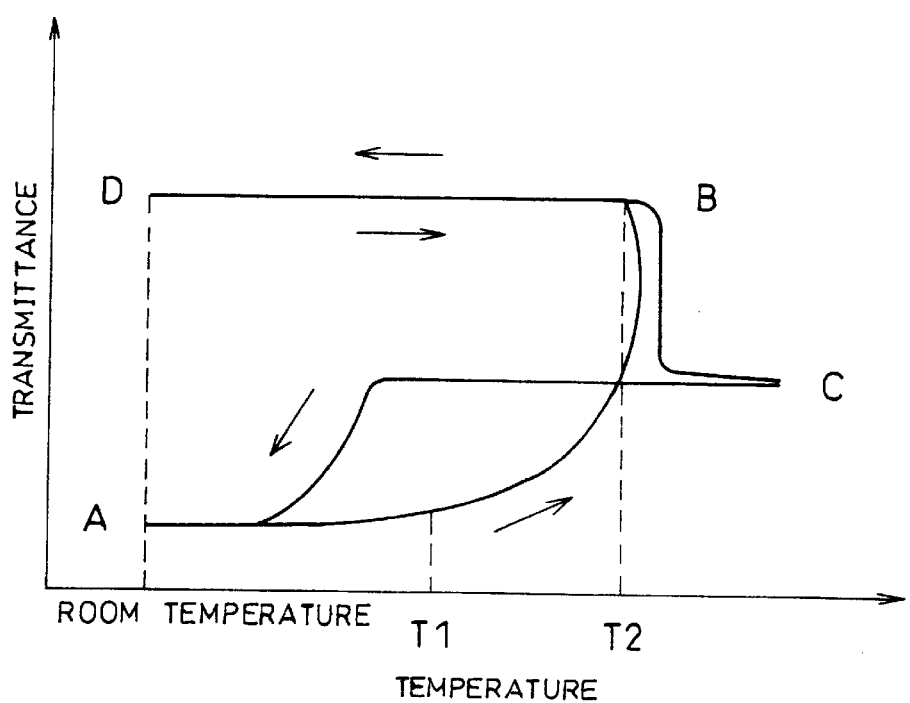
FIG. 41 is a graph illustrating a recording, operation in the case where the recording medium sheet shown in FIG. 40(a) is used.

The following description will explain a recording operation with respect to the recording medium sheet shown in FIG. 40(a), while referring to FIG. 41. A through D in FIG. 41 indicate states of the recording layer 302.

First, at room temperature, the recording layer 302 is in an opacified state (State A). With heat application in this state, the transmittance starts increasing at a temperature T1, and the recording layer 302 becomes in a state of having the maximum transmittance at a temperature T2 (State B).

Next, in the case where the temperature is lowered to room temperature from the temperature when the recording layer 302 is in State B, the maximum transmittance is maintained (State D).

Subsequently, the recording layer 302 in State D is heated to the temperature T2 or above, and it becomes in a state between the maximum transmittance state and the maximum opacity state (State C).

Then, as the recording layer 302 in State C is cooled to room temperature again, it returns in the opacified state.

Thus, the information writing and erasing with respect to the recording medium sheet can be conducted by repeating the heating and the cooling.

Next, the recording method using chemical transition will be described below, with reference to FIGS. 42 and 43.

Figure 42:
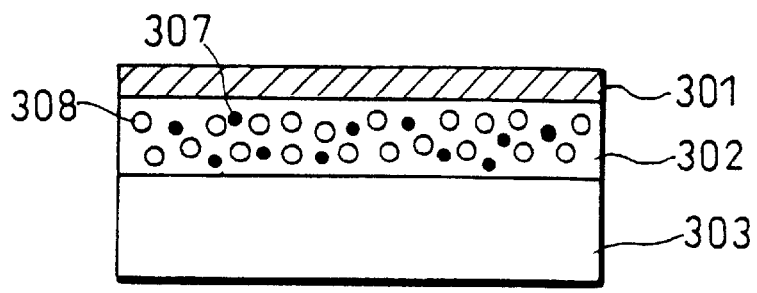
FIG. 42 is a schematic cross-sectional view illustrating another example of a recording medium sheet of the present invention.
Figure 43:
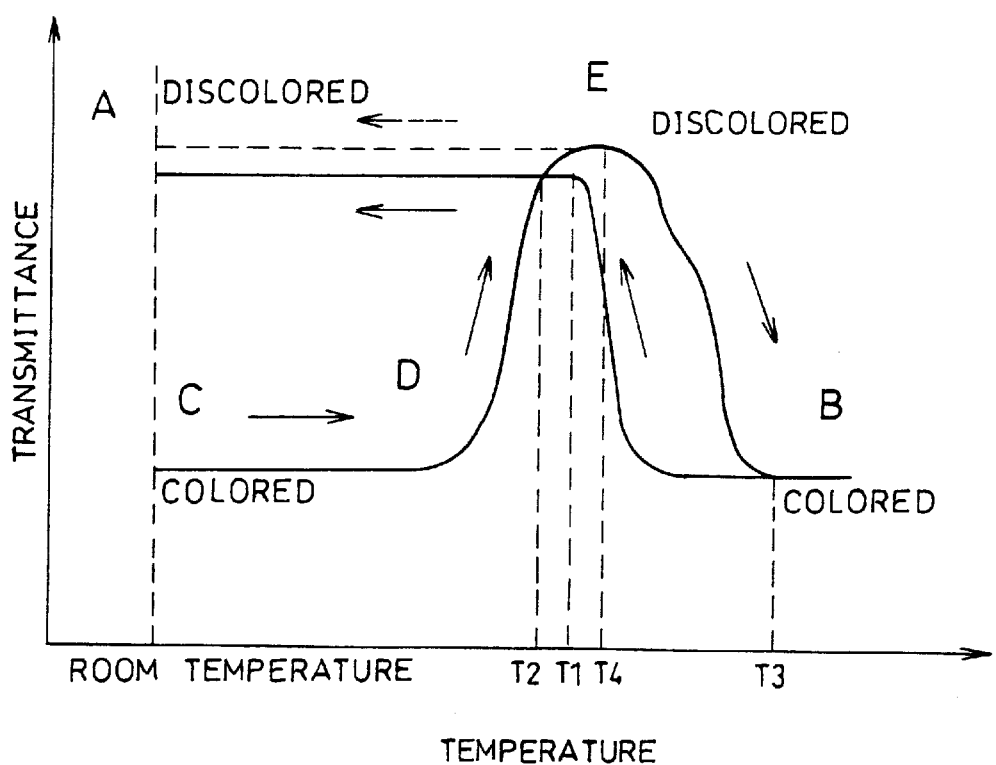
FIG. 43 is a graph illustrating a recording operation in the case where the recording medium sheet shown in FIG. 42 is used.

The recording medium sheet used in the method is a recording medium sheet, as shown in FIG. 42, formed by laminating a recording layer 302 and a surface protective layer 301 in this order on a transparent support body 303.

To form the recording layer 302, a mixture of a leuco dye 308 and a developing/fading agent 307 is used. More specifically, in this recording method, transformation of a structure of the leuco dye due to heat, and development/fade following to the same, are utilized. In this case, various colors including black and blue are selectable as colors to be developed.

A fluoran-based leuco dye, for example, is used as the foregoing leuco dye 308, while octadecyl phosphoric acid, for example, is used as the developing/fading agent 307.

The recording operation with respect to the recording medium sheet will be explained with reference to FIG. 43. A through E in FIG. 43 indicate states of the recording layer 302.

First, as heated, development takes place when the mixture becomes in a melt state at a temperature T3 or above (State B).

In the case where the temperature is rapidly lowered in this state, the color-developed state is maintained at room temperature (State C).

On the other hand, in the case where the cooling is gradually carried from the temperature in State B, discoloration occurs in the vicinity of a temperature T1, and the discolored state is maintained even at room temperature (State A).

When the heating is carried out from room temperature in State C in which color is developed, discoloration suddenly occurs in the vicinity of a temperature T2. In the case where the heating is further carried out thereby causing the temperature to rise to a temperature T4 or above, the color again develops.

Thus, the information writing and erasing with respect to the recording medium sheet can be conducted by repeating the heating and the cooling.

Next, the (ii) thermal and magnetic recording method will be described below.

In the thermal and magnetic recording method, writing magnetic field applying means for applying a magnetic field in a perpendicular direction with respect to the recording medium sheet while heating the same is used as the writing means (equivalent to the information recording means 40), while erasing magnetic field applying means for applying a magnetic field in a horizontal direction with respect to the recording medium sheet while heating the same is used as the erasing means (equivalent to the initializing means 39).

Figure 44A:
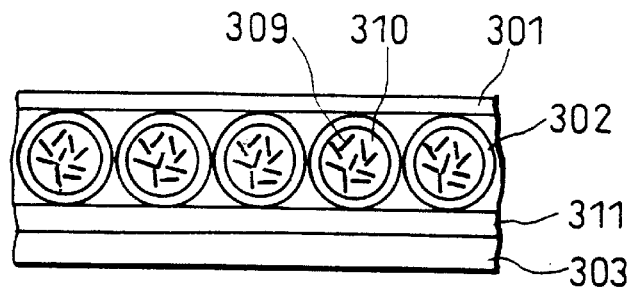
FIGS. 44(a) through 44(c) illustrate another example of a recording medium sheet of the present invention.
Figure 44B:
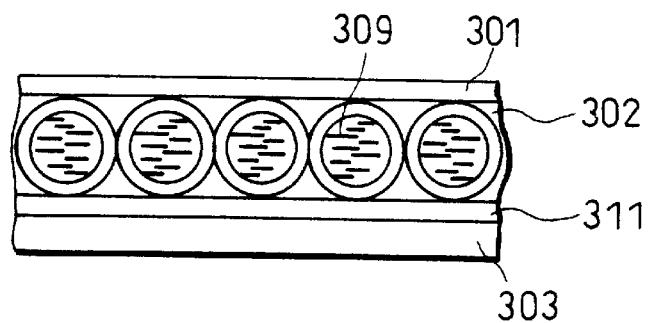
Figure 44C:
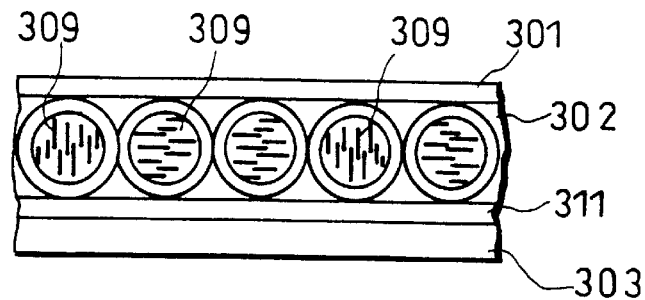
Figure 45:
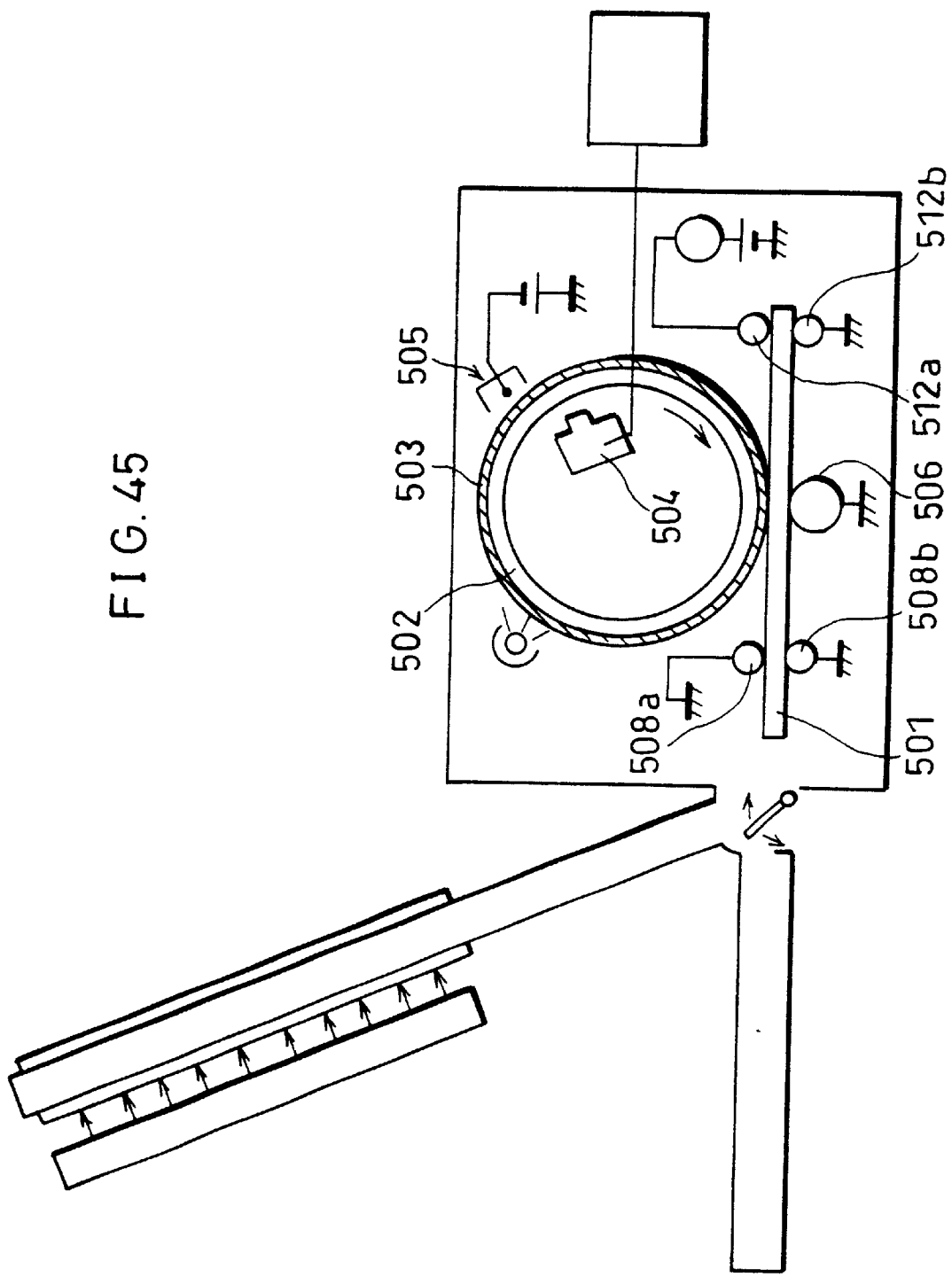
FIG. 45 is a view illustrating a schematic arrangement of a conventional information recording device.

Furthermore, the recording medium sheet used herein is formed, as shown in FIG. 44(*a*), by laminating a coloration layer 311, a recording layer 302, and a surface protective layer 301 in this order on a transparent support body 303.

A plurality of capsules containing magnetic particles 309 in a flaked state and wax 310 are provided on a flat surface of the recording layer 302.

The magnetic particles 309 are aligned at random as shown in FIG. 44(*a*), when the recording layer 302 is formed.

In the state shown in FIG. 44(*a*) in which the magnetic particles 309 are aligned at random, the recording layer 302 is heated, while a magnetic field is applied in a horizontal direction with respect to the recording layer 302, which results in a state of a high reflectance as shown in FIG. 44(*b*) (erased state).

Furthermore, by partially applying a magnetic field in a perpendicular direction with respect to the recording layer 302 in the erased state shown in FIG. 44(*b*) while heating the same., there produced are both of a state in which the magnetic particles 309 in the flaked state are aligned in a perpendicular direction and a state in which the magnetic particles 309 in the flaked state are aligned in a horizontal direction.

A region in which the magnetic particles 309 in the flaked state are aligned in the horizontal direction and a region in which they are aligned in the perpendicular direction have different reflectances of incident light. Utilizing this phenomenon, a desired image is formed on the recording medium sheet.

As has been described above, a first information recording device of the present invention which is an information recording device for use with a recording medium sheet to which information such as characters and images can be recorded and erased, is characterized in that a device main body thereof is portable, the device main body including (1) memory means for storing information to be recorded in the recording medium sheet, (2) information recording and erasing means for erasing information recorded in the recording medium sheet to return the recording medium sheet to an initialized state in which recording information is possible, and recording, as required, information stored in the memory means with respect to the recording medium sheet in the initialized state, and (3) sheet holding means for holding the recording medium sheet in a manner such that the recording medium sheet can be transported to an information erasure position and to an information recording position in the information recording and erasing means, and such that the recording medium sheet is curved at portions thereof other than information recording and erasing portions.

With the foregoing arrangement, the device main body incorporating the memory means, the information recording and erasing means, and the like is also provided with the sheet holding means which holds the recording medium sheet in a manner such that the recording medium sheet can be transported to the information erasure position and the information recording position in the information recording and erasing means, and such that the recording medium sheet is curved at portions thereof other than information recording/erasure portions thereof is carried out. Therefore, it is possible to make the device main body smaller in size.

Besides, since the device main body is formed portable, the user is allowed to, at any place, record information into the recording medium sheet and view it.

Furthermore, in the case where necessary information is stored in the memory means provided in the device main body, it is possible to, whenever necessary, read out the information from the memory means and display it on the recording medium sheet.

Moreover, since the information displayed can be rewritten by the information recording and erasing means, it is possible to read massive information with use of only one recording medium sheet, and as a result it is possible to reduce the number of the recording medium sheets put in use.

A second information recording device of the present invention, which is arranged as the first information recording device is, is further characterized in that one end of the recording medium sheet is fixed to the device main body, a transport path for guiding the recording medium sheet to the erasure position and the recording position in the information recording and erasing means is formed in the device main body, and an opening of the transport path through which the recording medium sheet is discharged is gradually curved downward in a convex form.

With the foregoing arrangement, in addition to the effect achieved by the first information recording device, the following effect can be achieved. Since the opening serving as the recording medium sheet discharge opening is shaped so as to gradually curve downward in a convex form, the recording medium sheet discharged therethrough can be curved in a direction crossing the transport direction. This ensures that the recording medium sheet does not hang down at the opening. Therefore, the user can hold the device main body with one hand to see information displayed on the recording medium sheet discharged through the opening.

A third information recording device of the present invention, which is arranged as the first information recording device is, is further characterized in that one end of the recording medium sheet is fixed to the device main body, a transport path for guiding the recording medium sheet to the erasure position and the recording position in the information recording and erasing means is formed in the device main body, and a portion raised downward is provided on an upper side in the vicinity of the opening serving as a recording medium sheet discharge opening of the transport path.

With the foregoing arrangement wherein a portion raised downward is provided on an upper side in the vicinity of the opening serving as a recording medium sheet discharge opening, the recording medium sheet discharged therethrough can be curved in a direction crossing the transport direction due to the raised portion. This ensures that the recording medium sheet does not hang down at the opening. Therefore, the user can hold the device main body with one hand to see information displayed on the recording medium sheet discharged through the opening.

A fourth information recording device of the present invention, which is arranged as any one of the first through third information recording devices is, is further characterized in that the device main body includes holding means for holding the recording medium sheet discharged through the discharge opening.

With the foregoing arrangement, in addition to the effect achieved by any one of the first through third information recording devices, the following effect can be achieved. Since the holding means for holding the recording medium sheet discharged from the discharge opening is provided, it is possible to view information written in the recording medium sheet discharged from the device main body in a state in which the recording medium sheet is supported.

A fifth information recording device of the present invention, which is arranged as any one of the first through fourth information recording devices, is further characterized in that the device main body includes transport means which is brought into contact with the recording medium sheet and transports the recording medium sheet to the erasure position and the recording position in the information recording and erasing section, and the transport means is detached from the recording medium sheet when not transporting the recording medium sheet.

With the foregoing arrangement, in addition to the effect achieved by any one of the first through fourth information recording devices, the following effect can be achieved. Since the transport means is brought into contact with the recording medium sheet only when the recording medium sheet is being transported, unnecessary pressure is not applied to the recording medium sheet. The forgoing arrangement is particularly effective in the case where a recording medium sheet using liquid crystal as recording medium (liquid crystal paper) is used, as is the case with a sixth information recording device described below.

The sixth information recording device of the present invention, which is arranged as the fifth information recording device is, is further characterized in that liquid crystal is adapted so as to be used as recording medium of the recording medium sheet, and that the recording medium sheet is transported with the transport means brought into contact with sealing portions of the recording medium sheet, the sealing sections being used for sealing the liquid crystal.

With the foregoing arrangement, in addition to the effect achieved by the fifth information recording device, the following effect can be achieved. Since unnecessary pressure is not applied to the liquid crystal part as the information display region of the recording medium sheet (liquid crystal paper), display performance of the liquid crystal paper is not impaired.

A seventh information recording device of the present invention, which is arranged as any one of the first through sixth information recording devices is, is further characterized in that the sheet holding means is equipped with winding means for winding the recording medium sheet.

With the foregoing arrangement, in addition to the effect achieved by any one of the first through sixth information recording devices, the following effect can be achieved. Since the sheet holding means is equipped with the winding means for winding the recording medium sheet, the recording medium sheet housed can be kept in a curved state. This makes the space required for housing the recording medium sheet smaller in size, thereby making the device main body smaller in size.

An eighth information recording device of the present invention, which is an information recording device for use with a recording medium sheet with respect to which information such as characters and images can be recorded and erased, is characterized by comprising a device main body which includes (i) memory means for storing information to be recorded with respect to the recording medium sheet, (ii) information recording and erasing means for erasing information recorded in the recording medium sheet to return the recording medium sheet to an initialized state in which recording information is possible, and recording, as required, information stored in the memory means with respect to the recording medium sheet in the initialized state, and (iii) sheet holding means for holding the recording medium sheet in a manner such that the recording medium sheet can be transported to an information erasure position and an information recording position in the information recording and erasing means and such that the recording medium sheet is curved at portions thereof other than information recording/erasure portions thereof, as well as it is further characterized in that a transport path for guiding the recording medium sheet to the information erasure position and the information recording position in the information recording and erasing means is provided in the device main body, that two openings as discharge openings through which the recording medium sheet is brought into and out of the device main body are provided on an upper part and a lower part of a same surface of the device main body, respectively, and that a plurality of the information recording and erasing means disposed along the transport path.

With the foregoing arrangement wherein the recording medium sheet is brought into and out of the device main body through the foregoing two openings and a plurality of the information recording and erasing means are provided along the transport path for transport of the recording medium sheet, it is possible to conduct both the initialization and the information recording with respect to the recording medium sheet while the recording medium sheet is being transported.

Since this enables the rewriting of information with respect to the recording medium sheet during a period since the recording medium sheet is brought into the device main body from outside through one opening until it is brought out the device main body through the other opening, the information rewriting can be more speedily performed in this case as compared with the case where the recording medium sheet in an initialized state is once housed in the device main body and information recording is carried out when the recording medium sheet is discharged.

Besides, since the two openings are provided on one and same side of the device main body, it is possible to conduct the bringing-in and -out of the recording medium sheet on the one and same surface. Therefore, a space required for the use of the device can be made smaller.

Moreover, since the transport path also serves as the sheet housing section (sheet holding means) for housing the recording medium sheet, the size of the sheet housing section (sheet holding means) can be reduced to minimum, thereby making it possible to make the device main body smaller in size.

A ninth information recording device of the present invention, which is arranged as the eighth information recording device is, is further characterized in that a length of the transport path from one end to the other end thereof is shorter than a length of the recording medium sheet to be transported through the transport path.

With the foregoing arrangement, in addition to the effect achieved by the eighth information recording device, the following effect can be achieved. Since the length of the transport path from one end to the other end thereof is set shorter than a length of the recording medium sheet to be transported through the transport path, the recording medium sheet projects from the transport path at all times. This arrangement facilitates extraction of the recording medium sheet from the device main body with use of the projecting part of the recording medium sheet in the case where the recording medium sheet is stopped and caught somewhere along the transport path due to a defect in the transport means inside the device main body.

A tenth information recording device, which is arranged as either the eighth or ninth information recording device is, is further characterized in that the recording medium sheet has at least two information display regions, layer structures in the information display regions being substantially symmetric to each other.

With the foregoing arrangement, in addition to the effect achieved by the eighth or ninth information recording device, the following effect can be achieved. Since at least two information display regions are formed in the recording medium sheet and their layer structures are arranged so as to be substantially symmetric to each other, the user can view, in the same direction, information written in the recording medium sheet brought out through the openings formed respectively on upper and lower parts of the same surface of the device main body.

An eleventh information recording device of the present invention, which is an information recording device for use with a recording medium to which information such as characters and images can be recorded and erased, is characterized by comprising a device main body which includes (i) memory means for storing information to be recorded with respect to the recording medium sheet, (ii) information recording and erasing means for erasing information recorded in the recording medium sheet to return the recording medium sheet to an initialized state in which recording information is possible, and recording, as required, information stored in the memory means with respect to the recording medium sheet in the initialized state, and (iii) sheet holding means for holding the recording medium sheet in a manner such that the recording medium sheet can be transported to an information erasure position and an information recording position in the information recording and erasing means, and is characterized by that the device main body is arranged so that, with the device main body kept in a spread state, the recording medium sheet is brought in and out with respect to the sheet holding means.

With the foregoing arrangement wherein the recording medium sheet is brought in and out with respect to the sheet holding means with the device main body kept in a spread state, it is possible to use the recording medium sheet without curving it. As a result, there is substantially no possibility of the recording medium sheet being curved thereby becoming damaged when the recording medium sheet is being housed or the like.

Furthermore, since the information recording is conducted with respect to the recording medium sheet with the device main body kept in the spread state and the information is displayed in the same state while the device main body is carried in a closed state, it is possible to use the information recording device as if using a book.

A twelfth information recording device of the present invention, which is arranged as the eleventh information recording device is, is further characterized by further comprising a frame member which holds the recording medium sheet in a spread state and which is brought into and out of the device main body in a state of holding the recording medium sheet.

With the foregoing arrangement, in addition to the effect achieved by the eleventh information recording device, the following effect can be achieved. Since the frame member which holds the recording medium sheet in a spread state and which is brought into and out of the device main body in a state of holding the recording medium sheet, the recording medium sheet is brought into and out of the device main body by means of the frame member. As a result, there is much less possibility of the recording medium sheet becoming caught by the device main body and damaged as compared with the case where the recording medium sheet is directly brought into and out of the device main body, and the recording medium sheet is surely transported to a predetermined position in the device main body.

A thirteenth information recording device of the present invention, which is arranged as the twelfth information recording device is, is further characterized in that the frame member is detachably provided to the device main body.

With the foregoing arrangement, in addition to the effect achieved by the twelfth information recording device, the following effect can be achieved. Since the frame member is detachably provided to the device main body, the recording medium sheet can be replaced only by replacing the frame member. With this arrangement, by preparing a plurality of the frame members, a plurality of sheets of the liquid crystal paper can be used simultaneously.

A fourteenth information recording device, which is arranged as any one of the first through thirteenth information recording devices is, is further characterized in that the device main body further includes a transport path for guiding the recording medium sheet to the erasure position and the recording position, an opening/closing member openably provided at an end of the transport path, detecting means for detecting an opened or closed state of the opening/closing member, and stopping means for stopping driving of the device main body when the detecting means detects the closed state of the opening/closing member in which the transport path is closed.

With the foregoing arrangement, in addition to the effect achieved by any one of the first through thirteenth information recording devices, the following effect can be achieved. By controlling the stopping means so as to stop the driving of the device main body when the closed state of the opening/closing member in which the transport path is closed is detected, unnecessary driving of the device main body can be eliminated. The closed state of the opening/closing member is a state in which no recording medium sheet is present in the device main body or a state in which a recording medium sheet is completely housed in the device main body, and the stopping of the driving of the device main body, particularly the stopping of driving of the transport means for transporting the recording medium sheet, results in energy saving. Furthermore, the provision of the opening/closing member helps to prevent alien substances such as dirt from entering the device main body when the device main body is not used or when it is being carried, thereby preventing the recording medium sheet and the information recording and erasing means from being reversely affected.

A fifteenth information recording device of the present invention, which is arranged as any one of the first through fourteenth information recording devices is, is further characterized in that the device main body further includes a display section for displaying operation information relating to an operation such as recording or erasure of information with respect to the recording medium sheet, and that the display section also serves as an operation section for controlling the operation.

With the foregoing arrangement, in addition to the effect achieved by any one of the first through fourteenth information recording devices, the following effect can be achieved. Since the display section for displaying information serves as the operation section for commanding various operations in the information recording device, operation keys for respective functions can be omitted, thereby resulting in simplification of the device main body. For example, by using a liquid crystal panel as the display section and forming the liquid crystal panel in a touch panel type, the user is allowed to carry out the variety of operations only by touching the liquid crystal panel of the display section.

A sixteenth information recording device of the present invention, which is arranged as any one of the first through fifth information recording devices is, is further characterized in that the sheet holding means is detachably provided to the device main body.

With the foregoing arrangement, in addition to the effect achieved by any one of the first through fifteenth information recording devices, the following effect can be achieved. Since the sheet holding means is detachably provided to the device main body, it is possible to attach/detach the sheet holding means with respect to the device main body in a state in which the sheet holding means holds the recording medium sheet. With this, the housing of the recording medium sheet is facilitated, and the recording medium sheet becoming scarred or damaged when it is being housed in the device main body or brought out therefrom can be prevented.

A seventeenth information recording device of the present invention, which is arranged as any one of the first through sixteenth information recording devices is, is further characterized in that the recording medium sheet includes an information-display region and a non-information-display region, that distinction marks are provided on the non-information-display region, the distinction marks being used for distinction the recording medium sheet from another recording medium sheet or for distinction between a front and a back of the recording medium sheet, and that the information recording device further includes detecting means for detecting the distinction marks, and control means for controlling transport operations by driving means with respect to the recording medium sheet, based on result of the detection by the detecting means.

With the foregoing arrangement, in addition to the effect achieved by any one of the first through sixteenth information recording devices, the following effect can be achieved. Since the recording medium sheet has the information-display region and the non-information-display region and distinction marks used for distinction the recording medium sheet from another recording medium sheet or for distinction between a front and a back of the recording medium sheet are recorded on the non-information-display region, it is possible to distinct the top, bottom, right, and left, as well as the front and back of the recording medium sheet, even in the case where the liquid crystal paper 11 transmits light.

This makes it possible to prevent the recording medium sheet from being engaged with respect to the device main body in a wrong manner, for example, with the wrong side up.

Furthermore, the provision of the distinction marks at both ends of the recording medium sheet in the transport direction enables detection of both the ends of the recording medium sheet in the transport direction by detecting the distinction marks. Therefore, in the case where the distinction mark on an end of the recording medium sheet is detected, the transport of the recording medium sheet can be stopped after a set period of time elapses, thereby making it possible to prevent excessive transport of the recording medium sheet. As a result, it is possible to prevent such excessive transport of the recording medium sheet from making re-transport impossible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording medium sheet, comprising:
   a pair of protective layers each comprising a thin film sheet which is bendable;
   a liquid crystal layer sandwiched between said pair of protective layers;
   first and second information display regions, the first information display region for displaying information viewable only from a first side of the medium and the second information display region for displaying information viewable only from a second side of the medium opposite the first side, and wherein a center of the medium sheet is located between the first and second information display regions; and
   a non-information-display region, where no liquid crystal material is provided, located at least partially along an edge of the medium sheet.

2. The recording medium sheet as set forth in claim 1, wherein at least one of the pair of protective layers is made of a transparent resin.

3. The recording medium sheet as set forth in claim 1, wherein at least one of the pair of protective layers comprises polyethylene terephthalate.

4. The recording medium sheet as set forth in claim 1, further comprising a conductive layer which is formed on an external surface side of said pair of protective layers.

5. The recording medium sheet as set forth in claim 4, further comprising a coloration layer which is provided between said conductive layer and said protective layer on which said conductive layer is formed, so as to enhance contrast.

6. The recording medium sheet as set forth in claim 4, wherein said conductive layer is colored so as to serve as a coloration layer for enhancing contrast.

7. The recording medium sheet as set forth in claim 1, wherein said liquid crystal layer comprises a low-molecular cholesteric liquid crystal material.

8. The recording medium sheet as set forth in claim 7, wherein said liquid crystal layer comprises a cholesteric liquid crystal material which is composed of a cholesterol derivative.

9. The recording medium sheet as set forth in claim 7, wherein said liquid crystal layer comprises a chiral nematic liquid crystal material which is obtained by adding a chiral dopant to a nematic liquid crystal.

10. The recording medium sheet as set forth in claim 9, wherein said liquid crystal layer exhibits bistability in both a twist planar state and a focal conic state.

11. The recording medium sheet as set forth in claim 1, wherein said liquid crystal layer comprises a composite material including a polymer material and cholesteric liquid crystal.

12. The recording medium sheet as set forth in claim 11, wherein said liquid crystal layer comprises a composite material of acrylic resin and liquid crystal which exhibits a cholesteric phase.

13. The medium sheet of claim 1, wherein the non-information-display region includes a plurality of apertures defined therein.

14. The medium sheet of claim 1, wherein the non-information-display region includes a plurality of distinction marks for distinguishing the medium sheet from other medium sheets.

15. The medium sheet of claim 1, wherein the first and second information display regions are spaced apart from one another.

16. The medium sheet of claim 1, further comprising a non-information-display region provided proximate the center of the medium sheet between the first and second information display regions.

17. The medium sheet of claim 1, wherein at least one of the information display regions includes a reflective layer (114) provided on a side of the liquid crystal layer opposite the side of the medium sheet where a display is produced by that information display region.

18. The medium sheet of claim 1, wherein at least one of the information display regions includes a coloration layer provided on a side of the liquid crystal layer opposite the side of the medium sheet where a display is produced by that information display region.

19. A recording medium sheet, comprising:

a pair of protective layers;

a liquid crystal layer sandwiched between said pair of protective layers; and first and second information display regions, the first information display region for displaying information viewable from a first side of the medium and the second information display region for displaying information viewable from a second side of the medium opposite the first side, and wherein a non-information-display region is provided between the first and second information display regions.

20. The medium sheet of claim 19, wherein the center of the medium sheet is located between the first and second information display regions; and a non-information-display region where no liquid crystal material is provided is located along an edge of the medium sheet.

* * * * *